(12) United States Patent
Goranson et al.

(10) Patent No.: US 11,790,253 B2
(45) Date of Patent: Oct. 17, 2023

(54) SYSTEM AND METHOD FOR MODELING COMPLEX LAYERED SYSTEMS

(71) Applicant: Sirius-Beta Corporation, Virginia Beach, VA (US)

(72) Inventors: Harold T. Goranson, Virginia Beach, VA (US); Beth Cardier, Virginia Beach, VA (US)

(73) Assignee: Sirius-Beta Corporation, Virginia Beach, VA (US)

( * ) Notice: Subject to any disclaimer, the term of this patent is extended or adjusted under 35 U.S.C. 154(b) by 237 days.

(21) Appl. No.: 16/785,148

(22) Filed: Feb. 7, 2020

(65) Prior Publication Data

US 2022/0044128 A1    Feb. 10, 2022

Related U.S. Application Data

(63) Continuation of application No. 15/231,400, filed on Aug. 8, 2016, now abandoned, which is a continuation-in-part of application No. 14/834,011, filed on Aug. 24, 2015, now abandoned, and a continuation-in-part of application No. 14/740,528, filed on Jun. 16, 2015, now Pat. No. 10,332,562, which is a continuation-in-part of application No. 14/286,561, filed on May 23, 2014, now abandoned, said application No. 15/231,400 is a (Continued)

(51) Int. Cl.
*G06N 5/04* (2023.01)
*G06N 20/00* (2019.01)
*G06F 16/957* (2019.01)
*G06F 40/30* (2020.01)
*G06F 16/36* (2019.01)

(52) U.S. Cl.
CPC ............. *G06N 5/04* (2013.01); *G06F 16/367* (2019.01); *G06F 16/957* (2019.01); *G06F 40/30* (2020.01); *G06N 20/00* (2019.01)

(58) Field of Classification Search
CPC ........ G06N 5/04; G06N 20/00; G06F 16/367; G06F 16/957; G06F 40/30
See application file for complete search history.

(56) References Cited

U.S. PATENT DOCUMENTS 5,099,450 A    3/1992 Berkling
5,175,848 A    12/1992 Dysart et al.
(Continued)

OTHER PUBLICATIONS

Goranson, H.T., "The Agile Virtual Enterprise: Cases, Metrics, Tools", Greenwood International, Westport Connecticut, (1999).
(Continued)

*Primary Examiner* — Keith D Bloomquist
(74) *Attorney, Agent, or Firm* — Blank Rome LLP

(57) ABSTRACT

Method and system for modeling of complex systems using a two-sorted reasoning system. Information is received by Distributed Feature Extraction Processors. A first level of reasoning is performed on the information by Distributed Regular Reasoning Processors. A second reasoning process is performed on the information by Distributed Situation Reasoning Processors, which use a Functional Fabric configured to analyze the information received and use functions to modify previous inferences. Client applications allow for viewing and manipulating both reasoning systems and their associated information.

21 Claims, 32 Drawing Sheets

Related U.S. Application Data continuation-in-part of application No. 14/286,561, filed on May 23, 2014, now abandoned, and a continuation-in-part of application No. 14/093,229, filed on Nov. 29, 2013, now Pat. No. 10,360,503, said application No. 14/740,528 is a continuation-in-part of application No. 14/093,229, filed on Nov. 29, 2013, now Pat. No. 10,360,503, said application No. 15/231,400 is a continuation-in-part of application No. 13/919,751, filed on Jun. 17, 2013, now abandoned, said application No. 14/740,528 is a continuation-in-part of application No. 13/919,751, filed on Jun. 17, 2013, now abandoned, said application No. 14/834,011 is a continuation-in-part of application No. 13/290,439, filed on Nov. 7, 2011, now Pat. No. 9,117,167, said application No. 14/740,528 is a continuation-in-part of application No. 13/290,439, filed on Nov. 7, 2011, now Pat. No. 9,117,167, said application No. 13/919,751 is a continuation-in-part of application No. 12/798,487, filed on Apr. 5, 2010, now abandoned, which is a continuation-in-part of application No. 12/105,143, filed on Apr. 17, 2008, now Pat. No. 8,751,918, said application No. 14/286,561 is a continuation-in-part of application No. 12/105,143, filed on Apr. 17, 2008, now Pat. No. 8,751,918, said application No. 14/286,561 is a continuation of application No. 12/105,143, filed on Apr. 17, 2008, now Pat. No. 8,751,918.

(60) Provisional application No. 61/732,326, filed on Dec. 1, 2012, provisional application No. 61/410,395, filed on Nov. 5, 2010, provisional application No. 61/166,579, filed on Apr. 3, 2009, provisional application No. 60/912,243, filed on Apr. 17, 2007.

(56) References Cited

U.S. PATENT DOCUMENTS

| | | | |
|---|---|---|---|
| 5,303,379 | A | 4/1994 | Khoyi et al. |
| 5,493,508 | A | 2/1996 | Dangelo et al. |
| 5,546,519 | A | 8/1996 | Berry |
| 5,682,532 | A | 10/1997 | Remington et al. |
| 5,854,932 | A | 12/1998 | Mariani et al. |
| 5,995,958 | A | 11/1999 | Xu |
| 6,038,560 | A | 3/2000 | Wical |
| 6,751,777 | B2 | 6/2004 | Bates et al. |
| 7,092,928 | B1 | 8/2006 | Elad et al. |
| 7,487,515 | B1 | 2/2009 | Jones et al. |
| 7,627,583 | B2 | 12/2009 | Carter et al. |
| 7,933,989 | B1 | 4/2011 | Barker et al. |
| 8,402,451 | B1 | 3/2013 | Sweeney |
| 8,560,491 | B2 | 10/2013 | B'Far et al. |
| 9,117,167 | B2 * | 8/2015 | Goranson ............... G06N 5/00 |
| 10,042,836 | B1 * | 8/2018 | Wang ............... G06F 16/9024 |
| 2002/0078174 | A1 | 6/2002 | Sim et al. |
| 2002/0091768 | A1 | 7/2002 | Balasubramanian |
| 2002/0095454 | A1 | 7/2002 | Reed et al. |
| 2002/0138455 | A1 | 9/2002 | Abdel-Moneim et al. |
| 2003/0172368 | A1 | 9/2003 | Alumbaugh et al. |
| 2004/0117773 | A1 | 6/2004 | Nicolle |
| 2004/0199923 | A1 * | 10/2004 | Russek ............... G06N 20/00 |
| | | | 707/E17.026 |
| 2004/0243921 | A1 | 12/2004 | Carr et al. |
| 2004/0267779 | A1 | 12/2004 | Carter et al. |
| 2005/0289134 | A1 | 12/2005 | Noguchi |
| 2005/0289501 | A1 | 12/2005 | Patton |
| 2006/0036670 | A1 * | 2/2006 | Musman ............... H04L 41/044 |
| | | | 709/202 |
| 2006/0059165 | A1 | 3/2006 | Bosloy et al. |
| 2006/0093103 | A1 | 5/2006 | Timmins et al. |
| 2006/0167689 | A1 | 7/2006 | Maren |
| 2006/0173873 | A1 | 8/2006 | Prompt et al. |
| 2006/0195785 | A1 * | 8/2006 | Portnoy ............... G06Q 10/107 |
| | | | 715/764 |
| 2006/0277205 | A1 | 12/2006 | Song et al. |
| 2006/0294098 | A1 | 12/2006 | Thomson et al. |
| 2007/0100790 | A1 | 5/2007 | Cheyer et al. |
| 2007/0156720 | A1 | 7/2007 | Maren |
| 2007/0266374 | A1 | 11/2007 | Grisenthwaite et al. |
| 2008/0092060 | A1 | 4/2008 | Berg et al. |
| 2008/0162498 | A1 | 7/2008 | Omoigui |
| 2008/0208589 | A1 | 8/2008 | Cross et al. |
| 2009/0012842 | A1 | 1/2009 | Srinivasan et al. |
| 2009/0030861 | A1 | 1/2009 | Almond |
| 2009/0172771 | A1 | 7/2009 | Soulhi |
| 2010/0076918 | A1 | 3/2010 | Attou et al. |
| 2010/0157049 | A1 | 6/2010 | Dvir et al. |
| 2010/0174754 | A1 | 7/2010 | B'Far et al. |
| 2010/0228782 | A1 | 9/2010 | Rao et al. |
| 2010/0268769 | A1 | 10/2010 | Goranson |
| 2010/0312549 | A1 | 12/2010 | Akuwudike |
| 2011/0010751 | A1 | 1/2011 | Soulhi |
| 2011/0087629 | A1 | 4/2011 | B'Far et al. |
| 2011/0093430 | A1 | 4/2011 | B'Far et al. |
| 2011/0307451 | A1 | 12/2011 | El Haddi et al. |
| 2012/0167094 | A1 | 6/2012 | Suit |
| 2012/0284259 | A1 | 11/2012 | Jehuda |
| 2013/0311419 | A1 | 11/2013 | Xing et al. |
| 2014/0040222 | A1 | 2/2014 | Schmitz et al. |
| 2015/0019462 | A1 * | 1/2015 | De ............... G06Q 20/10 |
| | | | 706/50 |

OTHER PUBLICATIONS

Herring et al, "Using category theory to model GIS applications", 4th International Symposium on Spatial Data Handling. vol. 2. 1990.

Kokar, et al, "Ontology-based situation awareness". Information fusion 10.1 (2009): 83-98.

Goranson, H.T. and B. Cardier, Scheherazade's Will: Quantum Narrative Agency, American Association for Artificial Intelligence, www.aaai.org. (2006).

Cardier, Beth and H.T. Goranson, Storymaking across Contexts: How a Fiction Writer and a Team of Computer Scientists Came to Terms, Focus on Science, vol. 31, No. 2, p. 37-51 (2009).

Cardier, Beth and H.T. Goranson, Unputdownable: How the Agencies of Compelling Story Assembly can be Modelled Using Formalisable Methods From Knowledge Representation, and in a Fictional Tale About Seduction, Phd. University of Melbourne. University of Melbourne, Australia (2012).

Goranson, H.T. and Beth Cardier, A two-sorted logic for structurally modeling systems. Progress in Biophysics and Molecular Biology. dio:10.1016/pbiomolbio1013.03.015, (2010).

Barwise, Joh and Jon Perry, Situations and Attitudes, MIT Press, Cambridge, MA. (1983).

Delvin, Keith, Logic and Information, Cambridge University Press, New York, New York, (1995).

Okasaki, Chris, Purly Functional Data Structures, Cambridge University Press, New York, New York, (1999).

Conal, Elliot. Declarative Event-Oriented Programming. In Proceedings of the 2nd SIGPLAN International Conference on Principles and Practice of Declarative Programming. New York, NY, ACM Press, (2000).

Goranson, H.T., Outliner Control Technology, ATPM: About this Particular Macintosh, http://atmp.com/back/atpo.

Goranson, Ted, "A UI for Situated Reasoning about Streaming Media".

Apr. 16, 2014 email from program@uist.org to tedg@alum.mit.edu.
Jun. 3, 2014 email from program@uist.org to tedg@alum.mit.edu.
ACM Code of Ethics and Professional Conduct, adopted by ACM Council Oct. 16, 1992, available at http://www.acm.org/about/code-of-ethics.

Cardier, Beth, "Narrative Casual Impetus: Governance through Situational Shift in Game of Thrones".

(56) References Cited

OTHER PUBLICATIONS

Intelligent Narrative Technologies 7, Call fro Papers, available at http://int7.westphal.drexel.edu/?page_id=8.
Jun. 12, 2014 email easychair.org to bethcardier@hotmail.com.
Jun. 17, 2014 presentation of Beth Cardier (included on enclosed DVD).
Schedule for Intelligent Narrative Technologies 7, Jun. 17-18, 2014.

* cited by examiner

SYSTEM AND METHOD FOR MODELING COMPLEX LAYERED SYSTEMS

CROSS REFERENCE TO RELATED APPLICATIONS

This application is a continuation of U.S. application Ser. No. 15/231,400 filed on Aug. 8, 2016, which is:

a continuation of U.S. application Ser. No. 15/231,400 filed Aug. 8, 2016, which is a continuation-in-part of U.S. application Ser. No. 14/286,56, filed on May 23, 2014, which is a continuation of U.S. application Ser. No. 12/105,143, filed Apr. 17, 2008 and issued as U.S. Pat. No. 8,751,918 on Jun. 10, 2014, which claims the benefit of U.S. provisional application No. 60/912,243, filed Apr. 17, 2007;

a continuation-in-part of U.S. application Ser. No. 14/834,011 filed on Aug. 24, 2015 which is a continuation of U.S. application Ser. No. 13/290,439, filed on Nov. 7, 2011 and issued as U.S. Pat. No. 9,117,167 on Aug. 25, 2015, which claims the benefit of U.S. provisional application No. 61/410,395 filed Nov. 5, 2010;

a continuation-in-part of U.S. application Ser. No. 13/919,751 filed on Jun. 17, 2013, which is a continuation-in-part of U.S. application Ser. No. 12/798,487, filed on Apr. 5, 2010, which claims the benefit of U.S. provisional application No. 61/166,579 and is a continuation-in-part of U.S. application Ser. No. 12/105,143, filed Apr. 17, 2008 and issued as U.S. Pat. No. 8,751,918 on Jun. 10, 2014, which claims the benefit of U.S. provisional application No. 60/912,243;

a continuation-in-part of application Ser. No. 14/093,229 filed on Nov. 29, 2013 and issued as U.S. Pat. No. 10,360,503 on Jul. 23, 2019, which claims the benefit of Provisional Application No. 61/732,326; and a continuation-in-part of application Ser. No. 14/740,528, filed on Jun. 16, 2015 and issued as U.S. Pat. No. 10,332,562 on Jun. 25, 2019, which is a continuation-in-part of application Ser. No. 14/093,229, filed on Nov. 29, 2013 and issued as U.S. Pat. No. 10,360,503 on Jul. 23, 2019, which claims the benefit of provisional application No. 61/732,326 filed on Dec. 1, 2012, a continuation-in-part of U.S. patent application Ser. No. 13/919,751, filed Jun. 17, 2013, which is a continuation-in-part of U.S. patent application Ser. No. 12/798,487, filed Apr. 5, 2010, which is a continuation-in-part of U.S. patent application Ser. No. 12/105,143, filed on Apr. 17, 2008 and issued as U.S. Pat. No. 8,751,918 on Jun. 10, 2014 and is a continuation of provisional application No. 61/166,579, filed Apr. 3, 2009, U.S. patent application Ser. No. 12/105,143 being a continuation of provisional application No. 60/912,243, filed Apr. 17, 2007, a continuation-in-part of U.S. patent application Ser. No. 14/286,561, filed May 23, 2014, which is a continuation of U.S. patent application Ser. No. 12/105,143, filed on Apr. 17, 2008, issued as U.S. Pat. No. 8,751,918 on Jun. 10, 2014, which is a continuation of provisional application No. 60/912,243, filed Apr. 17, 2007, and a continuation-in-part of U.S. patent application Ser. No. 13/290,439, filed on Nov. 7, 2011, issued as U.S. Pat. No. 9,117,167 on Aug. 25, 2015, which claims the benefit of Provisional Application No. 61/410,395, filed Nov. 5, 2010.

The entirety of all related applications listed above are incorporated by reference herein.

TECHNICAL FIELD

Embodiments described herein relate to modeling of complex systems, for example, those with two or more levels of structure. Such embodiments may include recognizing features on data capture, integrating those features in a distributed fashion and displaying them in such a way that hidden system dynamics are revealed and can be manipulated.

BACKGROUND

Reasoning systems work with facts, by logical and probabilistic methods building structures from them to produce conclusions and insights. Typically, the facts are acquired by means separated from the analytical tools that will be used; in most cases, the 'facts' are extended from data. The source data is simply collected from the world without close coupling with the later reasoning system.

Independently, expert systems as a class of reasoning systems depend on engineering a balance between limiting the ontological domain and limiting the logical scope. It is simply not possible to reason comprehensively over the 'open world.' An open world by definition includes entities and phenomenon you know little or nothing about.

Therefore, a large class of probabilistic and neurally inspired systems have been devised to create likely connections. But because these are not based in semantics that are native to the problem, the results are correlative and cannot well indicate causal relationships.

A related set of technical limits prohibits distributed reasoning at the semantic level over vast networks of computerized systems, with vast amounts of data, media, facts and conclusions.

Yet another related problem is that the current art is incapable of understanding overarching systems in the world of interest using models that have distinct features and dynamics that are not simply composed from constituents. This applies in any domain but is acutely felt in the biological research domain where biological systems are poorly modeled.

An unrelated problem is the matter of defining model abstractions that are sufficient to address the concerns above and still be presented to users in a way that provides deep, intuitive insight into all stages and levels of the process, allowing the user to intervene, control and change all elements of the system.

Another problem is that we currently have only immature support for streaming, dynamic information sources, whether data or semantically registered facts. In particular, we have no way to manage streams that deliver elements that retroactively change previously interpreted situations, sometimes radically changing selected conclusions.

A final problem is that many phenomena are composed of agents that organize as systems that themselves have agency. This system agency cannot be determined by examining the components. Such systems are supported by the logical framework of situation theory but not well implemented in computing systems.

Therefore, a need exists for a system and method that has a consistent model formalism that spans all these concerns. The need further exists for a computing system and method which allows extraction of features from sources including streaming sources, where the sources can be millions or more of streams, and millions or more of collaborative computing resources. Such a system will support a parallel, collaborating but not composed set of features that can be used to model systems of the world of interest and the distributed system's state. Such a system and model will be employed to reason over the 'open world,' forming inferences from unknown elements and dynamics.

As well, such a computing system and its model will present itself to a user at all stages and levels by the same features in an intuitive way. This will include a display of unknowns and unknown effects, computational effect and causal relationships at both system and primitive levels, and rationale of why system dynamics emerge.

Some embodiments of the invention described herein are a novel synthesis of functional programming techniques, category theory as it applies to computer science and independently applies to modeling techniques. Some also use a novel application of situation theory using recent innovations in cognitive narratology to structure situations as categories.

BRIEF DESCRIPTION OF THE DRAWINGS

FIGS. 16a, 16b and 16c illustrate an example of composition on a Space-Time view;

DETAILED DESCRIPTION

Figure 1A:
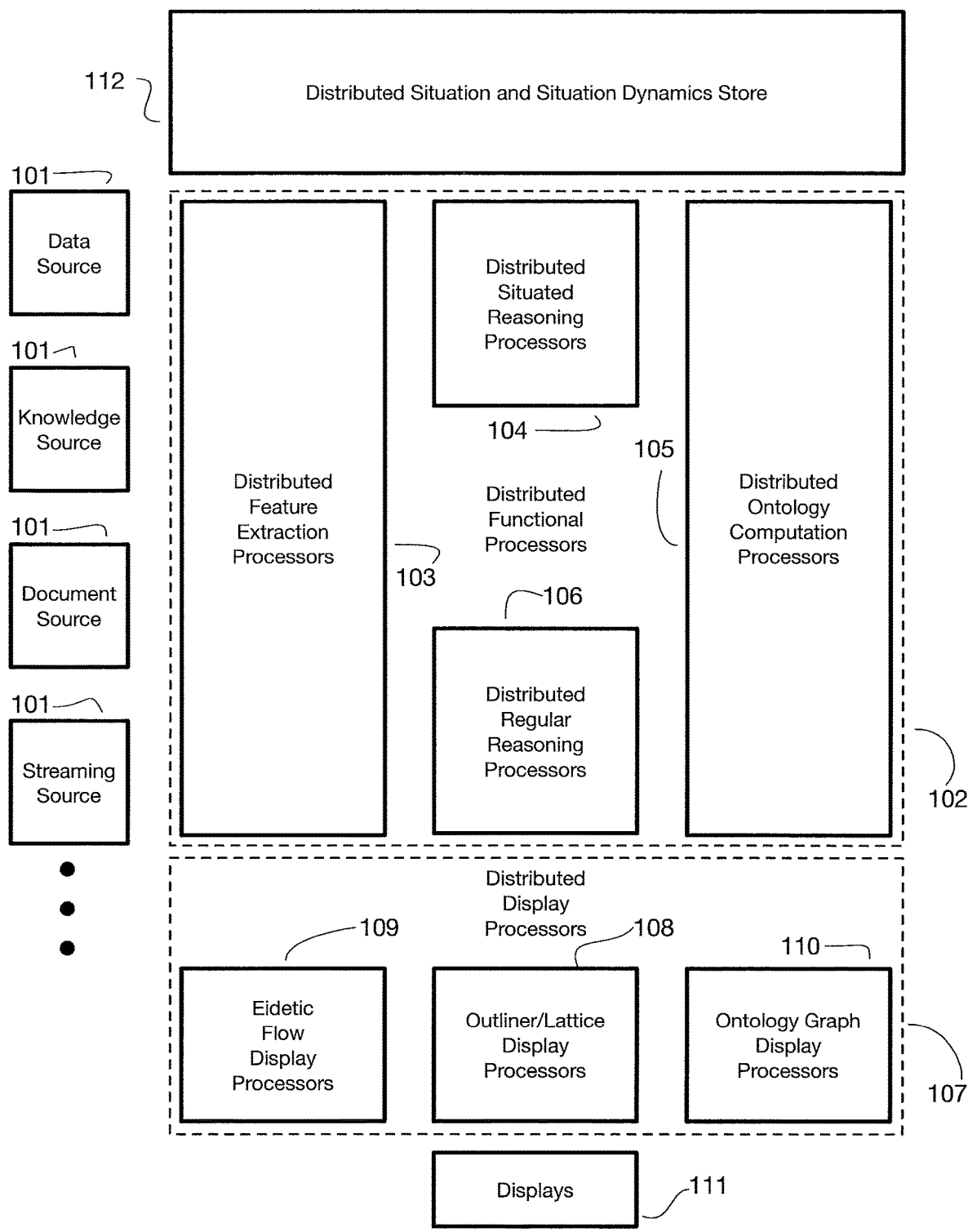
FIG. 1a illustrates an embodiment of the system architecture.

In the following detailed description, reference is made to the accompanying drawings which form a part hereof and illustrate specific embodiments that may be practiced. In the drawings, like reference numerals describe substantially similar components throughout the several views. These embodiments are described in sufficient detail to enable those skilled in the art to practice them, and it is to be understood that structural and logical changes may be made.

Embodiments described herein include a computer system. The computer system may be any computer system, for example, a small wearable, a smartphone, a tablet, a personal computer, a minicomputer, or a mainframe computer. The computer system will typically include a processor, a display, at least one input device and random access memory (RAM), but may include more or fewer of these components. The processor can be directly connected to the display, or remotely over communication channels such as radio, sound or light waves, cable, telephone lines or local area networks. Embodiments may include both commercial off-the-shelf (COTS) configurations, and special purpose systems designed to work with the embodiments disclosed herein, so long as the hardware used is capable of performing the tasks required by specific embodiments.

Figure 11:
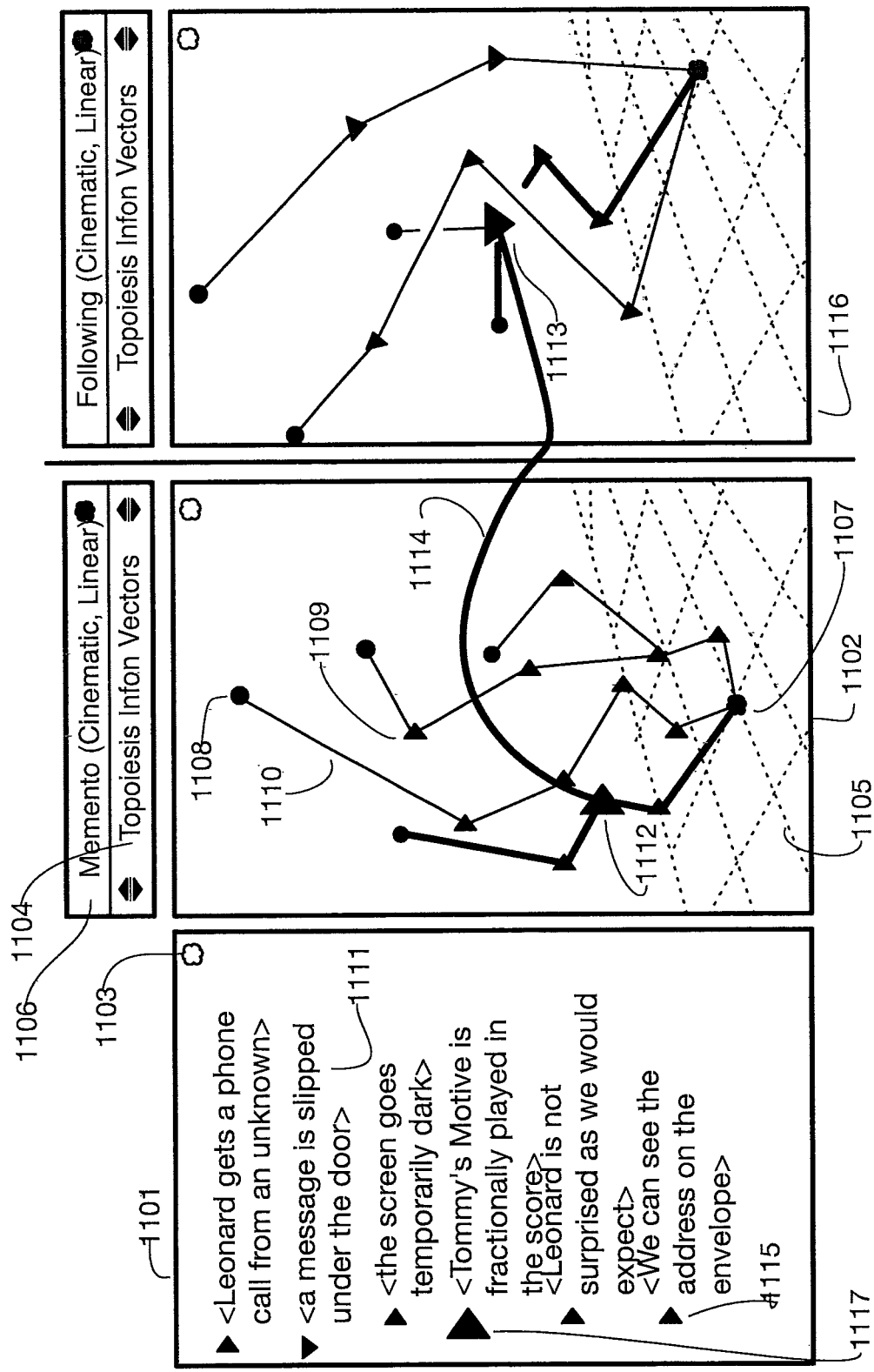
FIG. 11 illustrates an example of a user interface for relating ontologies.

Item numbers in the figures are keyed to the figure number; thus, item 1102 is part of FIG. 11. In some cases, a figure is derived from a figure in a previous filing, in which case the item number sequence is preserved. For example, items 1301, 1302, 1303 from FIG. 13 correlate to items 401, 402, 403 respectively in FIG. 4 of U.S. patent Ser. No. 13/919,751.

At least some embodiments described herein are an alternative system and method for principles shared with non-provisional application Ser. No. 14/093,229.

FIG. 1a illustrates an example system architecture. Information elements are ingested on the left where four representative copies of Information Sources 101 are drawn. A great many of these can exist, on the order of millions or more. Four example types are illustrated, being data as in databases of different degree of structure; knowledge bases, implying some semantic structure, pre-parsed natural language or executable code; multimedia documents which could be discrete items or continuous flows of documents as in news feeds or email; streams such as video and sensor streams or any synthetic stream as composed by a stream processing system. These are not exhaustive types, and are intended to indicate the ability to ingest any information one would encounter.

These are fed to the Distributed Functional Processors 102 that support a Functional Fabric of instructions. Application Ser. No. 13/919,751 terms this a Functional Reactive Fabric. The Distributed Functional Processors 102 can be in a central computer or supported by distributed, connected processors. This Functional Fabric may be implemented using functional reactive programming techniques as described below, or implemented using a message-passing concurrent programming paradigm.

One task cluster within the Functional Fabric of the Distributed Functional Processors 102 is the task of extracting and assigning features to elements of the ingested information. This is performed with continuous awareness of the current and anticipated situations in the Functional Fabric of the Distributed Functional Processors 102 as a whole, referencing the more stable and large Distributed Situation and Situation Dynamics Store 112. The identification of these features from the source information and/or the assignment based on global knowledge provides the ability to compose systems. Situations in this context can be systems as we defined in the biological context. Details on this are illustrated in further diagrams.

Another task cluster is the Distributed Regular Reasoning Processors 106 performs reasoning on the information, in this case being reasoning as ordinarily understood, using rules, logics of various kinds, algebraic operations and probabilistic analyses such as Bayesian analysis. This list is not exhaustive. The point is that any analytical method currently used in a domain can be incorporated here, either re-implemented in the Functional Fabric of the Distributed Functional Processors 102, or connected as a legacy system through an instance of Information Sources 101. The information flow between instances of Information Sources 101 and the Distributed Functional Processors 102 is typically two-way.

A significant novelty of embodiments of the system is the ability to reason over and about situations, using a dedicated cluster of Distributed Situation Reasoning Processors 104 within the Functional Fabric. In the example implementation, this is a category theoretic reasoning system using functors and morphisms among categories as functions in the Functional Fabric of the Distributed Functional Processors 102. The purpose is to provide a second, integrated reasoning system that reasons at an abstract level about situations. Situations in this context inform the feature abstraction of the Distributed Feature Extraction Processors 103, so that the features can work with the Distributed Regular Reasoning Processors 106. They also modify the Ontology Graphs and networks managed by the Distributed Ontology Computation Processors 105. System models of the type previously described can emerge from situations. This may be a long term system concept such as the innate immune system in a biomedical model, or a temporal system, for example a complex alarm system that judges the severity of an infection and signals an extensive response.

The Distributed Situation Reasoning Processors 104 support novel extensions of situation theory and constitute a formally integrated two-sorted reasoning system with the Distributed Regular Reasoning Processors 106. The Distributed Situation Reasoning Processors 104 draw from and teach a persistent store of categoric patterns in the Distributed Situation and Situation Dynamics Store 112 that inform the Distributed Situation Reasoning Processors 104.

The mechanism by which the two reasoning systems are integrated is a dynamic ontology network that is held in active memory as part of the Functional Fabric. The Distributed Ontology Computation Processors 105 interact with regular reasoning system in a fashion current in that art. Logical reasoning, for example that may model and reason about semantically represented causal dynamics at the omics level is supported in the Distributed Regular Reasoning Processors 106. Such systems require an ontological framework that is consulted to assess meaning. Such an ontological framework is maintained in an active state by the Distributed Ontology Computation Processors 105. Users can directly view and modify this ontology by a novel user interface managed by 110.

The semantic networks, axioms, rules and description logic of the Distributed Ontology Computation Processors 105 are themselves information that is modified by the 'second sort,' the Distributed Situation Reasoning Processors 104. The ontology hosted by the Distributed Ontology Computation Processors 105 is effectively modified by the Distributed Situation Reasoning Processors 104 as different situations come to govern. Many such ontological changes will modify previous results of the Distributed Regular Reasoning Processors 106. All of the reasoning of the Distributed Situation Reasoning Processors 104 and the Distributed Regular Reasoning Processors 106 is maintained live in the fabric, so that shifting goverance can modify inferences. In a circular fashion, changing insights managed by the Distributed Regular Reasoning Processors 106, for example coupled behavior of elements at the omics level, will modify feature assignments managed by the Distributed Feature Extraction Processors 103 and thereby adjust composition of situations in the Distributed Situation Reasoning Processors 104.

For example, an experimenter may be working with a concept of an innate immune system and a synthesized bodily system that balances inflammation. Such a system will overlap many others: circulatory and adaptive immune for instance and also overlap with the situations of genetic profile and virus infection. This experimenter may be guided to test for a specific $CD8^+$ T-cell infiltrate in inflamed tissue and fail to find it. Perhaps this line of investigation was informed by causal dynamics among the systems and situations suggested and managed by the Distributed Situation Reasoning Processors 104. The experimenter would enter that finding into the model (via an instance of Information Sources 101) and many things may adjust. A new definition of an inflammation management system within the body may appear.

The collection of user interface services are shown as Distributed Display Processors 107. These need not be functionally or reactively coded, though they can be integrated into the Distributed Display Processors 107. They are shown here separately because the described embodiment is coded on general purpose hardware, using common user interface frameworks. The processes that interact with the Distributed Display Processor 107 structure the view into the Functional Fabric for delivery to one of many Displays 111. These Displays 111 can be screens or immersive interfaces.

The Ontology Graphs maintained by the Distributed Ontology Computation Processors 105 are accessible to a user via presentations created by the Ontology Graph Display Processors 110. For example, when our experimenter enters a new result or related piece of information, he or she will want to assure that what the system understands is what the experimenter means. The new information is therefore registered in the ontology using the services of the Ontology Graph Display Processors 110. The system will already know of $CD8^+$ T-cells and their behavior in certain circumstances. Very precise new behavior in this specific situation will extend that knowledge, and in our example modify features associated with it, changing the model of the biological inflammation management system.

Another user interface service is supported by the Outliner/Lattice Display Processors 108. They support tailored outliner and related lattice views that serve as a collection of created and machine assembled notebooks. High levels of the outline are situations, states and systems. Lower, child entries are information related to omic behavior. The notebook integrates with the Ontology Graphs as described in later figures.

Among the most novel of the interface views is that supported by the services of the Eidetic Flow Display Processors 109. This presents a view of the Functional Fabric as a flow, the form of which depicts intersystem dynamics. Any element of this presentation can be zoomed into for inspection on outline or Ontology Graph view.

Figure 1B:
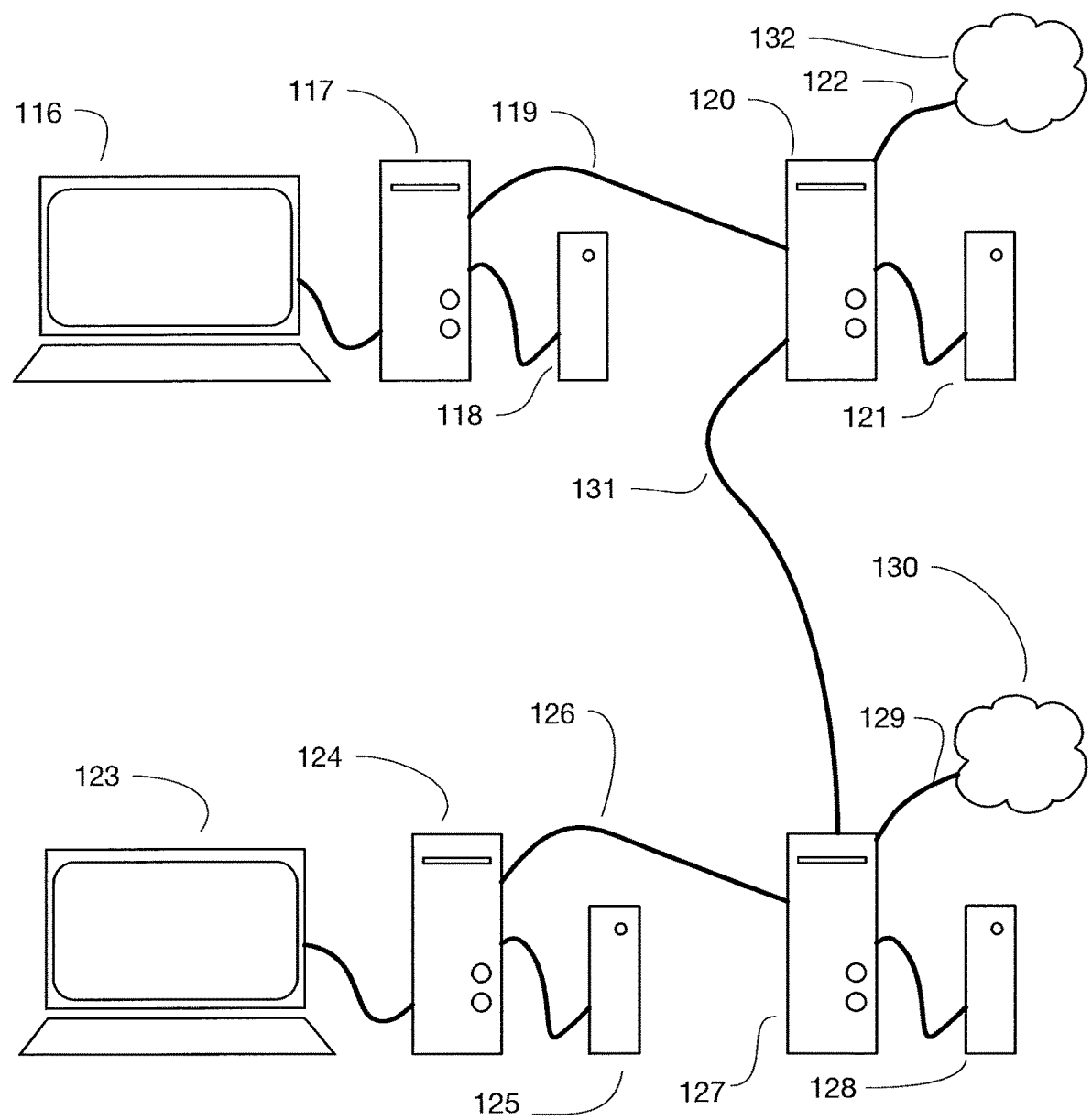
FIG. 1b illustrates a computer network according to embodiments described herein.

FIG. 1*b* is similar to FIG. 2*b* from application Ser. No. 14/093,229. It illustrates an example network architecture for the combined system described in FIG. 1*a*.

Computing Device 127 supports the Distributed Regular Reasoning Processors 106. This Computing Device 127 has Storage 128, wherein among other information is stored progressive results of the Distributed Ontology Computation Processors 105. The Computing Device 127 is connected by Communicative Connection 129 to a Network 130 that supplies and stores external information while also providing additional computational services. Network 130 supports the interaction with Information Sources 101.

This system has a Client Computing Device 124, connected to the Computing Device 127 by a Communicative Connection 126 that supports a user directing or monitoring the reasoning. The Client Computing Device 124 supports the Distributed Display Processors 107 consisting of the Outliner/Lattice Display Processors 108, Eidetic Flow Display Processors 109, Ontology Graph Display Processors 110. It has Storage 125 to support its functions, and a Display 123 among other interface devices that supports Displays 111.

The Computing Device 127 is connected by Communicative Connection 131 to a computing system which supports the Distributed Situation Reasoning Processors 104. It consists of a Computing Device 120, attached Storage 121 and is attached by Communicative Connection 122 to a Network 132 that supplies and stores external information while also providing additional computational services. Storage 121 supports the Distributed Situation and Situation Dynamics Store 112.

This system has a Client Computing Device 117, connected to the Computing Device 120 by a Communicative Connection 119 that supports a user directing or monitoring the reasoning. The Client Computing Device 117 supports the Distributed Feature Extraction Processors 103 and management of Information Sources 101. It has Storage 118 to support its functions, and a Display 116 among other interface devices.

Collectively, the computing systems including Computing Device 120 and 127 with Client Computing Device 117 and associated components support the processes of Distributed Functional Processors 102. Client Computing Device 124 and associated components support the processes of Distributed Display Processors 107.

The Communicative Connection 131 need not be a direct connection as shown in FIG. 1*b*, and can be any known connection between two computers including, but not limited to, a connection through any computer or computers, routers, firewalls, public networks (e.g., the Internet) and/or private networks.

The system illustrated is one example of a hardware system, chosen for clarity. The Computing Devices 120, 127 and Client Computing Devices 124, 117 may be any device capable of performing the programmed operations. They need not have local Storage 118, 121, 125, 128 as described, but have information stored by other means known in the art, including distributed stores or hard drives residing inside or outside the Computing Device.

Each Computing Device 120, 127 and Client Computing Device 124, 117 need not be discrete, instead being a collection of connected computing devices acting in unison. Similarly, Computing Device 120, 127 and Client Computing Device 124, 117 need not be separate computing devices. Functions can be combined in any manner, including the functionality of one or more of Computing Device 120, 127 and Client Computing Device 124, 117 being combined in one machine. For example, the Client Computing Device 117 serving as a modeling system client to the Computing Device 120 supporting other functions of the ontology derivation system can be combined into one computing system.

The system as illustrated shows Displays 116, 123 to support human users. Either client can be directed by non-human agents controlling the process. The interface systems can be displayed in other parts of the system, for example Display 123, or other displays for other users not shown.

Both the Computing Device 117 (with Display 116 and Storage 118) and the Computing Device 124 (with Display 123 and Storage 125) may be multiple systems supporting multiple collaborating users. Some elements of the system are not shown; for example Computing Devices 120, 127 may have user input devices similar to Displays 116, 123, and Client Computing Devices 117, 124 may have direct or indirect connections to outside resources similar to Communicative Connections 122, 129. Other connections may exist, for example, Client Computing Devices 117 and 124 may have direct or indirect connections similar to Communicative Connection 131.

Figure 2:
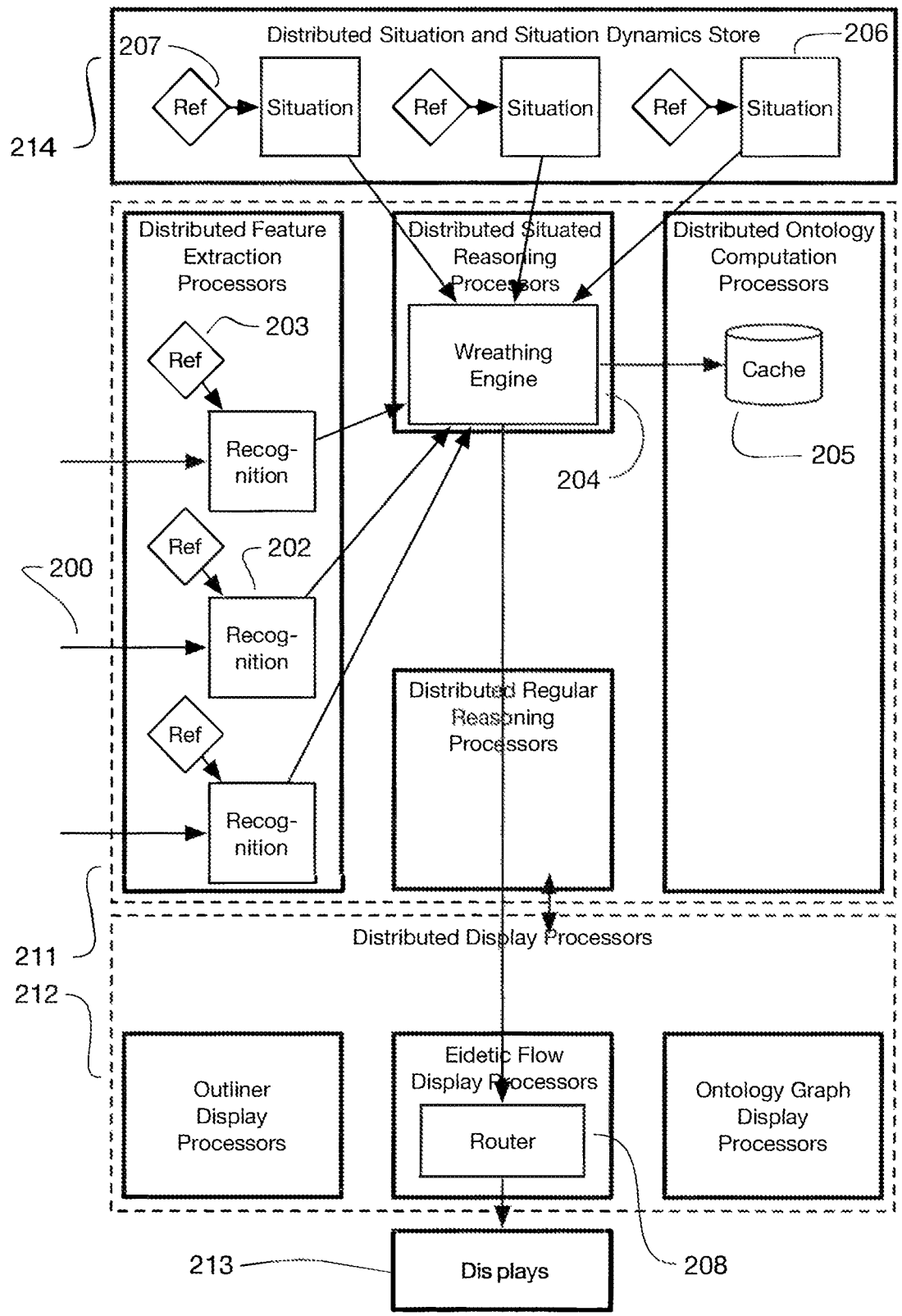
FIG. 2 illustrates a related system architecture according to an embodiment described in U.S. Pat. No. 8,751,918.
Figure 6:
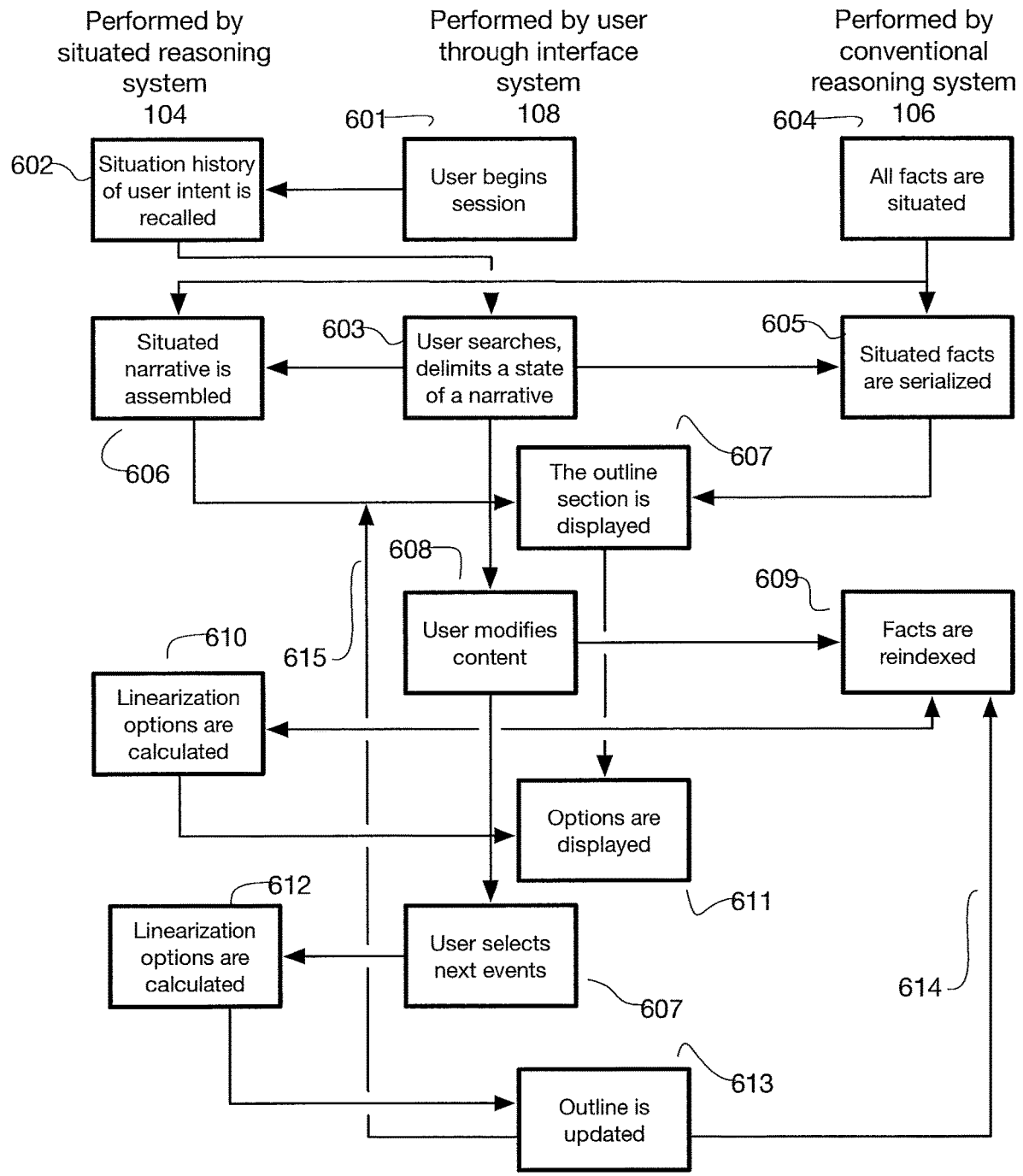
FIG. 6 illustrates steps for specifying futures.

FIG. 2 illustrates the system from FIG. 6 of U.S. Pat. No. 9,117,167 rearranged to show the equivalence of the hardware system of U.S. Pat. No. 9,117,167 to FIG. 1*a* here. U.S. Pat. No. 9,117,167 teaches in part a system for collaborative feature recognition and synthesis that employs a novel implementation of situation theory.

Streams and Other Information 200 (U.S. Pat. No. 9,117,167 terms these 'Multiple Streams') enter a Computing System 211. Massive instances of Streams and Other Information 200 are possible. Distributed Feature Extraction Processors 202 (U.S. Pat. No. 9,117,167 terms these 'Recognition Units') employ Internal Feature References 203 (U.S. Pat. No. 9,117,167 terms these 'Recognition Unit References) to identify and model features. These are used by Distributed Situated Reasoning Processors supporting a Wreathing Engine 204 to produce computed results in the form of related facts deduced from the universe of features from the universe of Streams and Other Information 200. These are delivered to a user interface presentation service 208, a component of a unified presentation processor environment 209 for presentation on a display.

The Wreathing Engine of U.S. Pat. No. 9,117,167 204 employs a Distributed Situation and Situation Dynamics Store 214 within which situations 206 are stored. These are created on the fly by features presented by the Distributed Feature Extraction Processors 202 using reference situation templates 207.

In addition, the Wreathing Engine 204 employs a Situation Control Unit 206 for identified entities. This Ontology Store 205 (U.S. Pat. No. 9,117,167 terms these 'Storage Unit') is also updated by the Wreathing Engine 204. Situation Control Units 206, employ a Situation Reference (U.S. Pat. No. 9,117,167 terms these 'Reference').

Routers 208 within Distributed Display Processors 212 Process and direct information to Displays 213.

By comparing FIGS. 1 and 2, an ordinarily skilled practitioner will recognize the system disclosed in U.S. Pat. No. 9,117,167 as representative of that described here in FIG. 1a.

In the context of U.S. Pat. No. 9,117,167, the computing system of the Computing Device 127, Storage 128, Communicative Connection 129, Network 130 of FIG. 1b supports ontological processing required for the identification of Semantic Features served by the Ontology Store 205. In the context of U.S. Pat. No. 9,117,167, the computing system of the Client Computing Device 124, Storage 125, Display 123 of FIG. 1b supports Computing System 208, Distributed Display Processors 212, Displays 213 of FIG. 2. In the context of U.S. Pat. No. 9,117,167, the computing system of the Computing Device 120, attached Storage 121 and is attached by Communicative Connection 122 to a Network 132 of FIG. 1b supports interface with Streams and Other Information 200, the Wreathing Engine 204, Situation References 207, Computing System 208, Computing System 211 of FIG. 2. In the context of U.S. Pat. No. 9,117,167, the computing system of the Client Computing Device 117, Storage 118, Display 116 of FIG. 1b supports the management of Streams and Other Information 200, the Distributed Feature Extraction Processors 202, Internal Feature References 203, the display associated with the Wreathing Engine 204 of FIG. 2.

Figure 3:
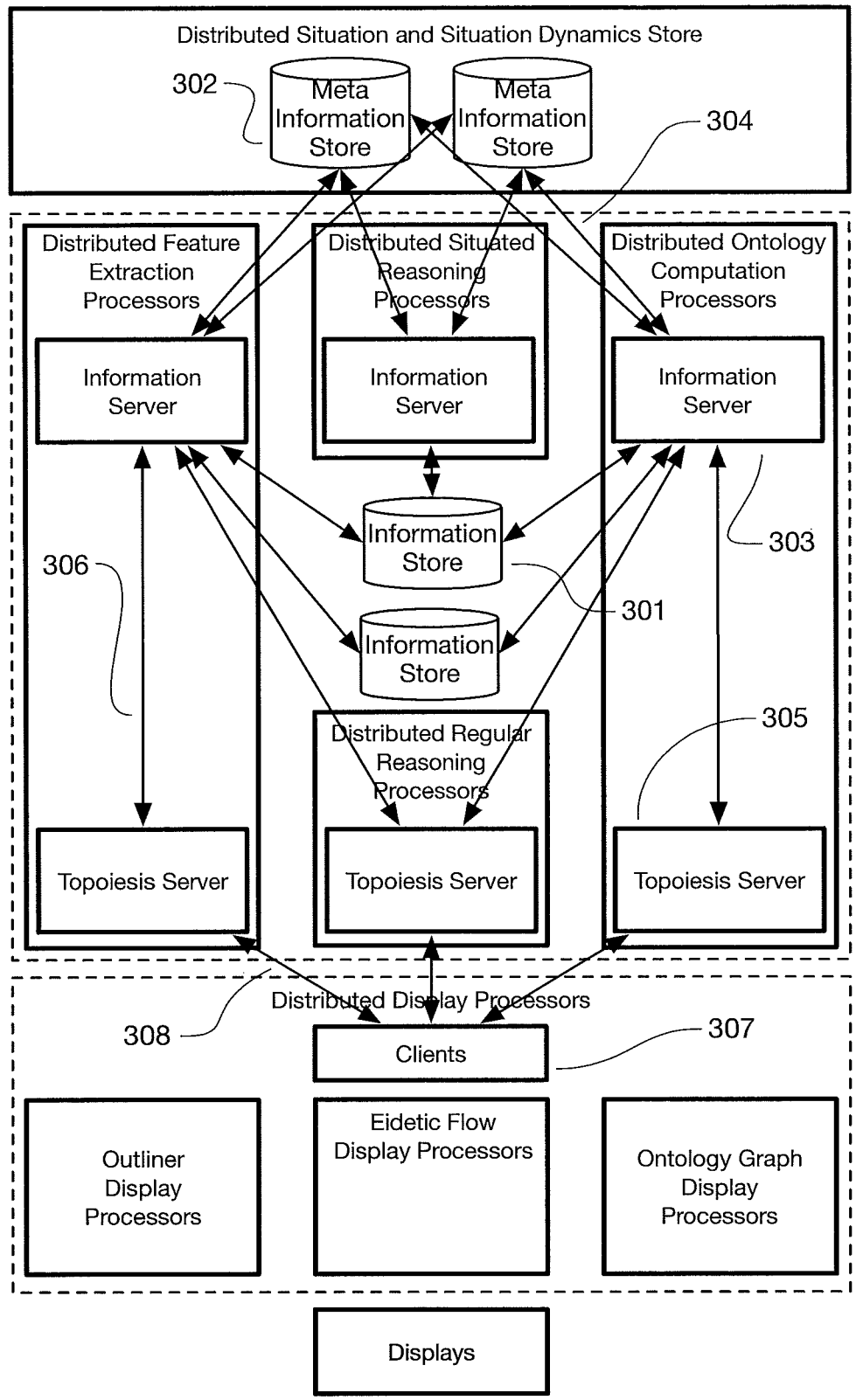
FIG. 3 illustrates a related system architecture according to an embodiment described in U.S. Pat. No. 9,117,167.

FIG. 3 illustrates the system from FIG. 1a of application Ser. No. 13/919,751 rearranged to show the equivalence of the hardware system of application Ser. No. 13/919,751 to FIG. 1a here. Application Ser. No. 13/919,751 teaches in part a Functional Fabric that is distributed among many processors using Information Servers 303 and Topoiesis Servers 305 to support the functions of Feature Extraction, Situated Reasoning Ontology Computation and Display.

Information is stored in distributed instances in Information Stores 301, available to any Information Server 303 in any processing node. Similarly, Situations and Situation Dynamics are stored in Metainformation Stores 302 in distributed computing nodes that may be separate or shared with Information Servers 303 by Channels 304 (application Ser. No. 13/919,751 terms these 'Links').

Topoiesis Servers 305 perform fractional, functional processing via communication with information servers via Channels 306 (application Ser. No. 13/919,751 terms these 'Links') and deliver coherent results to distributed Clients 307 via Channels 308 (application Ser. No. 13/919,751 terms these 'Links').

By comparing FIGS. 1a and 3, an ordinarily skilled practitioner will recognize the system disclosed in application Ser. No. 13/919,751 as representative of that described here in FIG. 1.

In the context of application Ser. No. 13/919,751, the computing system of the Computing Device 127, Storage 128, Communicative Connection 129, Network 130 of FIG. 1b supports the Topoiesis Servers 305 of FIG. 3. In the context of application Ser. No. 13/919,751, the computing system of the Client Computing Device 124, Storage 125, Display 123 of FIG. 1b supports Clients 307, Channels 308 of FIG. 3. In the context of application Ser. No. 13/919,751, the computing system of the Computing Device 120, attached Storage 121 and is attached by Communicative Connection 122 to a Network 132 of FIG. 1b supports Information Stores 301, Metainformation Stores 302, Information Servers 303, Channels 304 of FIG. 3. In the context of application Ser. No. 13/919,751, the computing system of the Client Computing Device 117, Storage 118, Display 116 of FIG. 1b supports the Distributed Feature Extraction Processors 103 consisting of Information and Topoiesis Servers, Channels 306, Channels 308 of FIG. 3.

Figure 4:
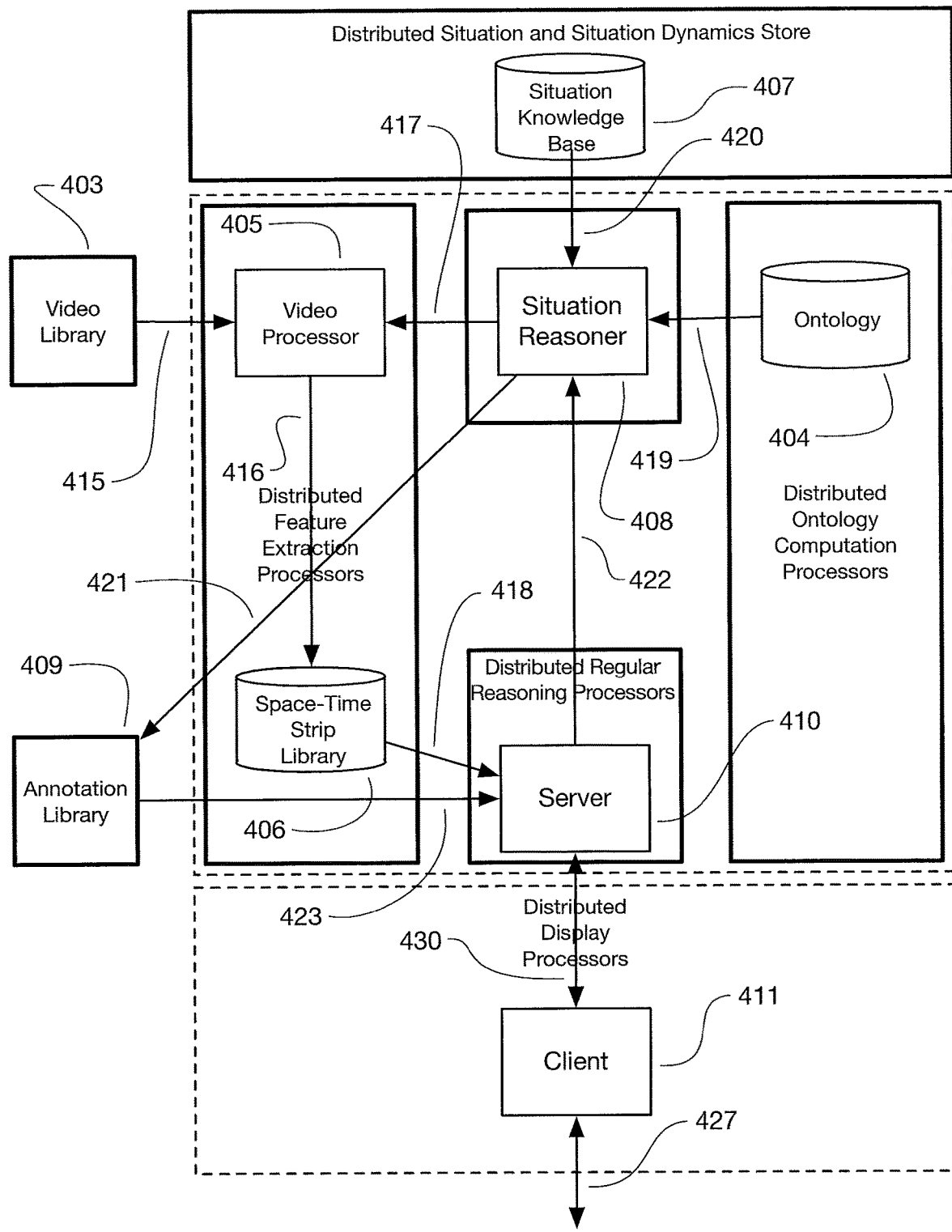
FIG. 4 illustrates a related system architecture according to an embodiment described in application Ser. No. 13/919,751.

FIG. 4 illustrates the system from FIG. 1 of application Ser. No. 14/740,528 rearranged to show the equivalence of the hardware system of application Ser. No. 14/740,528 to FIG. 1a here. Application Ser. No. 14/740,528 teaches in part a means of creating, displaying, navigating and manipulating entity, spatial and temporal features within a situated context on a model of developing processes.

FIG. 4 shows Information Feeds 415 (application Ser. No. 14/740,528 terms these 'Videos') from external sources such as a Video Library 403. These can be many feeds and possibly a great number. They will have previously been structured situationally. This structuring may be done by any number of means; the embodiment of application Ser. No. 14/740,528 shows commercial films assembled by creative teams. This process could be wholly or partially supported by systems such as those described in U.S. Pat. Nos. 8,751,918, 9,117,167, application Ser. No. 13/919,751 or application Ser. No. 14/093,229 separately or in combination. This information is delivered via Information Feeds 415 to a Feature Extraction Processor 405 (application Ser. No. 14/740,528 terms these 'Video Processors').

Using Information Feeds 417 (application Ser. No. 14/740,528 terms these 'Network Connections') from the Situation Reasoner 408, the processor enriches the information in the Information Feed 415 by providing information in the information Feed 417 about situated governance to the Feature Extraction Processor 405. The enriched information from the Feature Extraction Processor 405 is delivered by Information Feeds 416 to the Knowledge Store 406 (application Ser. No. 14/740,528 terms this a 'Data Store') from whence via Information Feeds 418 combined information can be delivered to the Computing Device 410 (application Ser. No. 14/740,528 terms this a 'Server') that composes the display for delivery by Information Feeds 430 (application Ser. No. 14/740,528 terms this a 'Connection') to a Client Workstation 411 for display on a Display Device 427. Both the Computing Device 410 and Client Workstation 411 can be distributed systems.

The Situation Reasoner 408 performs the function of recognizing relevant situations, their relative governance and how components (here shown as 'annotations') are related. It receives information from three sources: an Ontology Store and Reasoning System 404 (application Ser. No. 14/740,528 terms this an 'Ontology Library') via Information Feeds 419 to a Situation Store and Associated Reasoning System 407 (application Ser. No. 14/740,528 terms this a 'Situation Knowledge Base') via Information Feed 420 and the Computing Device 410 via Information Feed 422 (application Ser. No. 14/740,528 terms this a 'Network Connection') that provides real time updates.

It provides processed results to two sources. One is the Annotation Library 409 here shown as an external store via Information Feed 421. It need not be so, but is described so in the embodiment of application Ser. No. 14/740,528 for simplicity. The other result is via Information Feed 417 to the Feature Extraction Processor 405 as previously described.

Similarly, information from the Annotation Library 409 enters the system characterized primarily as unsituated information. This information is delivered via Information Feed 423 (application Ser. No. 14/740,528 terms this a 'Network Connection') to a Computing Device 410 to perform distributed reasoning processing. It also references situated information from the Situation Reasoner 408 as previously described. Thus, a loop of continuously situated information is established via Information Feeds 421, 422 and 423.

By comparing FIGS. 1 and 4, an ordinarily skilled practitioner will recognize the system disclosed in application Ser. No. 14/740,528 as representative of that described here in FIG. 1.

In the context of application Ser. No. 14/740,528, the computing system of the Computing Device 127, Storage 128, Communicative Connection 129, Network 130 of FIG. 1b supports the Annotation Library 409 and Computing Device 410 of FIG. 4. In the context of application Ser. No. 14/740,528, the computing system of the Client Computing Device 124, Storage 125, Display 123 of FIG. 1b supports Client Workstation 411, Display Device 427, Information Feeds 421, 423, 430 of FIG. 4. In the context of application Ser. No. 14/740,528, the computing system of the Computing Device 120, attached Storage 121 and is attached by Communicative Connection 122 to a Network 132 of FIG. 1b supports Video Library 403, Ontology Store and Reasoning System 404, Knowledge Store 407, Situation Reasoner 408, Information Feeds 415, Information Feeds 417, Information Feeds 419, Information Feeds 420, Information Feeds 422 of FIG. 4. In the context of application Ser. No. 14/740,528, the computing system of the Client Computing Device 117, Storage 118, Display 116 of FIG. 1b supports the Feature Extraction Processor 405, Knowledge Store 406, Information Feeds 415, 416, 417, 418 of FIG. 4.

Figure 5:
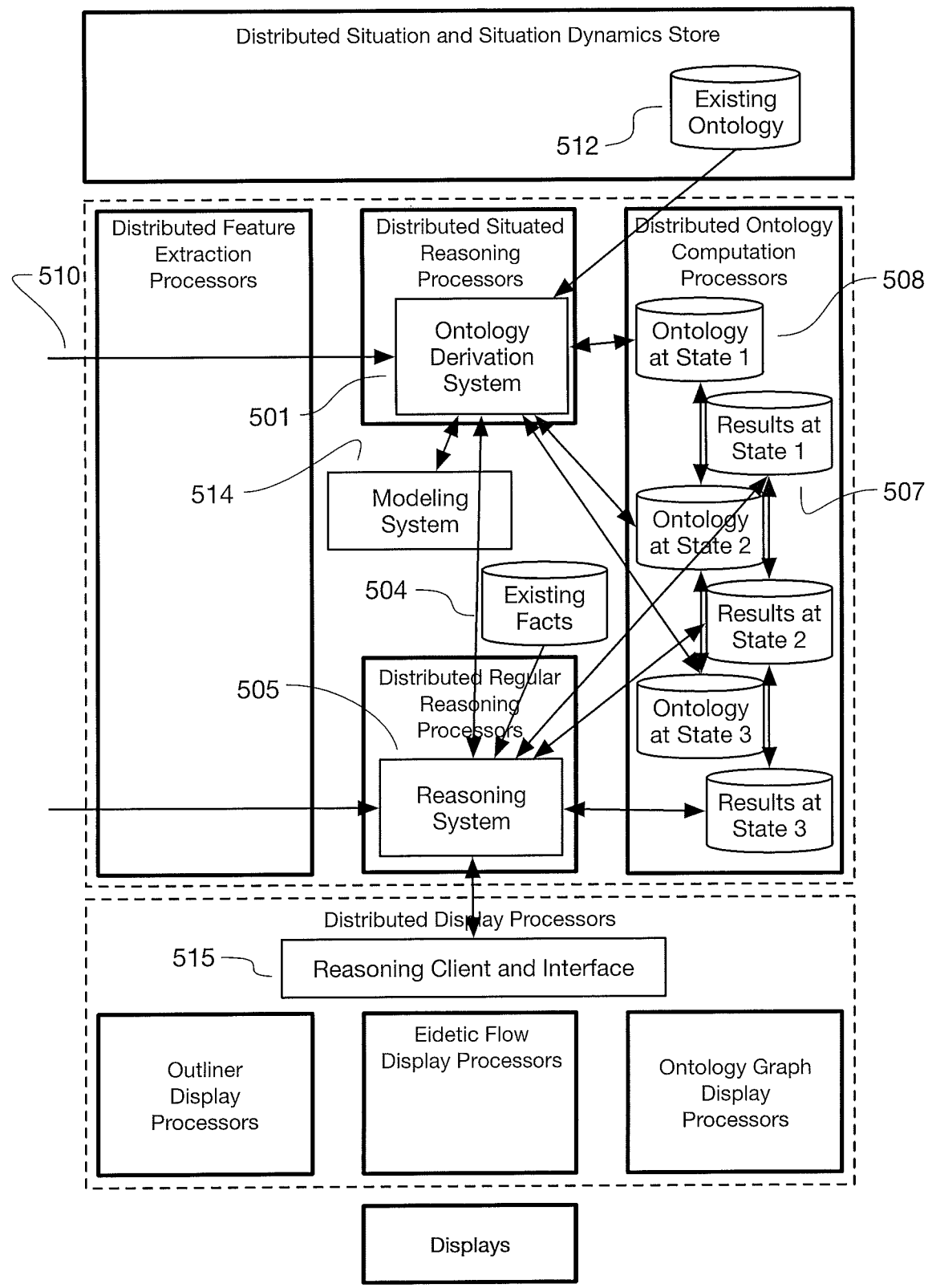
FIG. 5 illustrates a related system architecture according to an embodiment described in application Ser. No. 14/740,528.

FIG. 5 illustrates the system shown in FIG. 2a of application Ser. No. 14/093,229, the disclosure of which teaches a system of situation definition, governance and ontology manipulation, rearranged to show the equivalence of the system of FIG. 2a of application Ser. No. 14/093,229 to FIG. 1a here.

In this version of FIG. 1, information is ingested by Information Channel 510 (application Ser. No. 14/093,229 terms this as 'Sequentially Appearing Facts') as designated into the Ontology Derivation System 501 or the Conventional Reasoning System 505. The Ontology Derivation System 501 computes what situations are relevant, what their composition is (consisting of facts and other situations) what the relative governance is and how that modifies ontologies that affect the system's inferences.

Ontology Derivation System 501 uses known templates of situations, known instances of situations, templates of governance and known governing dynamics from Existing Ontology 512. Two core services assist: a Modeling System 514 handles the rules required for practical understanding of situated interpretation. It constrains the scope to what is needed. The Conventional Reasoning System 505 performs logical/probabilistic/neural reasoning using Existing Facts 504 and may be a collection of hosted legacy systems. In this context, it constrains the scope of what inferences and ontology are considered.

The Ontology Derivation System 501 computes governance in discrete states, saving each state and the difference of each state as snapshots of Ontology Structures 508. These ontology structures determine the meaning of facts and inferences. As they change, they produce direct influence that is similarly saved as dependent states of Facts 507 each state derived in part from the previous state.

A novelty in the system of application Ser. No. 14/093, 229 is the result of situated reasoning, supplementing what is supportable under the current art. In the described embodiment, the user can see and manipulate what is going on, and thus requires an interface service to support this in Reasoning Client and Interface 515.

By comparing FIGS. 1 and 5, an ordinarily skilled practitioner will recognize the system disclosed in application Ser. No. 14/093,229 as representative of that described here in FIG. 1.

In the context of application Ser. No. 14/093,229, the computing system of the Computing Device 127, Storage 128, Communicative Connection 129, Network 130 of FIG. 1b supports import of Existing Facts 504, the Conventional Reasoning System 505, management of Facts 507, progressive Ontology Structures 508 of FIG. 5. In the context of application Ser. No. 14/093,229, the computing system of the Client Computing Device 124, Storage 125, Display 123 of FIG. 1b supports the Reasoning Client and Interface 515 of FIG. 5. In the context of application Ser. No. 14/093,229, the computing system of the Computing Device 120, attached Storage 121 and is attached by Communicative Connection 122 to a Network 132 of FIG. 1b supports the Ontology Derivation System 501, Ontology Structures 508, Information Channel 510, Existing Ontology 512 of FIG. 5. In the context of application Ser. No. 14/093,229, the computing system of the Client Computing Device 117, Storage 118, Display 116 of FIG. 1b supports the Modeling System 514, and interface with Information Channel 510 of FIG. 5.

In summary, the previous filings U.S. Pat. Nos. 8,751,918; 9,117,167; application Ser. Nos. 13/919,751; 14/740,528 and 14/093,229, disclose different functionalities of a comprehensive system described in part in FIG. 1.

This comprehensive system shown in FIG. 1 supports a two-sorted reasoning system. One 'sort' deals with representations and inferences supported by the current art. It is primarily supported in the Distributed Regular Reasoning Processors 106 of FIG. 1.

The second sort deals with metalevels, narrative abstraction, implicit facts and situation governance. This is primarily supported in the Distributed Situation Reasoning Processors 104 of FIG. 1.

To support the integration between these two levels, the explicit information in the first sort must be structured in a specific way. Novel user interfaces are employed to establish structure among elements of the first sort to bridge to the second sort. This is accomplished in structure stored by the Distributed Ontology Computation Processors 105 of FIG. 1. The process supported by this combination of user interface and internal storage has the additional benefit of modeling the known facts and inferences with more clarity than the current art because of the implicit use of situation theory.

Figure 19:
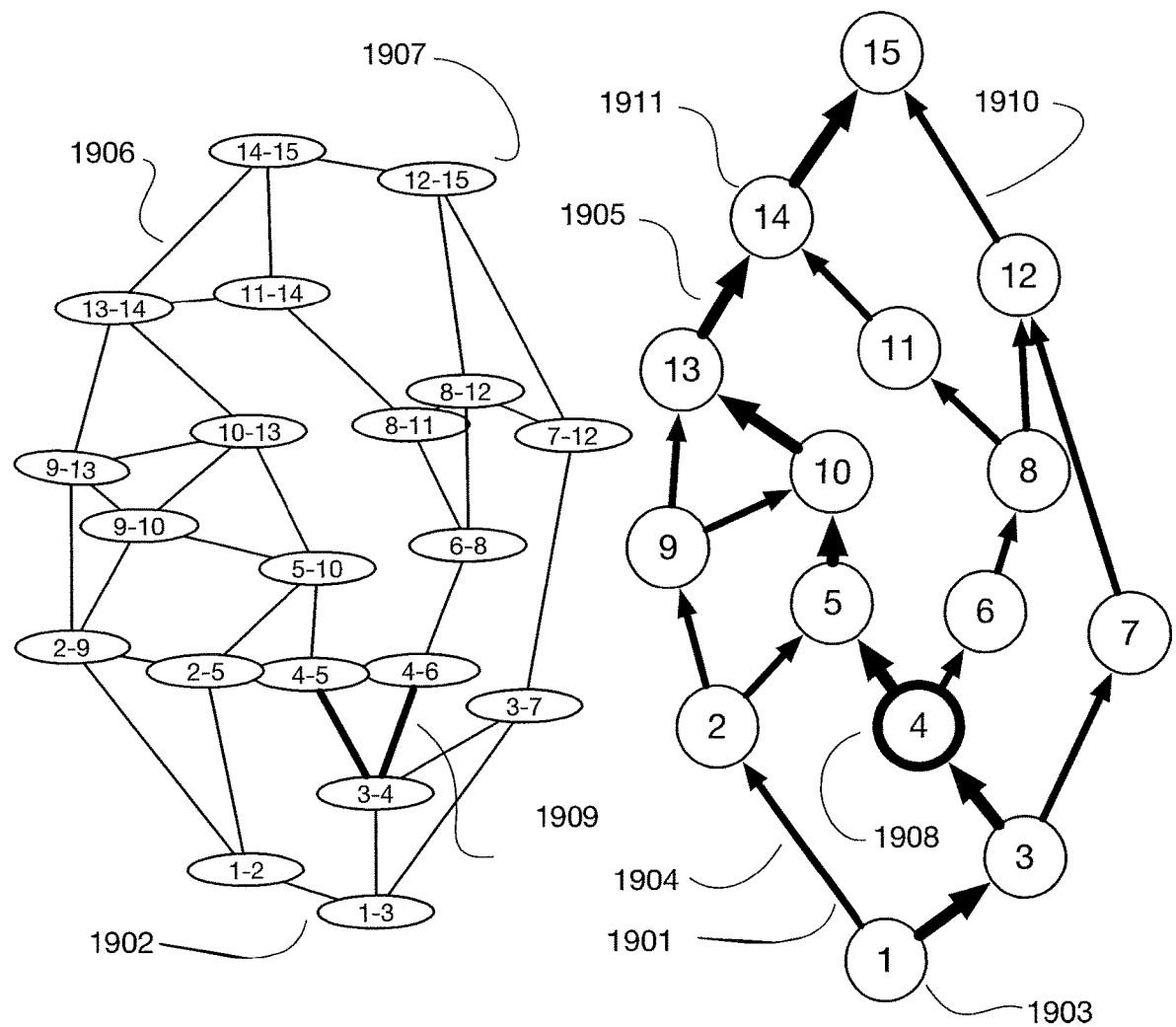
FIGS. 19a and 19b illustrate an example of a Concept Lattice and its Half-Dual.

FIG. 6 illustrates a flow chart for one such function. In this example, a user has available a partially structured and situated set of facts and is in the process of creating structure with a focus on the linearized narrative structure of facts illustrated later in FIGS. 19a and 19b as the 'causal lattice.'

The user is presented with work in progress which appears as an outline that is predominantly explanatory text. Other illustrative forms of information may be included, such as images, video, graphs, models, tables and so on without restriction. The task at hand is to structure precedence, building a multipath story.

Referring to FIG. 1a as the reference system, the user accesses the system by a Display 111. The service that is accessed is the Outliner/Lattice Display Processors 108, the outliner/lattice display, within the unified set of Distributed Display Processors 107. The information that is presented is preprocessed in this example by the functional processors of the Distributed Functional Processors 102.

The figure illustrates a flow of tasks performed in the operation of building and curating a type-linked narrative as a causal concept lattice. Processes handled by the second sorted, Distributed Situation Reasoning Processors 104 of FIG. 1a are on the left of FIG. 6. Those by the situation-aware Distributed Regular Reasoning Processors 106 are on the right and those executed by the human user, supported by the Distributed Display Processors 107 in the center.

The user-centric task is straightforward: the user locates a point in a story or described process at Step 603. He modifies some detail at Step 608. New options about what happens or might happen next are presented in Step 611, from which choices are made in Step 607 and everything adjusts accordingly in Step 613.

This requires a coordinated set of processes from both reasoning systems. The primary steps are illustrated in the figure.

Our example medical research user begins a session at Step 601 with a certain point in a specific process in mind. The Distributed Functional Processors 102 recall what it knows about how the user interacts with that sort of information, knowing the kinds of issues he works with, recent history with tentative conclusions and perhaps even factoring in the day of the week and time of day 602. This information is stored in the Situation Store and Associated Reasoning System 407 and delivered via Information Feed 420 to the Situation Reasoner 408 for late assembly. The behind the scenes operation managed by Situation Reasoner 408 creates a view of the process that is tailored for his immediate purpose.

Within this view, the user will locate a specific point, a state, in the process at Step 603, using the user interface service of the Client Workstation 411 in the Outliner/Lattice Display Processors 108. This is presented as a structured narrative. His process of locating this state resituates the narrative 606, producing a new state of the assembled facts at Step 605, shown as Facts 507 (FIG. 5) computed by the Distributed Regular Reasoning Processors 106 using a Topoiesis Server 305 (FIG. 3).

A new outline displaying there is shown in Step 607, using facts from Step 605 structured by situations from Step 606. The user then modifies some content. A wide variety of modifications are possible; in this example, an existing dependency is modified resulting in a new configuration of the concept lattice from Ontology Structures 508 (FIG. 5).

The result is that facts are reindexed at Step 609 and a dialog is initiated between the situations of Step 610 that 'linearize' the facts of Step 609 in concept lattices. In other words, the system refines its understanding of what the user requires in the next steps of the 'story so far' and presents a new set of prioritized options from the user to specify what comes next in the sequence.

The user selects one of these options, and possibly indicates that others need to be preserved as possible alternatives in a later relinearization. The system then takes this new knowledge, reincorporates it in the situation store at Step 612, displays the result at Step 613, and starts the cycle over again with updated facts from Step 614 and situations from Step 615.

Figure 7:
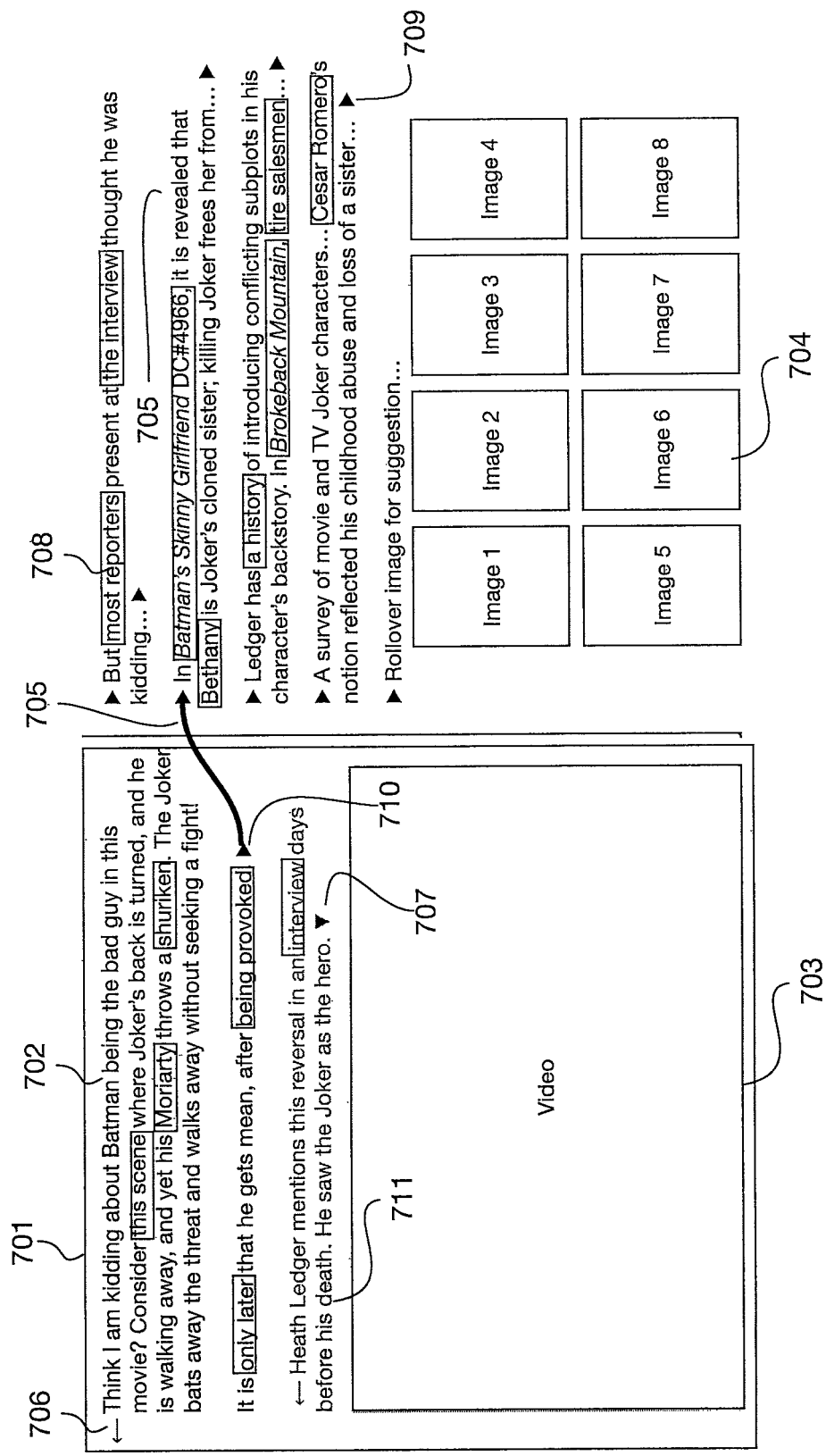
FIG. 7 illustrates an example of a user interface for specifying futures.

FIG. 7 illustrates the user interface at Step 611. The example in this case is a model of a film narrative. On the left is a displayed outline. The user has indicated a Resizable Outline Boundary 701 that advises the system which chunk of the outline is the current situation of interest.

This outline can be created by iterations of the process shown in FIG. 6. The outline can contain multimedia content, such as Text 702, Video 703 and other media elements not shown. The Video 703 is collapsible via Control 707, if a compact text only view is desired. A Rewind Control 706 will step the iterative process of Step 607 through Step 613 back for respecification. The user may want to do this if it is apparent that the narrative process is going into wanted futures.

The content can contain origins of Typed Links as taught in U.S. Pat. No. 8,751,918. These are indicated by a Typed Link Marker 708. The outline fragment selected in the Resizable Outline Boundary 701 also contains an Outline Child 711. The user has selected the parent segment as the root of the next situated fact collection by starting a drag shown by the Typed Link Indicator 705 from the Affordance 710.

On the right hand side of the figure are certain possibilities the system has selected for the new, successive sibling of the selected, situated outline entry. The user has dragged a Typed Link Indicator 705 to the second of the text-centric possibilities. Below are a number of media-centric possibilities as Thumbnails 704. These contain similar semantic content but are presented as thumbnails for compact presentation. A possible target for the Typed Link Indicator 705 can appear both in text and media presentations.

In some cases, it is difficult to evaluate a future without following it a few steps. The Affordance 709 is provided to allow the user to explore as many future steps as will be required to make an informed selection. In this case, the right hand assembly is replaced with that step's options. The user can choose to accept several steps at once.

Once the selection has been made by the Typed Link Indicator 705, the type options as taught by U.S. Pat. No. 8,751,918 can be assigned.

Figure 8:
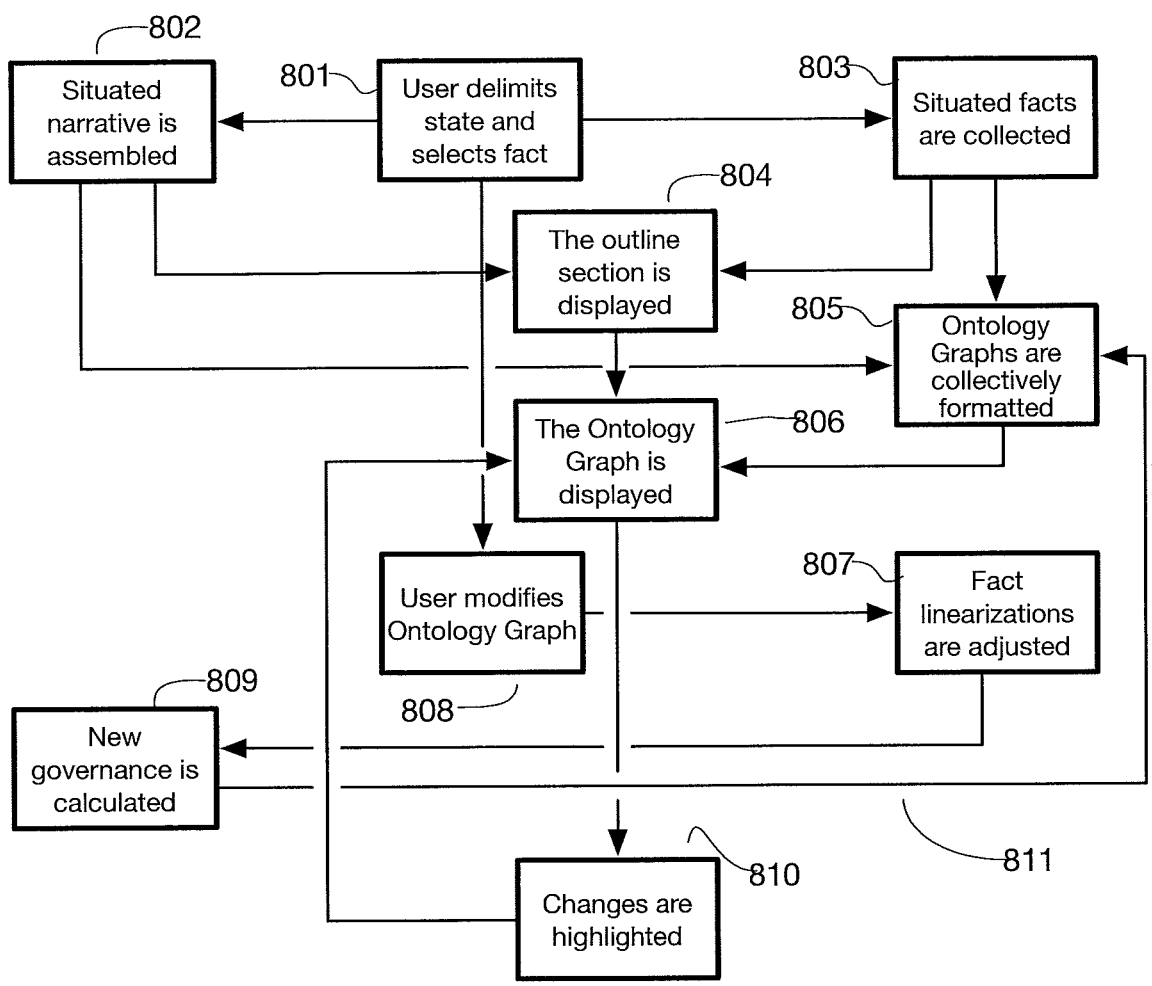
FIG. 8 illustrates examples of steps for modifying Ontology Graphs.
Figure 9:
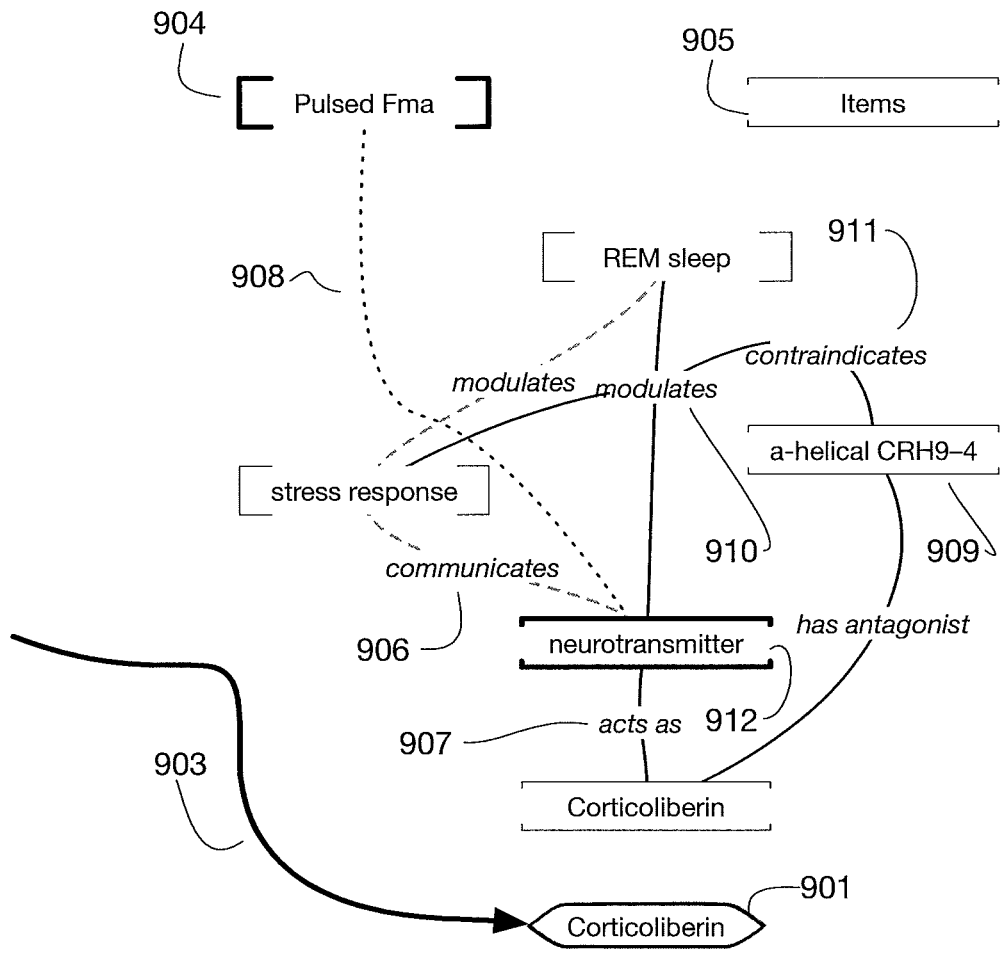
FIG. 9 illustrates an example of a user interface for modifying Ontology Graphs.

FIG. 8 illustrates a flow chart for a related activity. Where FIGS. 6 and 7 concern structuring multithreaded, linearized sequences, FIGS. 8 and 9 illustrate the task of refining what a single fact/situation chunk means. The process is one of selecting a fact collection in its context, referring to a graphical presentation of what the system believes is meant and adjusting that to suit.

The user chooses an item in a chunk and overall context at Step 801, perhaps as delineated by a Resizable Outline Boundary 701. As with Step 606, the system assembles its situation at Step 802 and fact at Step 803. The user interface displays the outline at Step 804 possibly in the same manner as in FIG. 7 or later figures. In these steps, the user has indicated that she wishes to audit and refine what the system assumes, so the relevant Ontology Graphs are calculated in Step 805 by appropriate segmentation with the desired segment displayed at Step 806. The user can modify the Ontology Graph by changing distance, increasing the scope to include more existing connections, or add, delete or edit nodes in Step 808.

The new results are conveyed to the system and the semantic connections are adjusted at Step 807. The new ontology arrangement conveys new meaning, nuance of meaning or resituationalized meaning and thus requires a new fabric of governance to be determined. This new governance may itself 'change' meaning of the target chunk or other entangled chunks, so there is a feedback signal denoted by Path 811. The new situational fabric may adjust ontology relationships throughout the knowledgebase.

Figure 13:
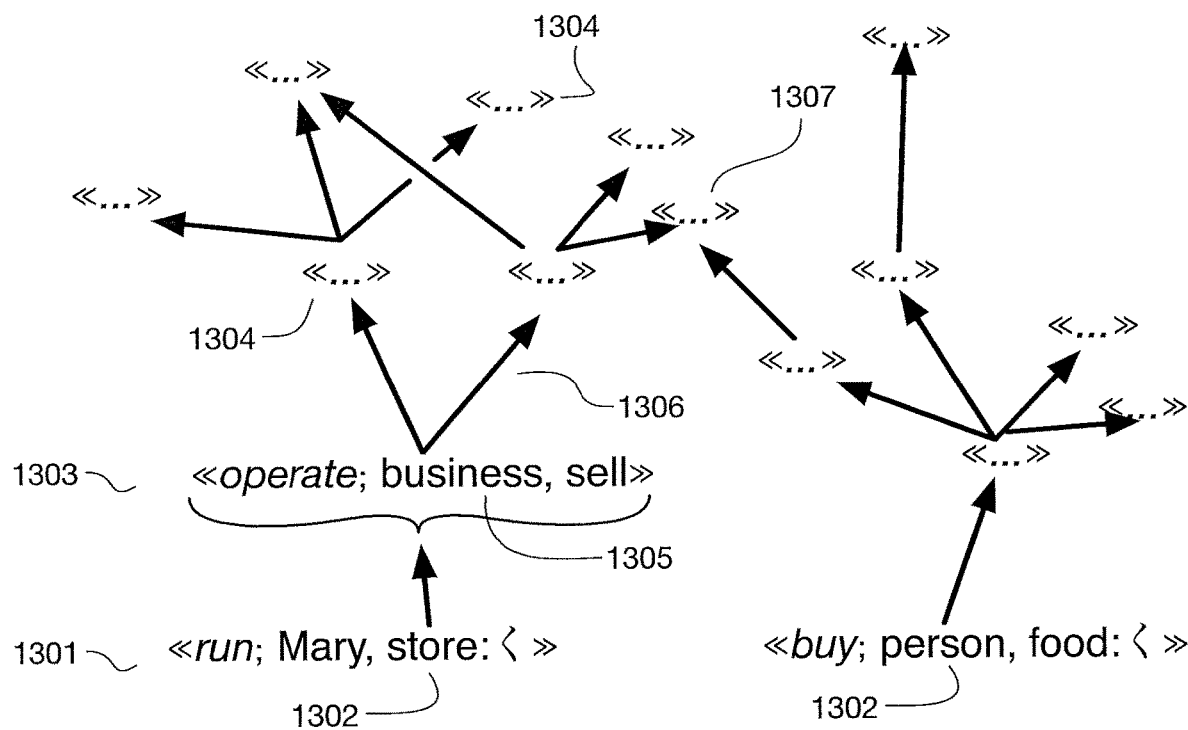
FIG. 13 illustrates examples of overlapping Ontology Graphs.

FIG. 9 illustrates an example user interface for this operation. Schematic Ontology Graphs are shown in FIG. 13 where they map to infons, but here we show a more nuanced version. The domain is human biology, and the context is trauma-induced stress that affects sleep. In this situation the role played by Corticoliberan in the Root Infon 901, the complex being defined, is highly context-specific.

The system presents an Ontology Graph derived from a baseline ontology imported from an external reference as modified by various situations: the studied condition (trauma induced sleep deprivation), the experimental protocols (embedded neuro-sensors in mice), the intent of discovery (the signals among different zones in the central nervous system) and the specific task of the moment (recording impressions from data). Items with horizontal borders are physical elements or structures. A Physical Item Selection Menu 905, here illustrated as a popup selector, contains a prioritized list of physical items the system believes are relevant.

Items with vertical borders are phenotypes, qualities or attributes and are sometimes associated with quantitative data. Solid lines between these, for example Semantic Relations 907, are Typed Links among Ontology Infons. These directed graphs are Husimi trees, meaning that relations can be established between elements and relationships such as Typed Link Semantic Relation 911 noted between Attribute Ontology Infon 909 and Typed Link Semantic Relation 910.

Solid line indicted Semantic Relations 907 indicate ontological relations dominated by strictly semantic considerations from Distributed Regular Reasoning Processors 106 of the Computing Device 410 supporting the Conventional Reasoning System 505.

Secondary Semantic Relations 906 indicate relations dominated by situational influences, creating relations that would not be apparent in the current art.

The Typed Link Indicator 903 is the same as Typed Link Indicator 705, indicating Typed Links as taught in U.S. Pat. No. 8,751,918. The editing of the Ontology Graph is a means of refining the type. The Typed Link Indicator 903 may have some shape properties that provide additional information as shown by The Typed Link Indicator 3303 of FIG. 33.

It indicates the main relationship link that connects a comprehensive view of the situation to the Ontology Graph. Such a comprehensive view can be the outline illustrated in the Resizable Outline Boundary 701 on the left side of FIG. 7, one of the other views described below or any formal structured model. The Descriptive Source Text 902 is representative of an entry in such an outline view.

The user has several means of editing. In FIG. 9 a specific item has been selected from the Phenotype Selection Menu 904 and dragged for example to Element Ontology Infon item 912, establishing a 'user wired' link indicated by the dotted line User Typed Link Semantic Relation 908. This is an example of adding an element, in this case based on an observed behavior that the neurotransmitter has a specific nature.

Another novel editing technique allows the expert to establish 'semantic distance' among the elements by rearranging all visible items spatially to indicate his/her impression of this local definitional situation. The system will train itself to interpret subtle, subjective and intuitive cues from each expert user. As the user selects any element, the system temporarily displays connected elements to a user-specified depth to allow the user to evaluate the definition and its elements in a larger ontological context.

Other editing mechanisms follow the art of established ontology tools, for example as found in Protégé™ from the Stanford Center for Biomedical Informatics Research.

One use in the described embodiment is as a notebook for experimental teams that uses semantic and situated reasoning to manage evolving formal models that can be exported in publication-ready form or as rich semantic data.

Figure 10:
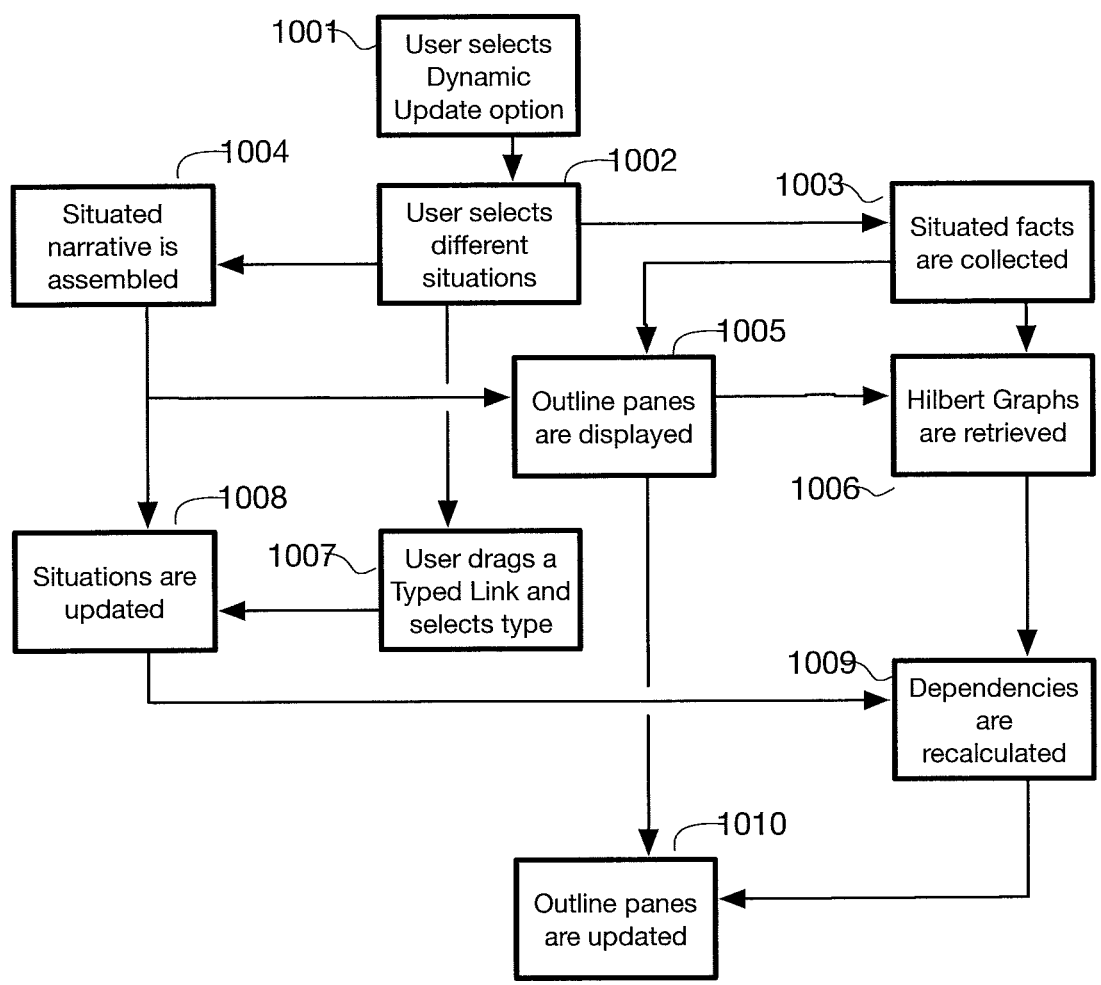
FIG. 10 illustrates examples of steps for relating ontologies.

FIG. 10 illustrates a flow chart of a method for creating Typed Links as an improvement over a novel method taught in U.S. Pat. No. 8,751,918 which connects two elements in different situations and possibly different ontologies by connecting elements across two different outlines. The means illustrated by FIGS. 10 and 11 is by display of a representation of the structured statements as vectors in Hilbert Space. Hilbert Space is widely used in the art, and the methods of creating and displaying vectors in this space are standard. Such vectors are distinct from the Ontology Graphs for example of FIG. 9 with the specification of the vector space being formally specified by the context, here the Distributed Situation Reasoning Processors 104, Wreathing Engine 204, Situation Reasoner 408 and Ontology Derivation System 501.

Application Ser. No. 13/919,751 teaches the use of Hilbert Space vectors in FIGS. 18, 20 and 21 of that disclosure.

The user in this example has information in two ontology spaces that need to be related. An instance may be formal knowledge about the neurobiology of dream behavior in the context of cognitive phenotypes that needs to be bridged with information noted in FIG. 9 associated with cell-level signals. The user advises the system that this operation is desired in Step 1001 and selects the two populated situations in Step 1002. As typical, the two reasoning systems prepare their structures: the Distributed Situation Reasoning Processors 104 prepares the narratives in Step 1004, including at least those in the constituent domains plus the intended bridging process. The Distributed Regular Reasoning Processors 106 collects the relevant facts and their ontological relationships in Step 1003. As before, the outline view is assembled and displayed in Step 1005 and this information is also presented as Hilbert Space vectors in Step 1006 using additional semantic information.

A user can then select an affordance in either an outline view or its associated Hilbert Space view and see it selected in the other. That user can then drag from that affordance to any element in the other situation, either outline, Hilbert Space or other representation. (Some are described below.) The situations are updated in Step 1008, this time calling on more fundamental categoric operations that manipulate semantics. Possibly profound enhancements may occur in the relevant ontologies at Step 1009. The user can now interact with the two joined situations in Step 1010.

Figure 18:
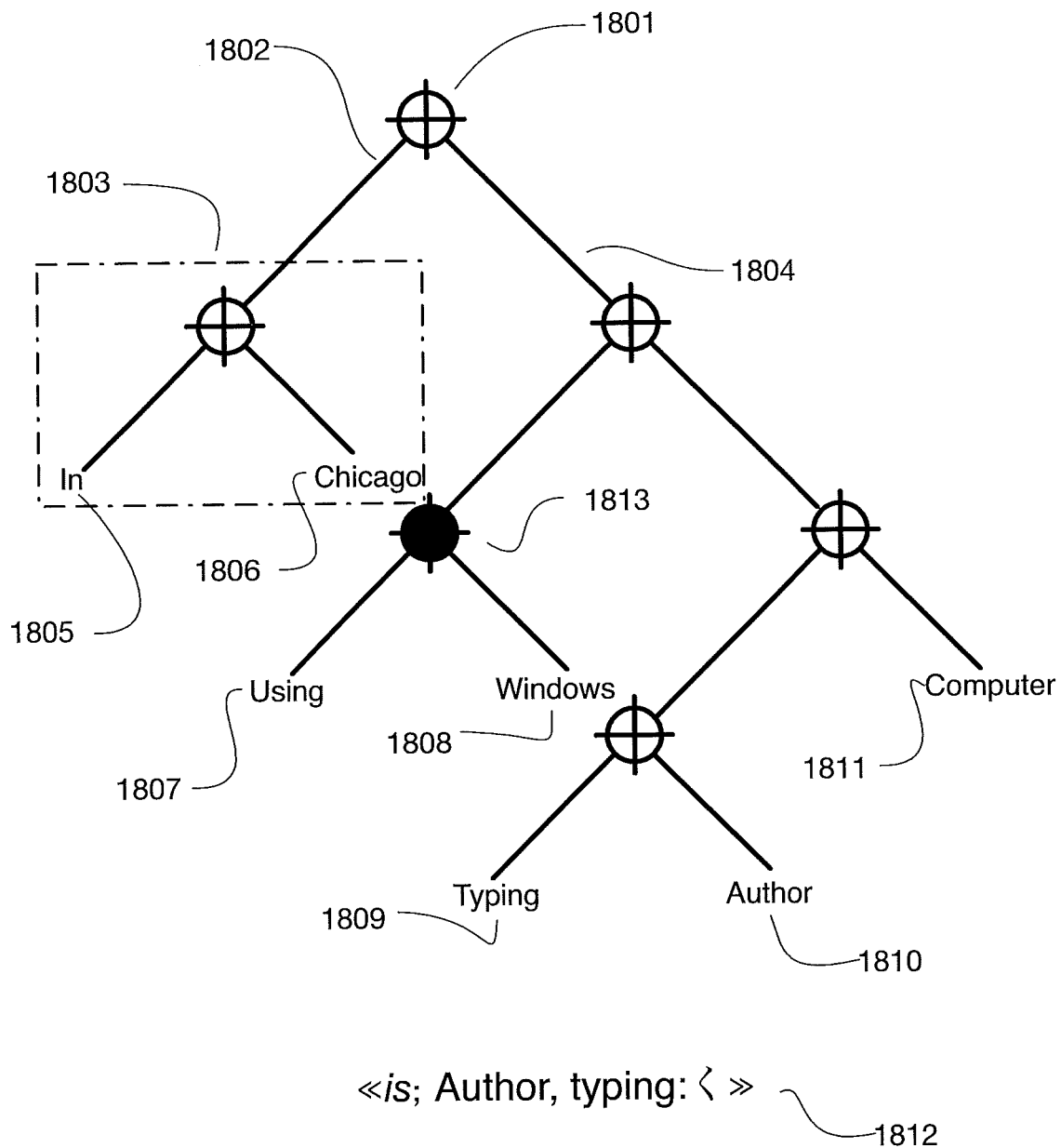
FIG. 18 illustrates an example of infon nesting.

FIG. 11, similar to FIG. 18 of application Ser. No. 13/919,751, illustrates an embodiment of a user interface for such an operation.

A chunk selected by the Resizable Outline Boundary 1101 is similar to 701. It is composed of Information Chunks 1111 and Information Chunk Children 1115. In this example the chunks are expressed as text strings that have underlying infon representations. A standard notation for infons in the art is delineation by double carets as in Topoeisis Infons 1302 of FIG. 13; when infons are represented by their accompanying structured natural language strings, as here in Information Chunks 1111 and Information Chunk Children 1115, they are delineated by single carets.

The chunk selected by the Resizable Outline Boundary 1101 is displayed in a Hilbert Space Visualization 1102. A similar Hilbert Space Visualization 1116 is matched by another chunk selected by a Resizable Outline Boundary 1101 not shown. A Selected Information Chunk 1117 is mirrored in the Selected Vector Information Chunk 1112 and highlights the corresponding item in the paired representation. A user can drag from either the Selected Information Chunk 1117 or the corresponding Selected Vector Information Chunk 1112 to a second Vector Information Chunk 1113 in another Hilbert Space Visualization 1116 creating a Typed Link Indicator 1114 as taught in application Ser. No. 13/919,751 and previously shown. FIG. 11 illustrates relevant affordances as described in FIG. 18 of application Ser. No. 13/919,751. Information Chunk Children 1115 are collapsible and expandable. The Selected Information Chunk 1117 has a similar affordance but enlarged to indicate the chuck (and children) are selected. Alias Affordance 1103 designates whether the Resizable Outline Boundary's 1101 chunk is an alias, having a copy in another location in the outline, allowing for complex lattice flows. Visualization Popup 1104 over the Hilbert Space Visualization 1102 provides visualization options selected for that panel. For example, an Ontology Graph of FIG. 9 may be chosen. Visualization Title 1106 indicates the visualized chunk of the Resizable Outline Boundary 1101

The Hilbert Space presentation contains inspectable Hilbert Space Designators 1105 and a specific Hilbert Space Origin 1107 as the basis for the chunk's first statement. Statement Terminals 1108 delineate the scope of the vector. Vector Nodes 1109 correspond to Information Chunk Children 1115 and the Selected Information Chunk 1117. Subvector Lines 1110 do not correspond to elements of the outline, being an artifact of the vectorization derived from but not directly identifiable from the Ontology Graphs.

The process is supported by the Ontology Graph Display Processors 110.

FIGS. 6 through 11 extend the functions of U.S. Pat. No. 8,751,918, specifically the ability to support ontologically informed narrative situation construction (FIGS. 6 and 7), situated ontology enrichment (FIGS. 8 and 9) and ontology federation (FIGS. 10 and 11).

In the context of U.S. Pat. No. 8,751,918, the computing system of the Computing Device 127, Storage 128, Communicative Connection 129, Network 130 of FIG. 1b supports ontological processing required for the Typed-Link management. In the context of U.S. Pat. No. 8,751,918, the computing system of the Client Computing Device 124, Storage 125, Display 123 of FIG. 1b supports the interactions taught in specifying, navigating, manipulating and using Typed Links. In the context of U.S. Pat. No. 8,751,918, the computing system of the Computing Device 120, attached Storage 121 and is attached by Communicative Connection 122 to a Network 132 of FIG. 1b supports Situated Reasoning in support of the Typed Links. In the context of U.S. Pat. No. 8,751,918, the computing system of the Client Computing Device 117, Storage 118, Display 116 of FIG. 1b supports the automated recognition of Types.

Figure 12:
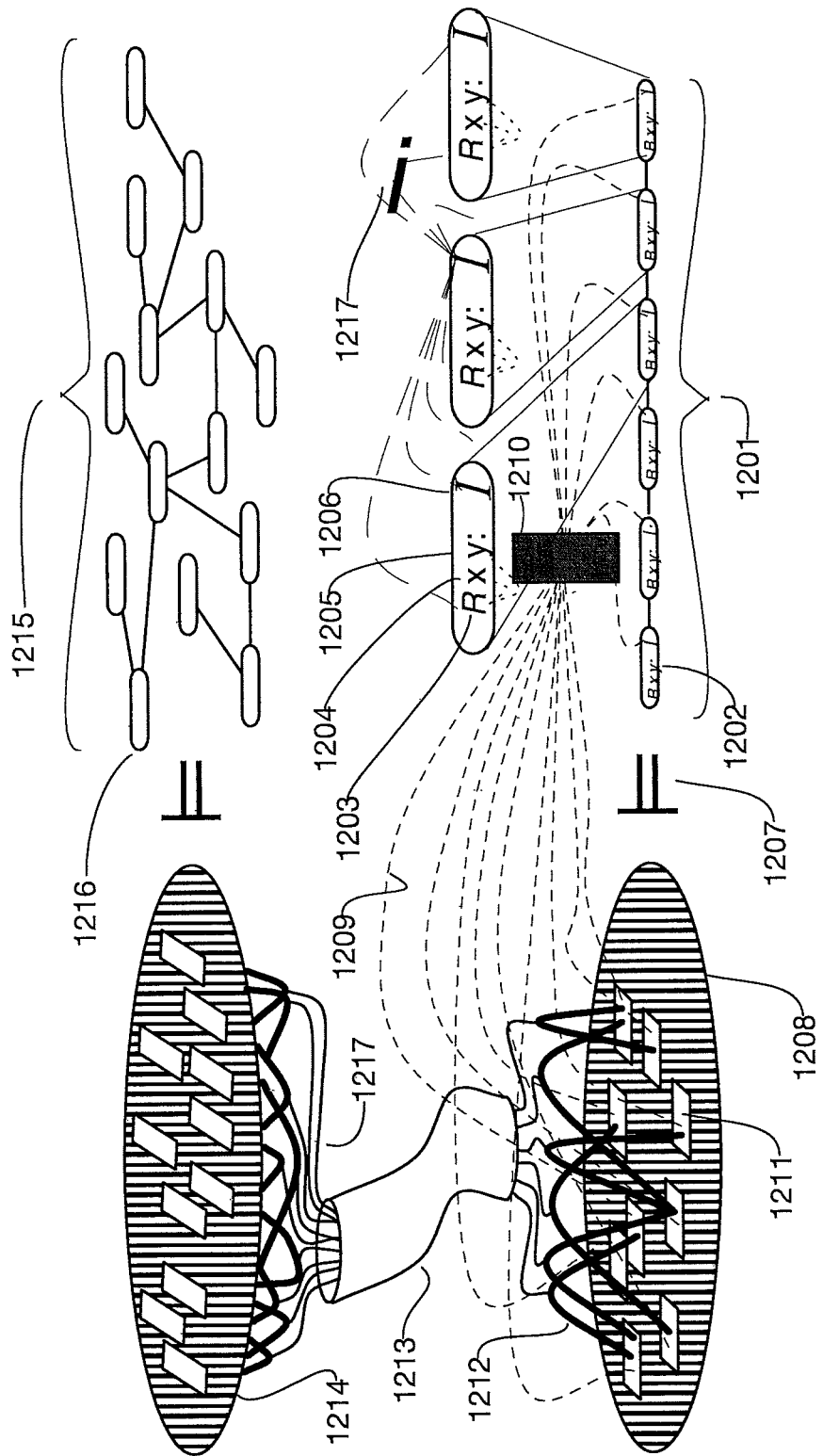
FIG. 12 illustrates examples of topology and functor operations.

FIG. 12 schematically illustrates the relationship among the representations in the system. The specific function illustrated is the fractional mapping of a feature within the context of an emerging situation as taught in U.S. Pat. No. 9,117,167. In that patent, a feature is extracted from an information stream within a local context. The result is termed a 'semantic b-frame.' Described herein is a more general application: the feature may be from a stream, a data pool or a knowledge base.

Infon Sequence 1201 designates a structured collection of infons sequence that is extractable from an information stream, a data pool or a knowledge base. Infons are similar to Resource Description Framework (RDF) triples; many methods exist in the art to structure information of any type as RDF triples and these apply to infons. The Infon Sequence 1201 normally will consist of component infons, following a nesting method described in FIG. 18, extended in this disclosure from FIG. 9 of application Ser. No. 14/740,528.

Component Infons 1202, elsewhere called 'Topoiesis Infons,' consist of an Infon Relation 1203, an Infon Parameter 1 1204, Infon Parameter 2 1205 and an Infon Function 1206 that supports the mapping between the Distributed Regular Reasoning Processors 104 and Distributed Situated Reasoning Processors 106. A Topology Abstraction Process 1210 employs Infon Functions 1206 to map the Infon Sequence 1201 to a category schematically shown as Infon Category 1208. Component Topological Types 1209 are indicated as supporting the abstraction.

The method for extracting the topology of logical statements as categories is well known in the art. In this schematic representation, the Infon Category 1208 consists of Categoric Elements 1211 that are related by Categoric Morphisms 1212. The combination of Categoric Elements 1211 and Categoric Morphisms 1212 captures essential structure of the Infon Sequence 1201 and can be considered an abstract signature. The Supports Symbol 1207 is used in an expression denoting that the Component Infons 1202 represented in the Infon Sequence 1201 on the right 'is supported by' the situation on the left represented by the Infon Category 1208.

The system stores characteristic categories and intercategory dynamics that themselves are stored as categories. An example is shown as Dynamics Reference Category 1214, having the same fundamental structure of elements and morphisms structure. Dynamics Reference Category 1214 is the situation in which the Concept Lattice 1215 is supported. Clever specification of Concept Lattices 1215 can result in a vocabulary of Dynamics Reference Categories 1214 that serve the function of the control group of U.S. Pat. No. 9,117,167 but more generally.

The process described in U.S. Pat. No. 9,117,167 is group theoretic, using a wreath product over fiber bundles. This more general method subsumes wreath products in a more general method of morphisms (as functors) among instances of Infon Categories 1208 and a stored vocabulary of Dynamics Reference Categories 1214 that capture the structure of known dynamics stored in generic Concept Lattices 1215. Concept Lattices 1215 as described in later figures are multipath Topoiesis Infon 1216 structures. Topoiesis Infons 1216, Infon Sequences 1201 and Component Infons 1202 are logically and mathematically congruent.

To make the correlation clear between the categoric operation and the group operation, the figure shows an Example Functor 1213 consisting of Component Functor Morphisms 1217 mapping structure from Infon Categories 1208 to Dynamics Reference Categories 1214 and thence from Infon Sequences 1201 to Concept Lattices 1215.

FIG. 12 thus improves upon U.S. Pat. No. 9,117,167 to deal with any feature type in any situation, hosted by any computing environment supporting the system architecture of FIG. 1.

FIG. 13 is similar to FIG. 4 of application Ser. No. 13/919,751 and FIG. 5 of application Ser. No. 14/093,229. Those disclosures teach the method also described in U.S. Pat. No. 8,751,918 of registering Topoiesis Infon Elements 1302 of Topoiesis Infon 1301 to structures of Ontology Infons 1304 that in the cited disclosures are themselves infons. These structures can be constructed and maintained using conventional Ontology Relations 1306. Application Ser. No. 13/919,751 terms these 'Arrows.'

Note that when more than one Topoiesis Infon 1301 is considered, the Ontology Graphs can have Shared Ontology Infons 1307. In general, infons that are related by experience or narrative have a great many overlaps. Application Ser. No. 13/919,751 teaches a method of managing, processing and displaying these overlaps.

Figure 14:
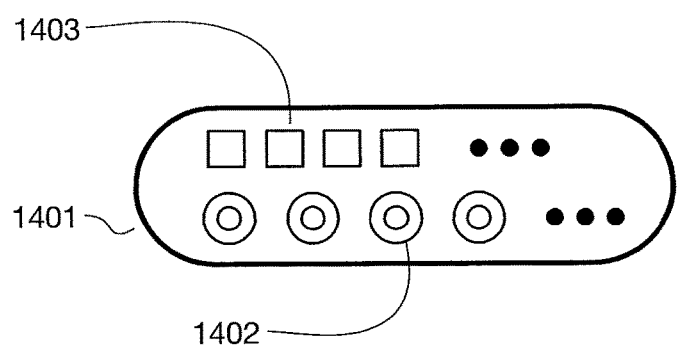
FIG. 14 illustrates an example of a categoric cell.

FIG. 14 is similar to FIG. 5 of that disclosure in which a Cell 1401 comprises a set composed of Infons 1402 (application Ser. No. 13/919,751 terms these 'Points') and Functions 1403 that reference those Infons 1402.

A more general method considers the structures shown in FIG. 13 where each item Infon 1402 is not a simple Topoiesis infon 1301 as taught in application Ser. No. 13/919,751 but also Ontology infons 1307 that when nested with connected Ontology Infons 1304 and Topoiesis Infons 1302 forms a composite infon that captures both the information of the source Topoiesis Infon 1302 plus all the 'semantic connectedness' information among them. The composition method is as described in FIG. 18 here and taught in application Ser. Nos. 14/740,528 and 14/093,229.

When this technique is used, the Cell 1401 becomes an Infon Category 1208 and the Functions 1403 become when combined, the Component Functor Morphisms 1217 that collectively comprise the Example Functor 1213. By this means, the method taught by application Ser. No. 13/919,751 can be extended to any item of information, related to any other and handled in a category theoretic fashion. By means common to the art and enabled by the Curry-Howard correspondence, any structure satisfying the requirements of FIG. 13 can be coded using common functional programming techniques.

The means by which this is supported is schematically shown in FIGS. 15a, 15b, 15c and 15d, with the instance of a known collection of knowledge being enhanced by new knowledge.

Figure 15A:
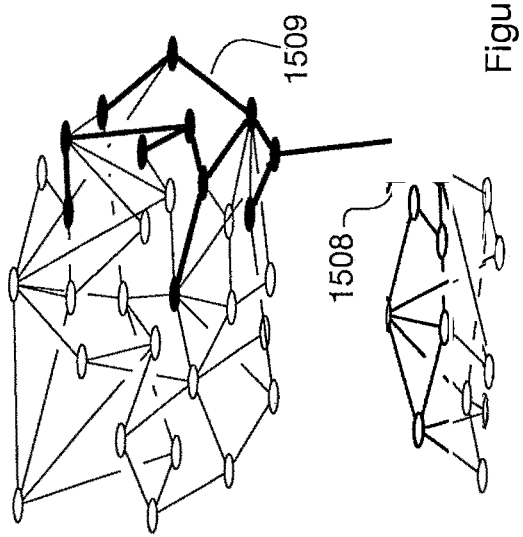
FIGS. 15a, 15b, 15c and 15d illustrate an example of modifying the Concept Lattice.

FIG. 15a shows a Concept Lattice 1502, being a multi-threaded structure composed of Topoiesis Infons 1501 similar to Infon Sequence 1201.

Each infon, infon element and infon constituent (in the case of composed infons) has a discrete Ontology Graph as disclosed in FIGS. 9 and 13. For clarity, two of these are illustrated as Ontology Graphs 1503. Primary Ontology Infons 1504 in the respective Ontology Graphs are colored black and the Primary Semantic Relations 1507 darkened. Other Ontology Infons 1505 are shown in white with their Semantic Relations 1506. Only a few are shown; typically a great many 'background' Ontology Infons 1504 and Semantic Relations 1506. The difference between those in black 1504 and white 1505 is set by the user in a limit on the boundary of interest.

Figure 15B:
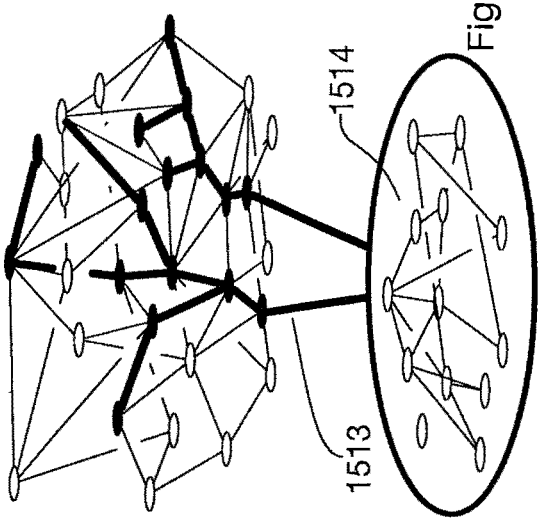

FIG. 15a therefore illustrates a Concept Lattice 1502 of a narrative or situation or model with the Ontology Graphs 1503 of two elements highlighted together with some less relevant background Ontology Infons 1505. FIG. 15b introduces a new fact, a New Topoiesis Infon 1508. It has its own Ontology Graph 1509. As is normally the case, some Ontology Infons 1505 in this new element's Ontology Graph 1509 are shared with those in the Concept Lattice 1502.

Figure 15C:
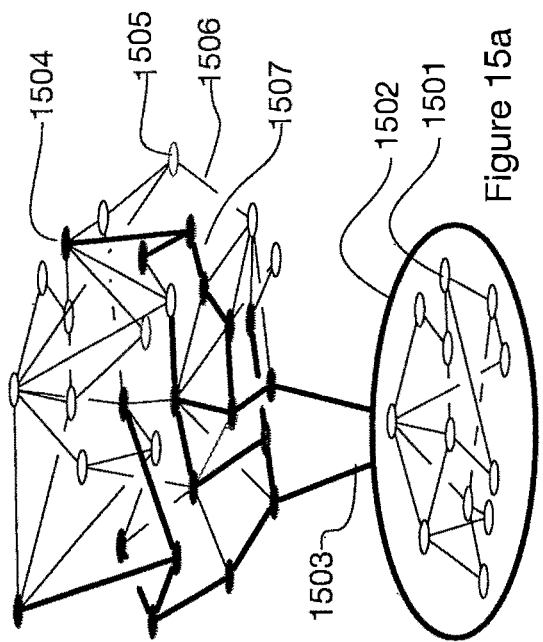

Ontology Graphs 1503, 1509 exert forces on each other, shifting the influence of the Ontology Infons 1505. Thus, the balance of meaning in FIG. 15a will be adjusted as the new forces of Ontology Graph 1509 are incorporated through the Distributed Situation Reasoning Processors 104. This process is schematically illustrated in FIG. 15c. Changes are determined by the Example Functors 1213 as they are calculated. These are shown separately in the upper right of the figure; their effect is illustrated in the influence of the New Ontology Structure 1510 on the now adjusting earlier Ontology Graphs 1503 and 1513.

The Change Vectors 1512 of the Example Functors 1213 can be viewed as a separate structure.

Figure 15D:
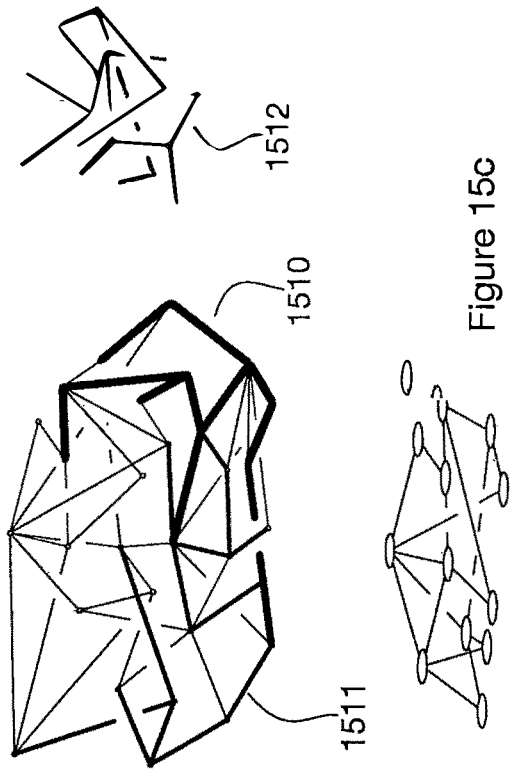

The result is shown in FIG. 15d. The same two Ontology Graphs 1513 are shown as in Ontology Graph 1503 in FIG. 15a, but their contents and structure have been adjusted. Consequently, the Concept Lattice 1514 has been adjusted, reflecting its evolved meaning.

The signals conveyed by each Example Functor 1213 are the 'thunks' taught in application Ser. No. 13/919,751.

Examples of this behavior include the case of collaborative feature recognition across many streaming sources as taught in U.S. Pat. No. 9,117,167. Concept Lattice 1502 in this case represents an instance of an evolving tentative feature composition and Ontology Graph 1511 represents an instance of a continually refining reference feature.

Another example is the case of narrative modeling as taught in application Ser. No. 14/093,229, where Concept Lattice 1502 is the 'story so far' with the New Topoiesis Infon 1508 being the next element of the story for example in text or film.

Yet another example can be found in the case of teaching in U.S. Pat. No. 8,751,918 which can be used for modeling of biological systems. In this instance, Concept Lattice 1502 may be an experimenter's notebook containing knowledge of a specific biomedical system and New Topoiesis Infon 1508 an entry of new experimental information.

Moreover, as taught in application Ser. No. 13/919,751, the lattice of Concept Lattice 1502 may be a network of processing code as functions, with New Topoiesis Infon 1508 a new function, algorithm or monitor.

Figure 16C:
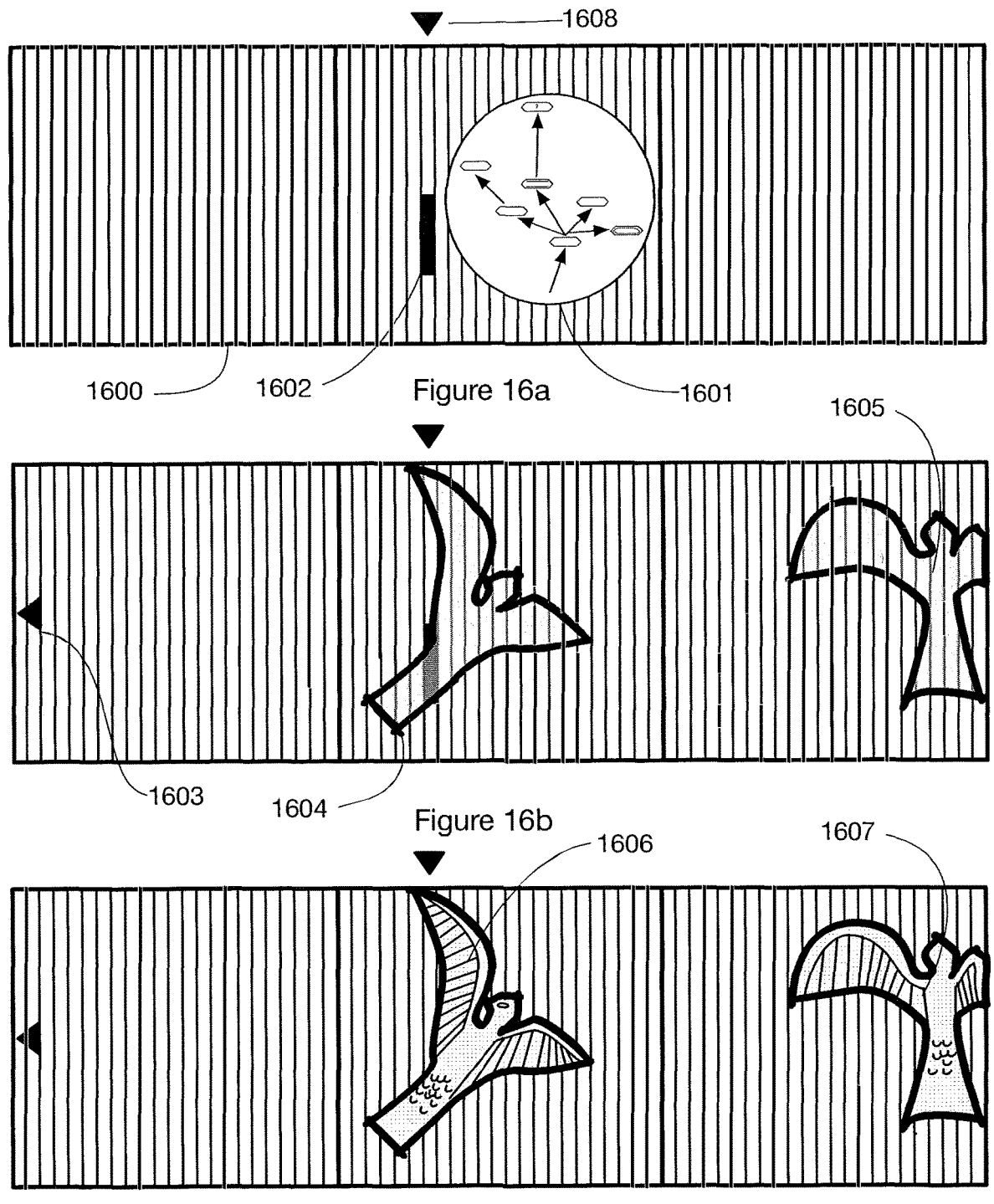

FIGS. 16a and 16b are based on FIG. 10 of application Ser. No. 14/740,528, wherein is taught the ability to mix spatial and temporal annotations on a compact, navigable representation of a film. FIGS. 16a and 16b illustrate different representations of an object in space. A space-time representation of a film Space-Time Strip 1600 has a selected location indicated by Location Marker 1608, being the location that contains the object. When selected, the area that object occupies in the Space-Time Slice 1602 (application Ser. No. 14/740,528 terms this an 'Object' or 'Area') can be highlighted, perhaps by scintillation of the pixels involved.

Optionally, a cartoon or other reduced representation of the entire object, here an Eagle 1604, can be shown as it exists in the frame selected by the Location Marker 1608. As the time selection of the film advances or reverses, the object's representation animates within the frame, and optionally within another Space-Time Frame 1605 (application Ser. No. 14/740,528 terms this a 'Location'), or offscreen as indicated by an Affordance 1603 (application Ser. No. 14/740,528 terms this an 'Object). Alternately, the Full Fidelity Eagle 1606 and Later Full Fidelity Eagle 1607 can be animated.

Such objects are readily identified and placed as taught in U.S. Pat. No. 9,117,167. If by this or similar means, then a situated Ontology Graph exists for each instance of that object, changing as situations evolve through the narrative of the film. A novelty in FIGS. 16*a* and 16*b* is the ability to view the Ontology Graph within the Space-Time Strip 1600 and manipulate its meaning and its Hilbert Space sibling as previously described in the outline view in FIGS. 9 and 11.

Figure 17:
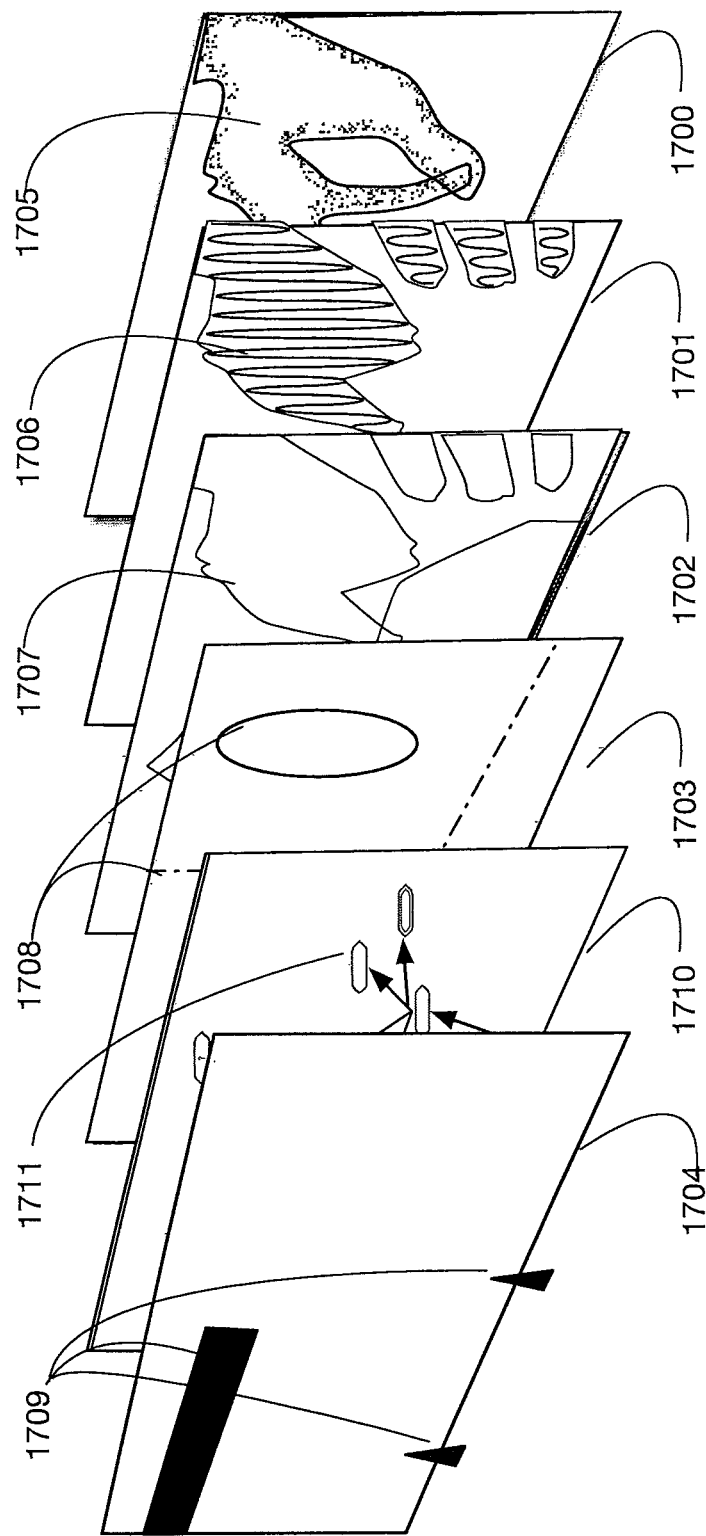
FIG. 17 illustrates examples of layers of a Space-Time view.

FIG. 17 expands FIG. 9 of application Ser. No. 14/740, 528, adding the Concept Lattice Layer 1710, supplementing the presentation layers in the described embodiment of application Ser. No. 14/740,528. The film images are on a Film Layer 1700, displaying in part an object, in this case a Hand 1705. Semantic Frame Layer 1701 contains the Semantic Frame 1706 extracted as taught in U.S. Pat. No. 9,117,167 and there called a 'semantic B-frame' to emphasize the ability to employ compression artifacts. Outline Layer 1702 draws the Outline of the Object 1707, from either Space-Time Slice 1602, Eagle 1604 or Full Fidelity Eagle 1606.

Semantics Layer 1703 contains displayable physical metadata Object, Object Path and Environmental Notation 1708 about the object or environment, such as implied mass, movement and intent. This will have been deduced by processes such as those discussed in FIG. 12 and taught in application Ser. No. 13/919,751.

Concept Lattice Layer 1710 contains the Concept Lattice 1711, enriched by the semantic information as Ontology Graph or Hilbert Space representation as described in FIGS. 9, 11 and 13.

Temporal Annotation Layer 1704 contains Temporal Annotations 1709 as taught in application Ser. No. 14/740, 528.

FIG. 18 is derived from FIG. 14 of application Ser. No. 13/919,751, wherein is taught a method of infon nesting and parsing. A new ability to drag semantic elements to reassign meaning is taught in our FIGS. 8 through 11. This same underlying ability allows us to reregister semantics when displayed in this nesting graph. Such a nesting graph is the Topoiesis Infon equivalent of the Ontology Graphs among Ontology Infons.

An example initial chunk of information is 'An author is typing in Chicago.' One Component Topoiesis Infon 1812 is captured in the diagram as Component Topoiesis Infon 1809 and Component Topoiesis Infon 1810 joined at an 'is' node. Enclosing infons can capture the explicit situation that the 'author' (1810) 'is typing' (1809) 'on a Windows™' (1808) 'computer' (1811) and is 'in Chicago' (1806). The Nested Infon 1803 combines the components to mean 'in Chicago'.

In this example, all Nodes 1801 are the 'is' relation. Any Node 1801, 1805, 1807,1809, 1810, 1811 with its Leading Links 1802, 1804 is a Topoiesis Infon 1803, which for example captures the notion that 'someone is in Chicago'.

Application Ser. No. 13/919,751 teaches the central nature of this nesting in building the functional reactive fabric of the system. An added novelty in FIG. 18 is that the user can select a Node 1813 and reassign it within the graph wherever logical dependencies allow. A user may wish to perform a reassignment to adjust 'semantic distance' by changing the nesting to present the more relevant facts as foremost leaves. For instance, if a forthcoming fact is of a physical disaster, it may be more significant that the subject is in Chicago than she is using a Windows' computer.

This nesting view is substitutable for any of the semantic views. Thus, a user can modify semantic structures by the Futures View of FIG. 7, the Ontology Graph view of FIG. 9 (and FIG. 19 of application Ser. No. 13/919,751), the Hilbert Space view of FIG. 11 or the nesting view of FIG. 18. These can be in the context of an outline as in FIGS. 7 and 11, the Space-Time Scrubber of FIGS. 16*a* and 16*b* or the Concept Lattice of FIGS. 15*a*, 15*b*, 15*c* and 15*d* and described more fully below in FIGS. 19*a*, 19*b*, 26 and 27.

FIGS. 19*a* and 19*b* illustrate a Concept Lattice 1901. The method of constructing and using such is taught in application Ser. No. 14/093,229; FIG. 37 from that disclosure is the source. On the right in FIG. 19*b*, the Concept Lattice 1901 is displayed. Each Topoiesis Infon 1911 is a structured infon, typically with nested information as described in FIG. 18. The Concept Lattice begins at the Originating Topoiesis Infon 1903 in terms of sequence. Connectives 1904 are logical connectives, typically of the 'and-then' type. In one embodiment, the Governing Path 1905 is drawn darker. The quality of governance is taught in application Ser. No. 14/093,229. FIG. 19*a* illustrates a simple extraction of categoric structure of the Concept Lattice, using a skeletal lattice Half-Dual 1902 as an example. In this case, lines and nodes are converted to each other. For example, Node 1907 labelled '12-15' is derived from the Topoiesis Infon 1910 that connects nodes numbered 12 and 15 in the Concept Lattice 1901. Connective 1906 is derived from Topoiesis Infon 1911 numbered 14.

The relationship of Concept Lattice 1901 and Half-Dual 1902 is the same as Infon Sequence 1201 and Infon Category 1208 in FIG. 12.

A new novelty is that users can directly reassign nodes in the lattice by selecting a node, here illustrated as Selected Topoiesis Infon 1908, 1909, and dragging it and connecting links to another location in the lattice or copying or moving to a location in another lattice. This can be combined with other views and semantic editing modes as previously described.

Figure 20:
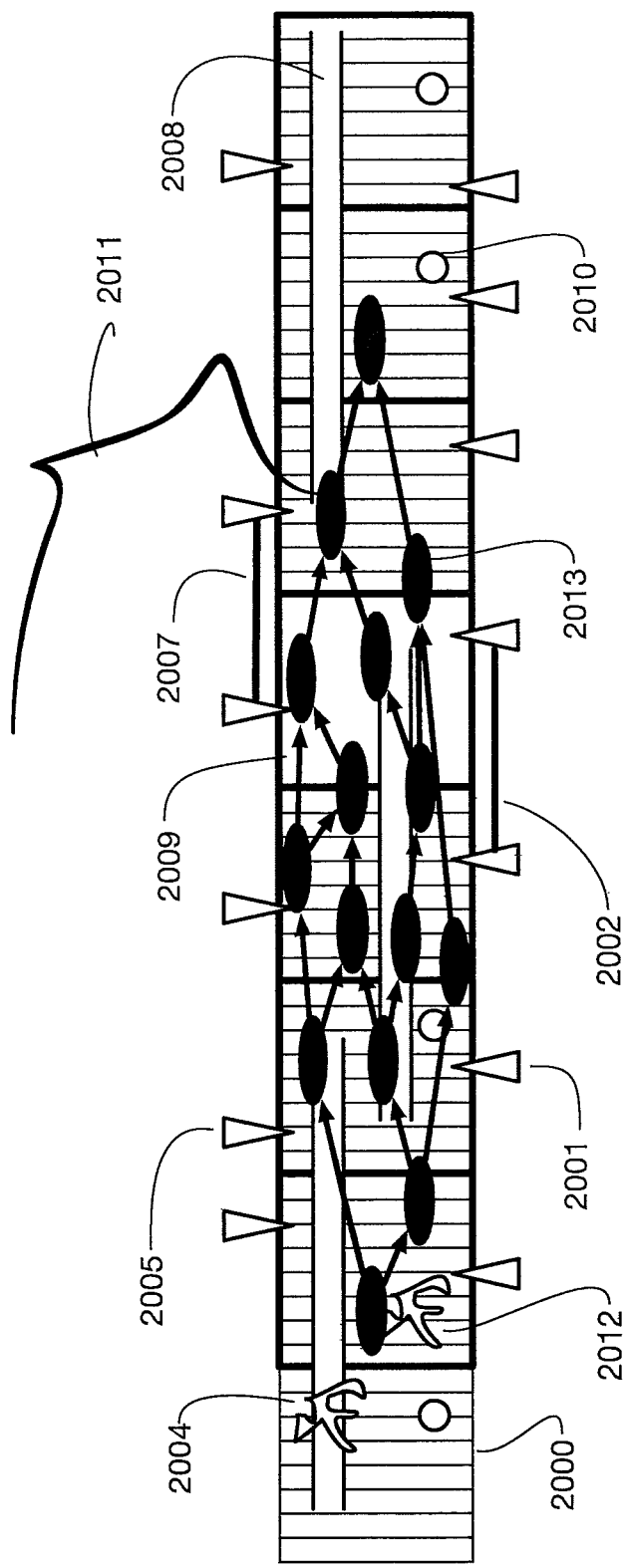
FIG. 20 illustrates an example of a Concept Lattice on a Space-Time view.

For example, FIG. 20 imposes a Concept Lattice of the type shown in FIG. 19*b* on a Space-Time representation as illustrated in FIGS. 16*a* and 16*b* and taught in FIG. 7 of application Ser. No. 14/740,528. Each node, a Topoiesis Infon 2013 in an instance of a Concept Lattice 2009 corresponds to a point or span of time. Each video or stream slice in the Space-Time Strip 2000 also corresponds to a moment. The Topoiesis Infons 2013 are matched to the relevant Space-Time Slices 2004, Temporal Annotations 2008, Marked Timespans 2002, Script Times (absolute times in the story or described model, separate from the description) 2007, Precise Times 2005, Spatial Annotations 2012, other Markers 2010, 2001 or via a Typed Link Indicator 2011 to a location in one of the other representations described above.

Figure 21:
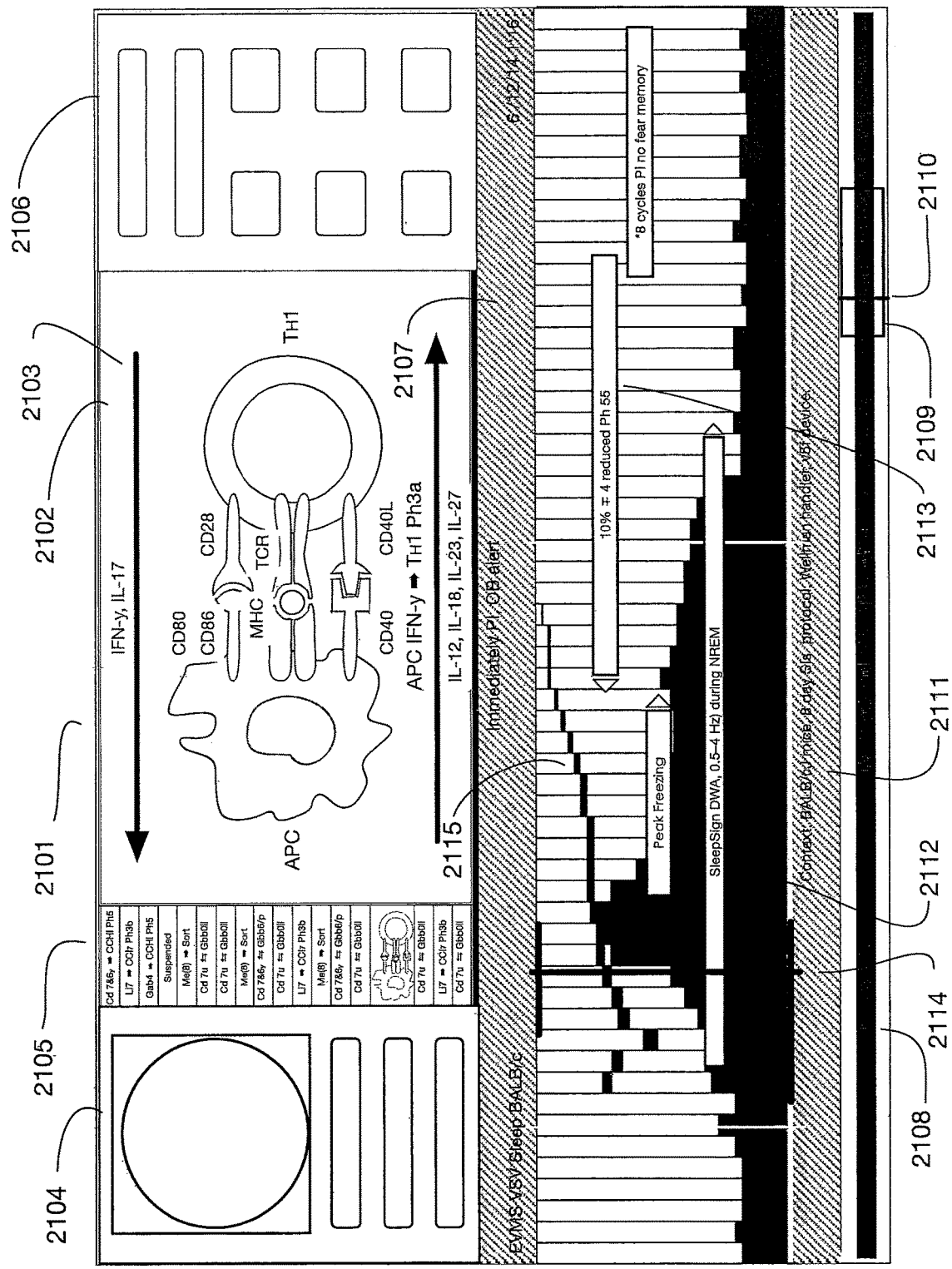
FIG. 21 illustrates an example of an annotated Space-Time view.

FIG. 21 illustrates a User Interface 2101 incorporating the Space-Time Strip 2000, the same as 1600 as taught in application Ser. No. 14/740,528 with associated information. The example is from a biological systems model. The bottom part of the user interface is dominated by the Space-Time Strip 2115. An area immediately above, a Text Annotation Area 2107 contains metadata associated with the model and the selected instant. That instant is marked by a Location Bar 2114.

Under the Space-Time Strip 2115 is a Second Text Annotation Area 2111 with user-editable notes keyed to temporal location. A Scrubber 2108, here shown as a black bar functions as a traditional scrubber; an Indicator Rectangle 2109 indicates the zone of the process visible in the displayed Space-Time Strip with a small Location Bar 2110 mirroring Location Bar 2114.

The described embodiment shows Upper Area Controls 2106 and the Lower Area Controls 2104. The upper area is dominated by a Key Frame 2102 that contains the detailed model of what is happening at that instant. These are visual representations of a Topoiesis Infon 1911, 2033 of a Concept Lattice. This is an editable field. A biological process is displayed and edits can be made using a coherent visual grammar that is an intermediary with the more abstract Ontology Graph.

Because many threads of the Concept Lattice may be active, a Selection Zone 2105 allows the user to choose which thread to examine. A Control 2103 allows the user to go forward or back in that single thread. Temporal Annotations 2113 can be keyed to these threads as a surrogate for the Concept Lattice overlay of FIG. 20.

An extension of the Space-Time Strip 2115 taught in application Ser. No. 14/740,528 is the ability to display quantitative information associated with a Space-Time Slice as graphs. Two bar charts are illustrated, one with black bars measured from the bottom, Bar Chart 1 2112 and another measured from the top, Bar Chart 2 2115 with variation shown in black.

Figure 22:
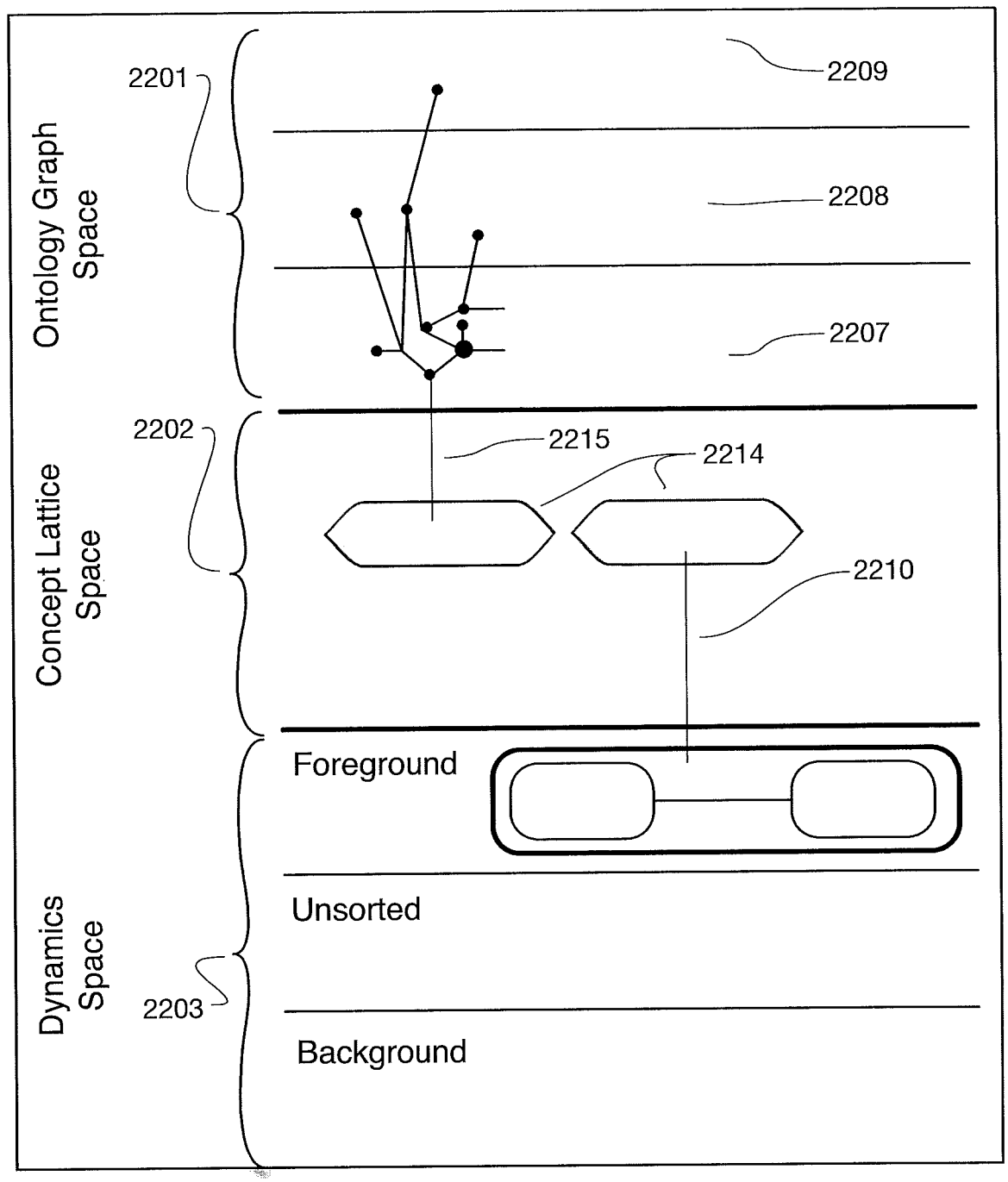
FIG. 22 illustrates an example of an Ontology Graph on a Narrative Model.

FIG. 22 is similar to FIG. 7 of application Ser. No. 14/093,229 which teaches a method of modeling the dynamics associated with a Concept Lattice 1901. Key elements of that disclosure are three zones in the graphical language.

A Central Zone 2202 in the embodiment disclosed in application Ser. No. 14/093,229 contains elements identical to the nodes of the Concept Lattice, without necessarily displaying the structure, though the Concept Lattice can be superimposed on this field. The Central Zone 2202 displays the Topoiesis Infons 2214 in one of their display modes. The Central Zone 2202 thus is the Concept Lattice Space.

An Upper Zone 2201 models the influence of the Ontology Graphs 2215 of FIGS. 9 and 13, connected from Topoiesis Infons 2214. FIG. 22 adds the ability to explicitly display an editable field. Shown is the Ontology Graph 2215 spanning successively more primitive Ontology Zone 1 2207, Ontology Zone 2 2208 and Ontology Zone 3 2209, but other editable fields can be displayed: the visual grammar of the Central Zone 2102 if the domain allows one; a Hilbert Space view of FIG. 11; a nesting view of FIG. 18; or a cross-ontology outline of FIG. 7. The Upper Zone 2201 is therefore the Ontology Graph Space.

The Lower Zone 2203 tokenizes the topology of the Example Functor 1213 and Change Vectors 1512 and is also editable, being a window into the Distributed Situation and Situation Dynamics Store 112. The editor may use an interface disclosed in FIGS. 38, 39 and 40 of application Ser. No. 14/093,229 which can be superimposed on this field. The Lower Zone 2203 is thus the Dynamics Space where the work of the Distributed Situation Reasoning Processors 104 is visualized as described in application Ser. No. 14/093,229.

Figure 23:
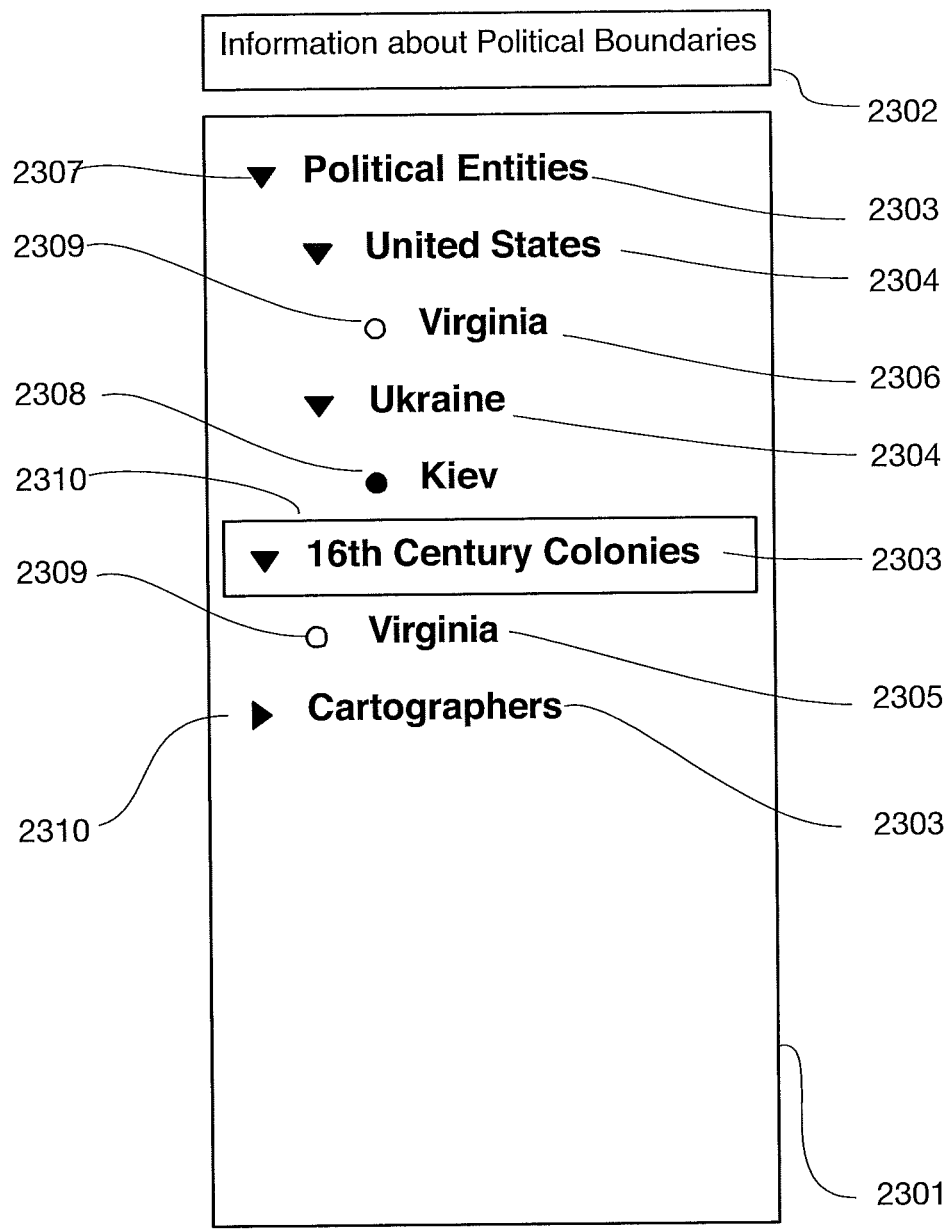
FIG. 23 illustrates an example of a text outline.

FIG. 23 is derived from FIG. 16 of application Ser. No. 13/919,751 which teaches an Outline Segment 2301 with an Assignable Governing Situation 2302 (Similar to Visualization Title 1106), Parents 2303 and Children 2305, 2306. Some chunks are both Parent and Child 2304. A Hollow Affordance 2309 designates an alias, compared to a Solid Affordance 2307, 2308

One novel extension is the ability to select a Selected Chunk 2310, collapsed or not, and reassign it in the outline as parent or child, with all the nesting reassignments of FIG. 18 performed automatically using the Ontology Graph governance taught in FIGS. 12 and 15.

Figure 24:
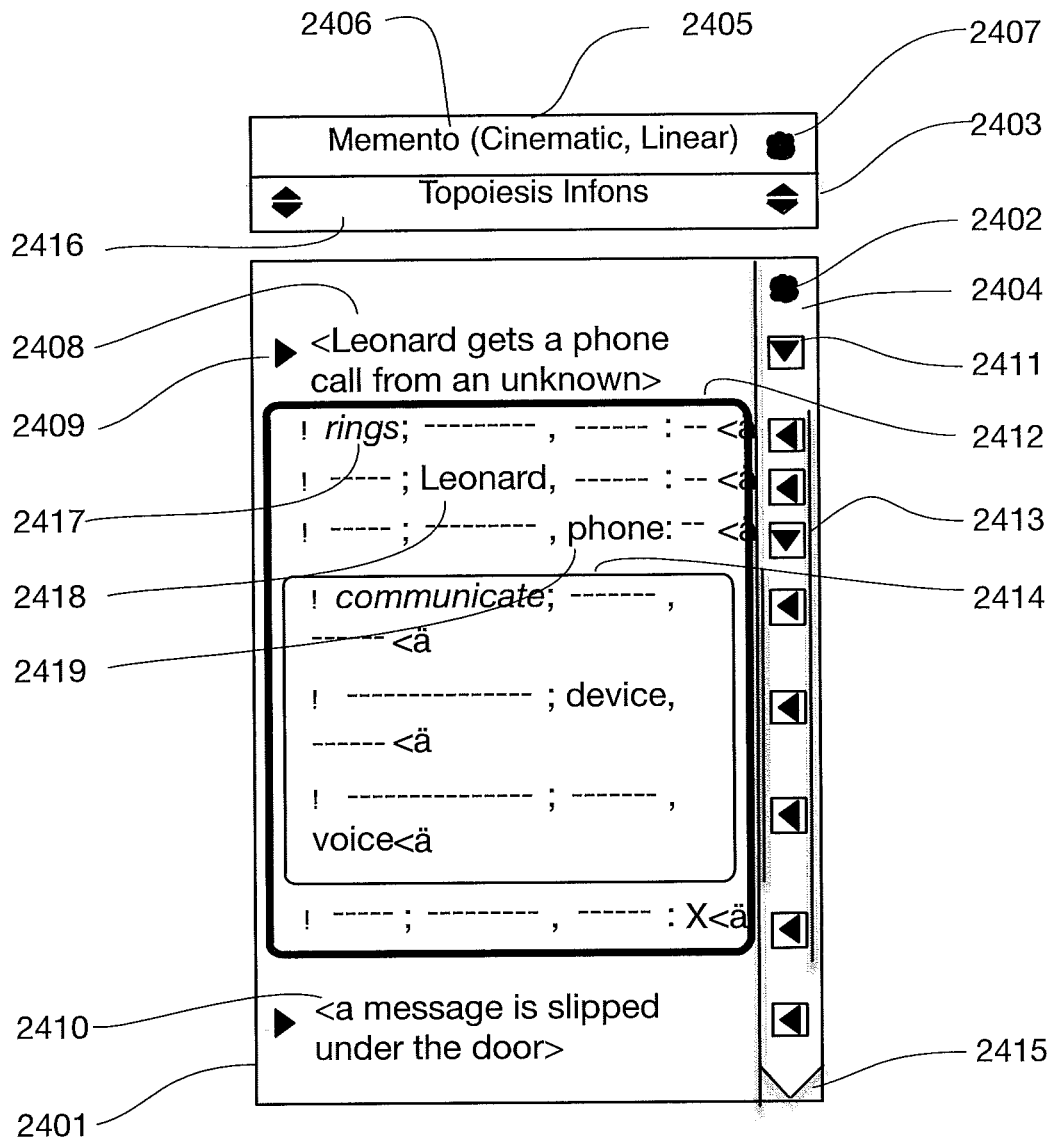
FIG. 24 illustrates an example of an infon outline.

FIG. 24 illustrates a similar Outline 2401, derived from FIG. 17 of application Ser. No. 13/919,751. In this case, the Outline 2401 is used to display the infon nesting of FIG. 18 directly and provide richer affordances for associated views such as illustrated in FIGS. 7, 9, 11, 13, 16, 18, 19, 20, 21 and 22, but not limited to those.

In this case the representation is between the natural language of outlines as illustrated in FIGS. 7 and 23 and the Topoiesis infons 1216, 1301, 1803 of FIGS. 12, 13 and 18. The representation is as discussed in FIG. 11, consisting of Topoiesis infons expressed as structured natural language.

The upper right of the Outline 2401 contains an Option Control 2402, which if not activated appears alone with no controls below it. If activated, a popup menu (not shown) provides for allowing the appearance of the Label Field 2403 and/or the Infon Control Gutter 2404

The Label Field 2403 has two zones. The Top Zone 2405 contains the Field Name 2406. This Field name serves the purpose of advising collaborating users on the contents of the information in short form. The zone contains an expanding Name Option Popup 2407 which displays a popup inspector (not shown) that has more detailed information about the contents. For example, the more detailed information may include a longer description, the source, the storage, the trustworthiness, the age and so on.

A second zone contains the Option Popup List 2416 (list not shown) to select the nature of the outline display. When this is selected, each entry in the main outline is displayed in single carats, being a natural language expression of the fact. Parent 2408 is such a fact. Its outline control, the Disclosure Triangle 2409 indicates that there is more detail. In this example, the entry 'Leonard gets a phone call from an unknown' is a scene in a film and children of that entry may provide details about plot, cinematic expression and any other desired annotation.

Outline Chunks 2408 and 2410 in the figure are sequences in a narrative construction, so that interpretations in the Ontology Graph of any one entry or its children can affect the Ontology Graphs of all other entries, as previously described. In this case the Option Control 2402 has been toggled to display the Infon Control Gutter 2404 which contains controls.

A Disclosure Triangle 2411 when pointing to the left indicates that no detail of the infon is displayed. The Disclosure Triangle 2411 here has been turned down by clicking to display detail of the Outline Chunk 2408 which displayed in natural language form This can be changed to display in formal Topoiesis Infons.

In the figure, an entire panel is expanded contained in an interior Field 2412 illustrated here as a rounded rectangle. It contains four entries, one each for each of the four elements of the Topoiesis Infon, the Relation 2417 (in italics), Parameter 1 2418, and Parameter 2 2419. Each of these is displayed on its own line with its own disclosure triangle; each can be expanded to inspect their internal structure.

Parameter 2 2419 'phone' has been expanded, as shown by the Disclosure Triangle 2413. This has exposed the first tier Ontology Infon in the Ontology Graph. Typically several Ontology Infons will be opened for each expanded Topoieisis Infon component (relation or parameter). Ontology Infons have three constituents, each displayed on its own line and enclosed in a Child Enclosure 2414.

Any number of elements can be simultaneously expanded. If the Outline Segment 2401 is not large enough for the expanded items, the Infon Control Gutter 2404 doubles as a scroll bar. The figure illustrates that there is content out of view at the bottom of the Outline Segment 2401 with the Arrow 2415. Should the content be scrolled in a way that unviewed material is off the top of the Field, then Option Control 2402 will be replaced with the upward twin of the Arrow 2415.

Topoiesis Infons can in this manner have their Ontology Graph be fully explored.

Any entry on the graph that appears in two linkage paths is displayed as an alias. One novel use of this view is to arrange a collection of facts under headers by dragging and dropping, perhaps from other Fields or linking from other Fields as described below. In that case, the user will have a number of sequential facts as Topoiesis Infons each under a header. For example, by selecting 'Hilbert Space' from the Name Option Popup 2407, the outline view can be replaced by one in which each Outline Header 2409 generates a vector from the children under it.

These are seen as Topoiesis Infon statements. Each of these expressions generates the vector. The collection of such vectors displayed in the Outline Segment 2401 defines a Hilbert Space as described in FIG. 11 in which all the defined vectors are well behaved.

A novel extension to application Ser. No. 13/919,751 is the ability to select a Selected Child Enclosure 2412, and reassign it in the outline as parent or child, with all the nesting reassignments of FIG. 18 performed automatically using the Ontology Graph governance taught in FIGS. 12 and 15. updating in real time.

FIGS. 25 through 35 illustrate new capabilities using principles of U.S. Pat. Nos. 8,751,918; 9,117,167; application Ser. No. 13/919,751; application Ser. No. 14/740,528 and application Ser. No. 14/093,229, and the display of those capabilities using Concept Lattices as the primary visual grammar.

Figure 25:
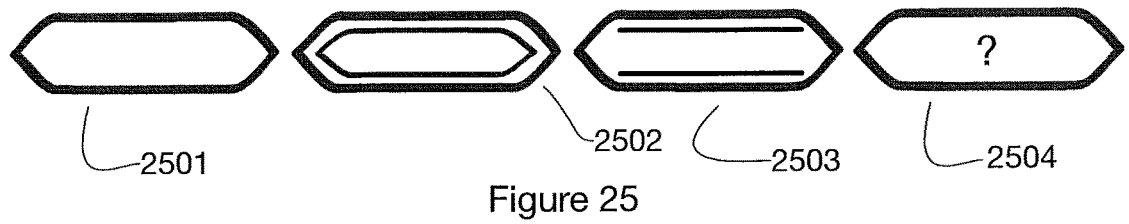
FIG. 25 illustrates examples of Concept Lattice nodes.

FIG. 25 illustrates four node types that present Topoiesis Infons found in common Concept Lattices. The types expand the capability of Concept Lattices as known in the art. The new capability results from the ability to reason over the open world afforded by Situation Theory. The implication is that useful reasoning will occur over nodes that are partially or totally unknown.

A Primitive Infon is displayed as 2501. The definition of primitive varies by user, domain and application. A primitive is the deepest component that concerns the user. For example, a primitive for a biomedical researcher may be 'a-helical CRH9-4' 909 of FIG. 9.

A nested infon where all the internal components are known and stored as illustrated in an Ontology Store 205, an Information Server 303, an Ontology Store and Reasoning System 404 and Ontology Structures 508 is represented by Nested Infon 2502. A novel feature of embodiments of the invention is the central use of Situation Theory which allows the use of infons with internal nesting that contains unknown elements. This is denoted by Unknown Element Infon 2503. Unknown elements in this case include items that are knowable and unknowable. Unknown Element Infon 2503 only applies when unknown component items are suspected; our use of Situation Theory presumes that fully explicit Nested Infons 2502 are likely to contain unknown or unresolved components.

Infons or infon constructions whose existence is known but whose information is wholly unknown are denoted by Unknown Infon 2504. Collectively, Unknown Infons 2504, Unknown Element Infons 2503 and Nested Infons 2502 comprise a set known as Soft Infons.

Figure 26:
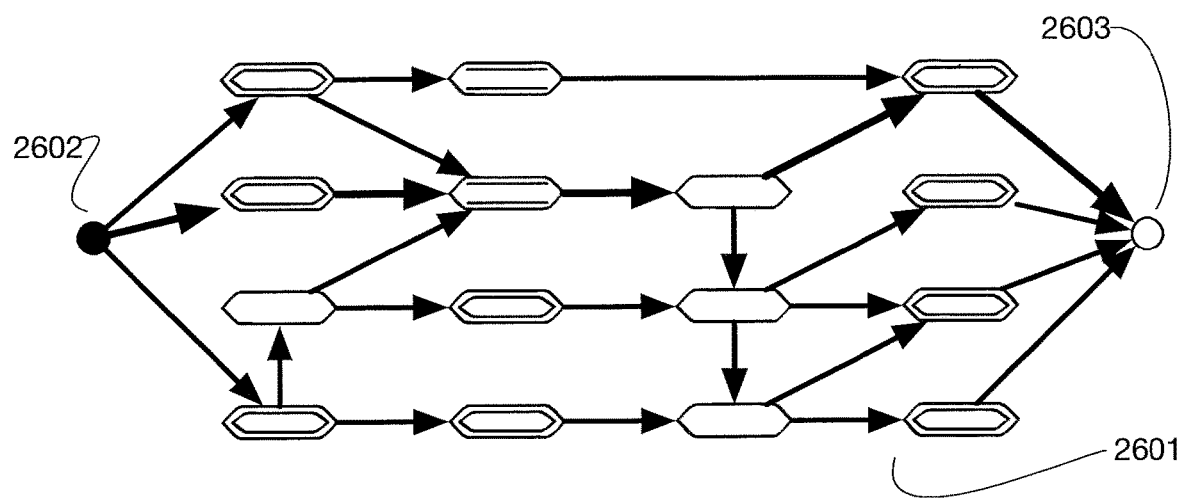
FIG. 26 illustrates an example of a Concept Lattice.

FIG. 26 illustrating a Concept Lattice 2601 is identical in nature to FIG. 19b and FIG. 37 of application Ser. No. 14/093,229 but with the 'soft' infons of FIG. 25. It represents what in application Ser. No. 13/919,751 is called the Functional Reactive Fabric. Beginning Topoiesis Infon 2602 is the beginning of the narrative, process or other sequence of interest with End Topoiesis Infon 2603 the current state 'caused' by the predecessor infons and infon structures.

Figure 27:
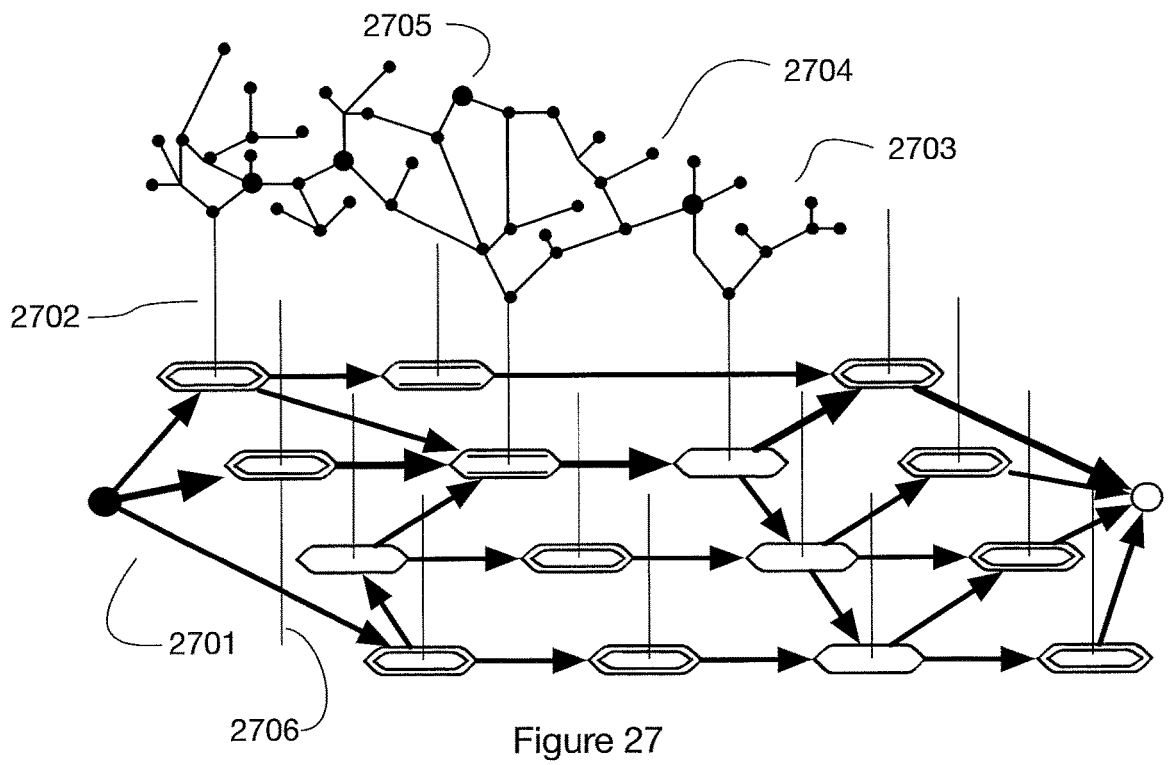
FIG. 27 illustrates an example of a Concept Lattice with Ontology Graphs.

FIG. 27 is the same Concept Lattice 2701 as in FIG. 26 but tilted and some associated Ontology Graphs 2703 connected via Ontology Reference Links 2702. The displayed Ontology Graphs 2703 are notional; a more useful diagram would have many more nodes and threads in the Concept Lattice 2701. Only some representative Ontology Graphs 2703 are shown. The depth of concern in an Ontology Graph 2703 is set by the user or determined by the system based on its understanding of the user's situation. Some elements within the determined or specified scope of the Ontology Graphs 2703 are Unshared Infons 2704 or Shared Infons 2705. Sharing can occur on a massive scale within Ontology Graphs 2703 of a significant percentage of Topoiesis Infons referenced by the Concept Lattice 2701.

Productive visualizations have between 34 and 39% of Topoiesis Infons sharing infons at the third and fourth level of ontological depth.

FIG. 27 illustrates the relationship between Topoiesis Infons and Ontology Infon sharing, but it also the basis of a user interface elaborated in later figures. As a user interface, it has the ontology space 'above' but can also support by connectives 'below' Other View Connectives 2706, one of the other views noted in previous figures.

Figure 28:
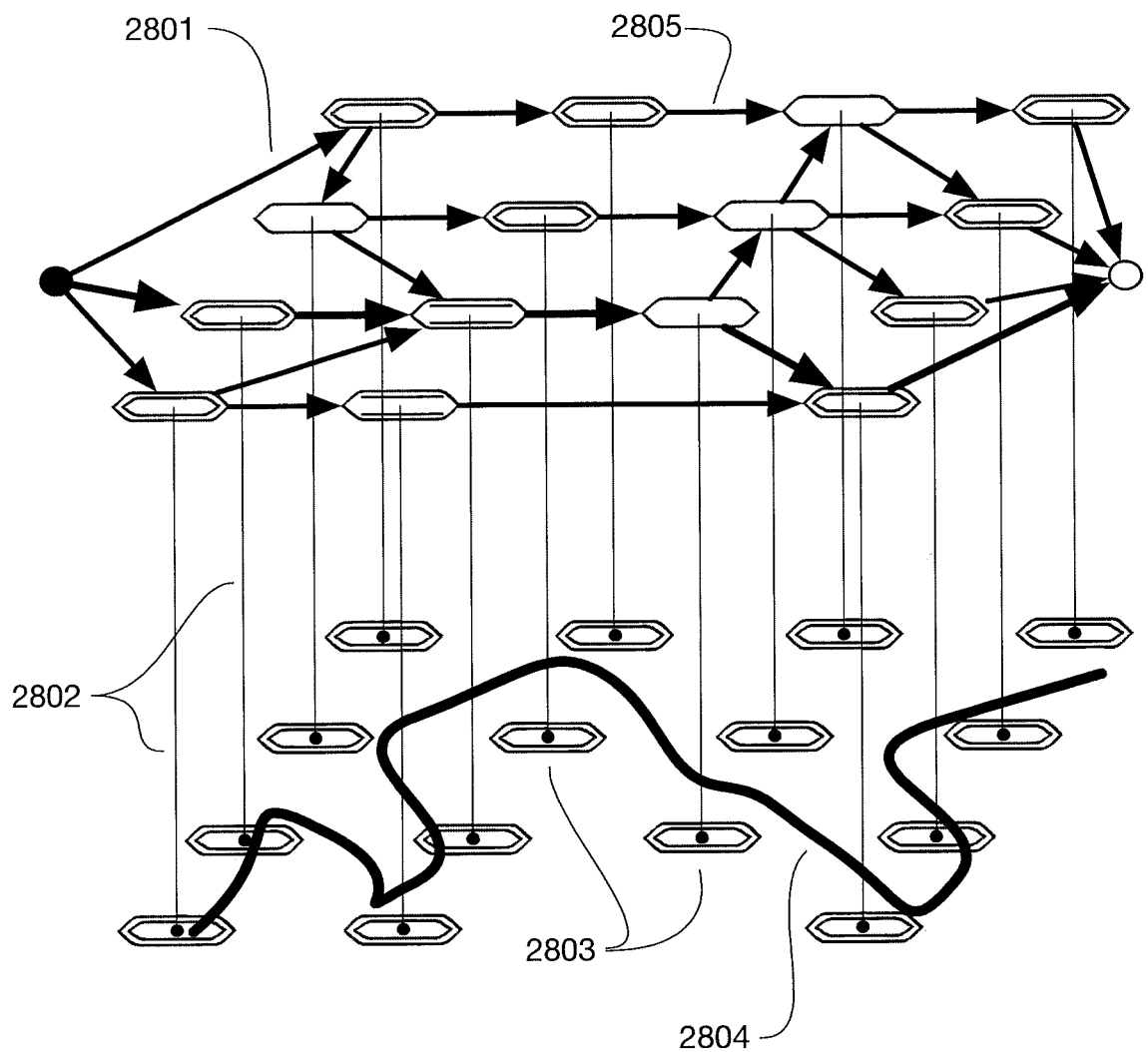
FIG. 28 illustrates an example of a Concept Lattice with Governing Influence.

FIG. 28 illustrates a new user view that can be supported in conjunction with the Concept Lattice 2801. Other View Connectives 2802 are the same as Other View Connectives 2706. Infons and Nested Infons are projected onto a new plane. In FIGS. 26, 27 and 28 the layout of the Concept Lattice has been structured on a grid using techniques that are common in the art and designed to minimize distance and avoid crossing lines. The Projection 2803 below removes the Connectives 2805 and introduces a new feature. The Governing Influence 2804 is the dominant line of semantic connection among the connected Ontology Graphs. The generation of the Governing Influence Line 2804 is taught below.

FIG. 28 presents the Governing Influence 2804 as a line, but any number of visualizations are possible, conveying densities and flux. This Governing Influence 2804 imparts significant information about the system modeled in 2801, indicating both the flow of governing influence and signal paths.

The second sorted reasoning system taught in U.S. Pat. No. 9,117,167, application Ser. No. 13/919,751 and application No. /093,229 reasons in large measure about the topology of the system, a key feature of which are flows such as the Governing Influence 2804. In other words, the Example Functors 1213 supported in the system illustrated as Distributed Situation Reasoning Processors 104, Wreathing Engine 204, Situation Reasoner 408 and Ontology Derivation System 501 are themselves categories with internal morphisms and symmetries.

Figure 29:
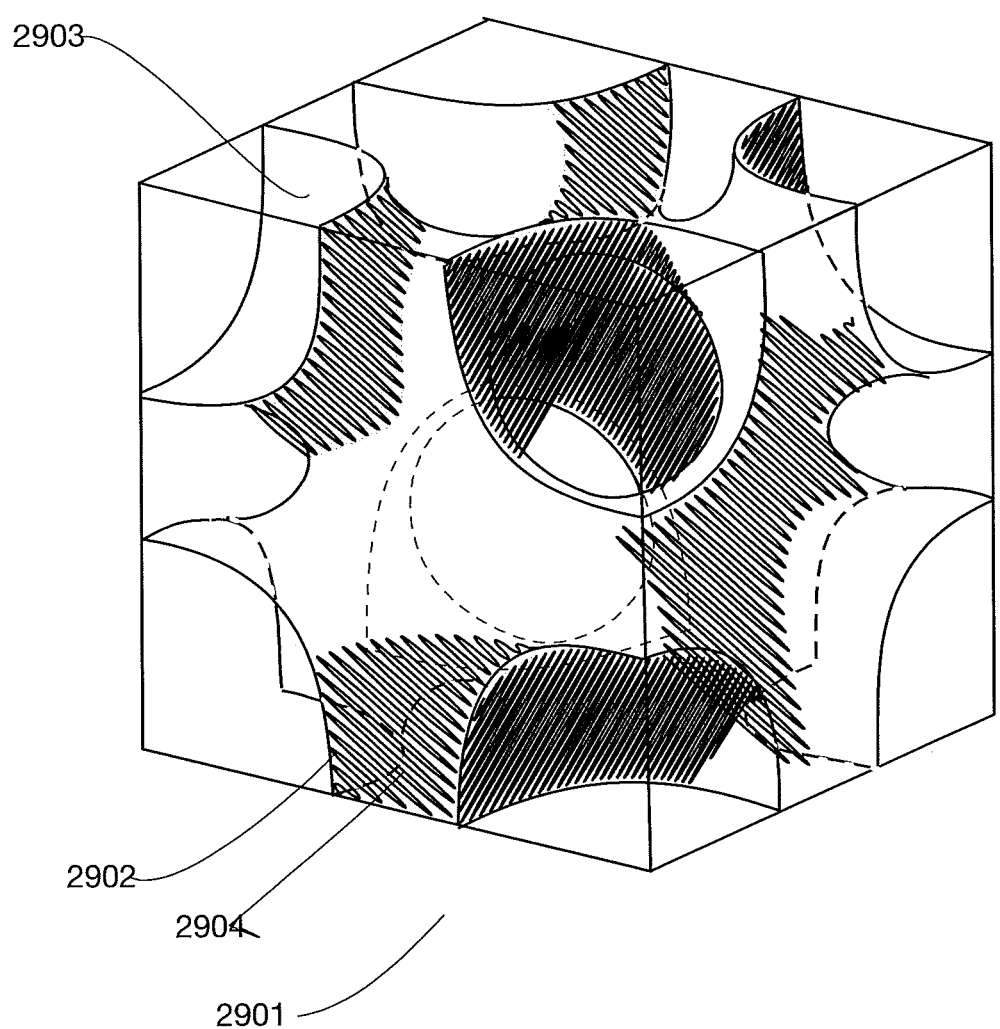
FIG. 29 illustrates an example of a Symmetric Representation Cell.

FIG. 29 illustrates an example geometry onto which this functor topology can be mapped when moving through the Topology Abstraction Process 1210 from the Distributed Situation Reasoning Processors 104 to the Distributed Regular Reasoning Processors 106.

The illustration shows one of 14 possible Bravais Lattices Cells 2901 of a structure that is periodic when constructed of many such cells. The Bravais Lattices Cell 2901 consists of a Membrane Surface 2902 that divides space into two equal volumes: Half-Space 1 2903 and Half-Space 2 2904 that are also identical in form. These surfaces are generally called 'periodic sponge surfaces.' Many types exist; a method for discovering them has been developed by Michael Burt and described in "The Periodic Table of the Polyhedral Universe", International Journal of Space Structures 26, (2), 75. 2011.

The Bravais Lattices Cell 2901 illustrated in FIG. 29 has a cubic packing but many symmetries exist. All types of these periodic sponge surfaces can be employed in embodiments of the invention.

Figure 30:
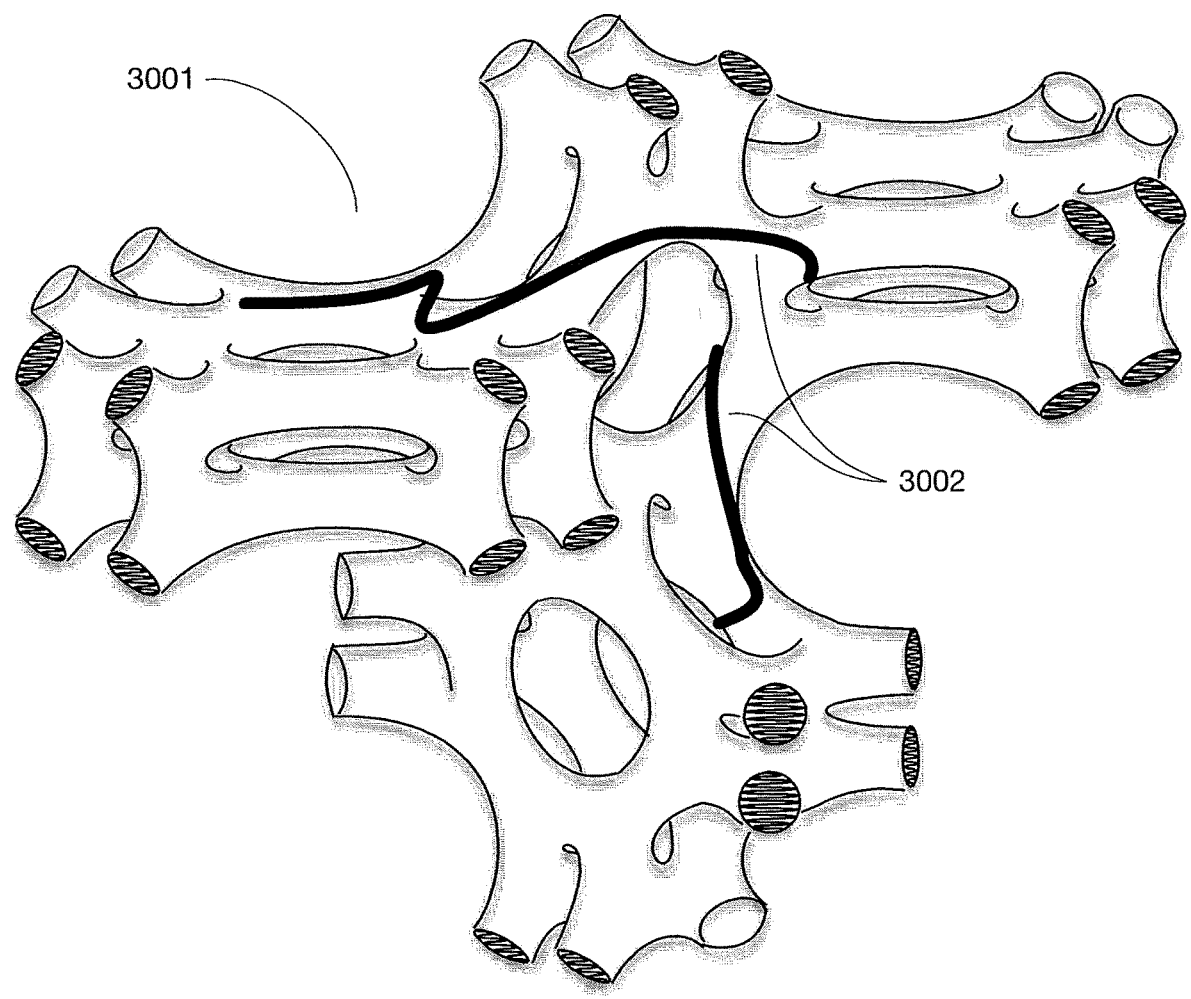
FIG. 30 illustrates an example of a Symmetric Representation Substrate.

FIG. 30 illustrates part of the Periodic Surface 3001 composed from the cells of FIG. 29, with the periodicity more apparent.

The symmetric substrate is a regular branching structure onto which Ontology Graphs can be mapped with no permanent assignment of ontology relation to substrate branch and no exclusivity of ontology relations. Techniques similar to these are commonly practiced in the Formal Concept Analysis community.

The s Periodic Surface 3001 is defined by a topology that is shared by the categoric space selected for the domain, as described in FIG. 12. Thus, any represented content in the substrate when projected on the surface and reduced in dimension reflects the functors applied in the Functional Reactive Fabric. Techniques similar to these are used in modern quantum logic as it applies to modeling physics. A good reference is Coecke, B. (2012). The Logic of Quantum Mechanics—Take II. Retrieved from http://arxiv.org/pdf/1204.3458v1.

The tension that structures the minimal surface of Periodic Surface 3001 thus produces the Ontology Force Structure that attracts and repels the Topoiesis Infons in a Concept Lattice. Governing Influence 3002 here shown as a line show concentrations of the forces. application Ser. No. 14/093,229 teaches a method of specifying the dynamics that by the Distributed Situation Reasoning Processors 104 and Situation Reasoner 408 produce the appropriate Periodic Surface 3001 using Michael Burt's algorithm.

Figure 31:
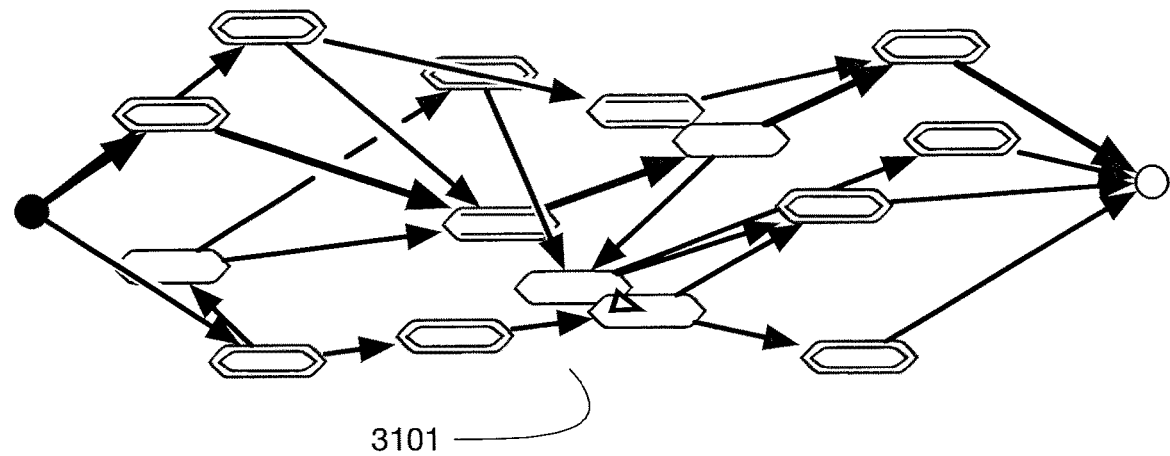
FIG. 31 illustrates an example of an adjusted Concept Lattice.

FIG. 31 illustrates the Concept Lattice 2601 of FIG. 26 as a Three Dimensional Concept Lattice 3101 which has been perturbed by the Ontology Force Structure. Coupled Ontology Infons collectively form Governing Influences 3002 on the associated Periodic Surface 3001, attracting and repelling one another in a complex fashion mediated by the Functional Reactive Fabric governing the Ontology Force Structure. The Ontology Reference Links 2702 typically have a simple springiness that pulls the Concept Lattice into its three dimensional shape as a Three Dimensional Concept Lattice.

A skilled user will be able to read the nodes and causal connectives of the Three Dimensional Concept Lattice 3101 as they are modelable in the current art. A novelty of embodiments of the invention is how the nodes are connected by force that provide significant additional information by the Semantic Distance among nodes in the lattice. By various user interface means including haptic interfaces, a user can experience the relative forces involved.

By direct manipulation of the nodes, a skilled user can teach the system to adjust its understanding by moving a node to adjust its Semantic Distance. Moving a node also pulls the associated Ontology Graphs, perhaps radically changing their connection, their Force Structure and associated location on the Sponge Surface. The arrangement of nodes of the Three Dimensional Concept Lattice 3101 may snap at certain thresholds to new configurations.

This is a fundamental user interface of a system, for example a biological systems model or model of a film or genre narrative. A user can directly edit it using any or all of the views described earlier in FIGS. 7, 9, 11, 13, 16, 18, 19, 20, 21, 22, 23, 24 and 28, as zoomed views, inspectors or linked panes.

Figure 32:
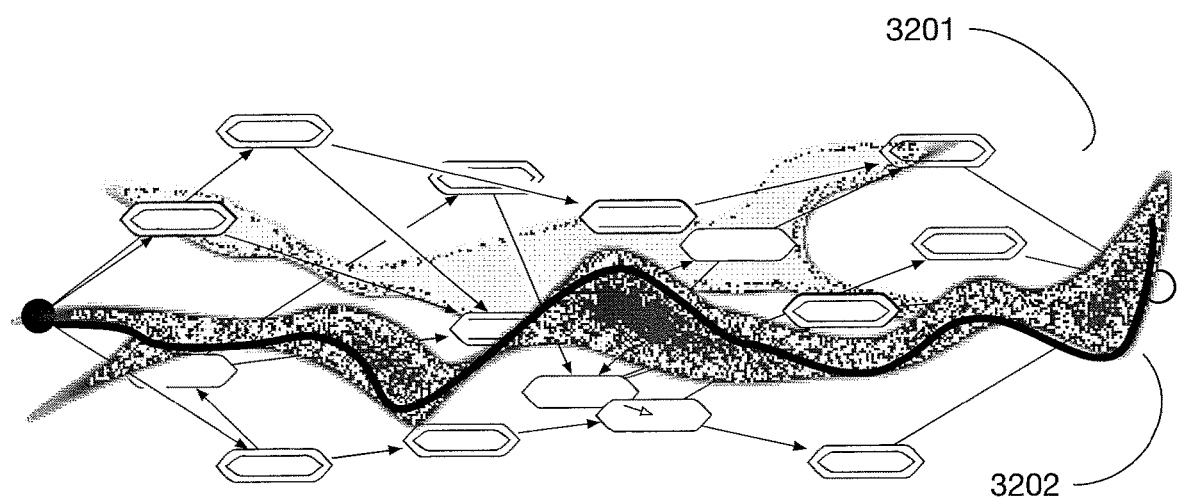
FIG. 32 illustrates an example of an adjusted Concept Lattice with Governing Influence.

FIG. 32 illustrates an enhanced view of FIG. 31, where some of the Governing Influence 3002 from the Ontology Force Structure are imposed on the Three Dimensional Concept Lattice 3201. A line of Governing Influence 3202 is displayed in this example, as well as some indication of cloud density or influence. Color is especially useful in this context, with one color typically reserved for governance.

Figure 33:
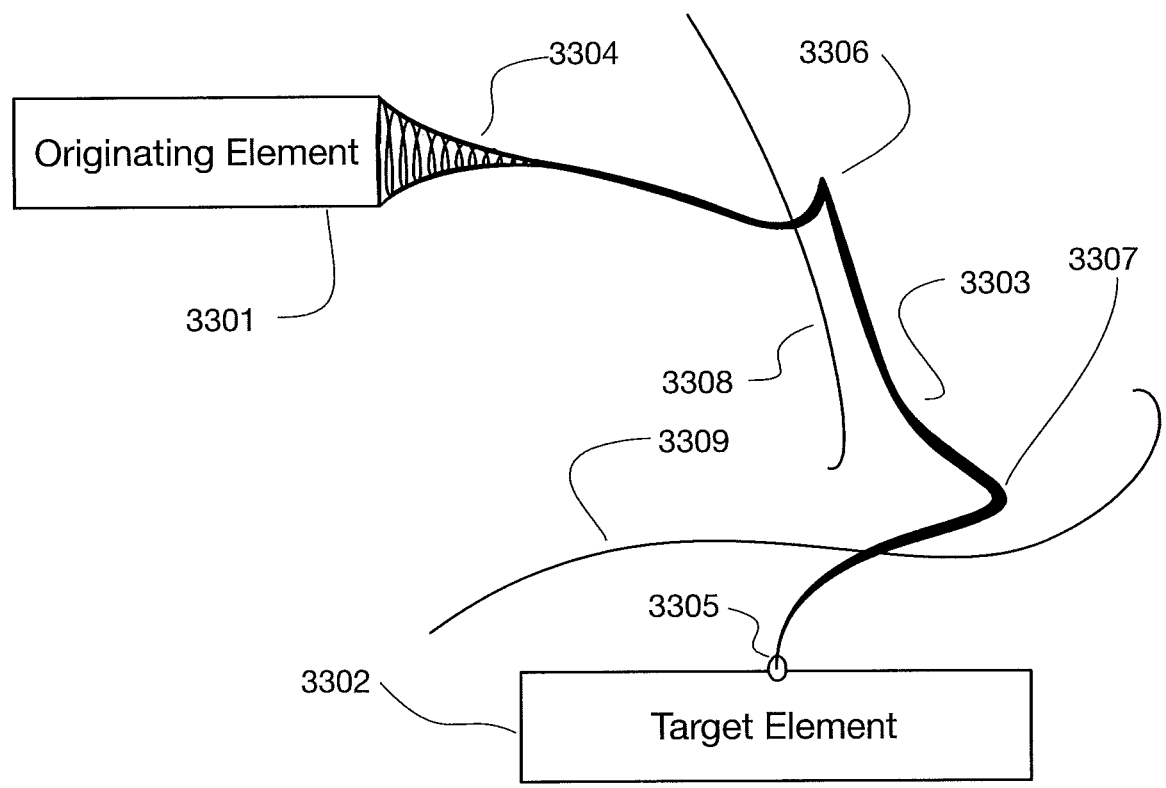
FIG. 33 illustrates an example of a Typed Link with Governing Influence.

FIG. 33 revisits the interface convention previously illustrated in FIG. 7 as a Typed Link Indicator 705, FIG. 9 as Typed Link Indicator 903, FIG. 11 as Typed Link Indicator 1114 and FIG. 20 as Typed Link Indicator 2011. Using our Governing Influence from the Ontology Graph's Force Structure mediated by the Periodic Surface, we can now assign a form to instances of Typed Links as taught in U.S. Pat. No. 8,751,918. Such links have an Originating Element 3301 and a Target Element 3302. As described in previous figures, these elements may have outline chunk, nested infon, functor or situation identities. As illustrated in FIG. 11, these elements may originate in different ontological domains.

The Typed Link Indicator 3303 can be a simple line or optionally have additional elements. These include an origin annotation here illustrated as an Originating Cone 3304, whose character can in part be discerned by visual characteristics. This Originating Cone 3304 collects conveyable information about the relationship denoted by the Typed Link Indicator 3303. Both the Originating Cone 3304 and a similar the Termination Annotation 3305 typically trigger inspectors or a similar device to communicate and edit essential properties.

As taught in U.S. Pat. No. 8,751,918, visual characteristics of the Typed Link Indicator 3303 designating the Typed Link can communicate information of its nature. Added is the ability to have a visual grammar computed and assigned by the system that can directly communicate to a skilled user. That user can directly edit these properties of the link by for example manipulating its shape and calligraphic nature. These interactions can be supplemented by or work in concert with the other affordances described in U.S. Pat. No. 8,751,918.

FIG. 33 shows a specific form of 3303 with two Inflection Points 3306 and 3307 with their respective and two Governing Influences 3308 and 3309 from the Periodic Surface. These are similar to Governing Influence 3202. An embodiment expresses the forms Governing Influence 3202 and Governing Influence 3303 in such a way that some central nature of the system is revealed, following a quality coined as 'kutachi' based on a Japanese concept of 'katachi,' often applied by scientists in this manner.

Figure 34:
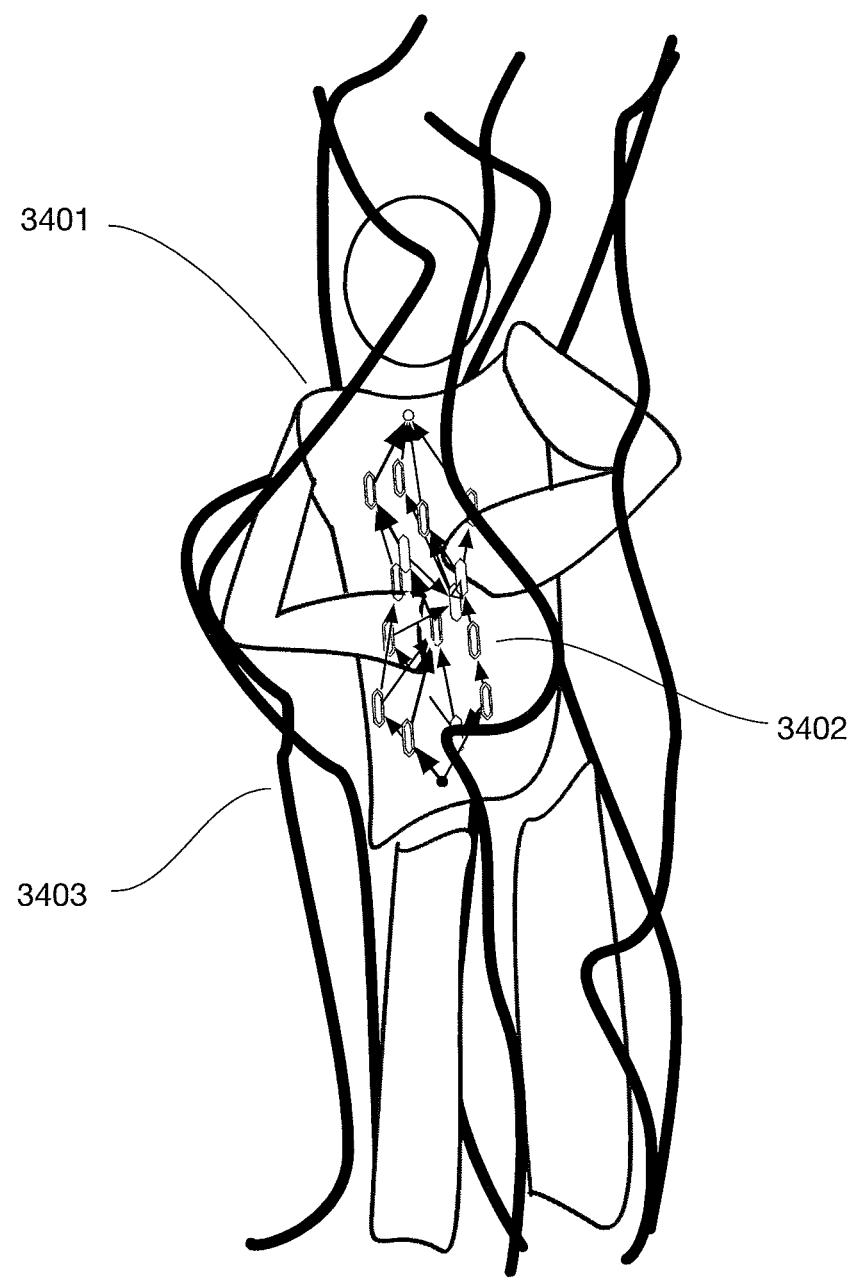
FIG. 34 illustrates an example of an immersive Concept Lattice user interface.

FIG. 34 illustrates an immersive version of the user interface of FIG. 32. Embodiments can use a variety of visualization technologies including virtual and augmented reality. In this instance, the Concept Lattice 3402 is 'held' in the hand or hands by a User 3401, possibly with a haptic device. The Governing Influences 3002, 3202 form a larger structure that can be as large as enclosing the user 3401, here shown as Governing Influences 3403. The idea is that if each line effectively conveys subtle but essential, situated information then a manipulatable, immersive three dimensional assembly will be more effective.

The tactile interface of the Concept Lattice 3402 may be based on string figures. FIG. 34 shows a standing human, but any posture can be accommodated. Groups can be enclosed. Remote collaboration is possible, using identical copies of the model or parsed, fractional versions tailored to specific purposes. Collaboration can be in real time or used as a persistent three dimensional 'notebook.'

An alternative embodiment has the Concept Lattice 3402 by itself without the Governing Influences 3403 as a tactile model, perhaps immersive and collaborative. Regarding this, the examples shown in FIGS. 26, 27, 28 31 and 32 are relatively simple to indicate in such a user interface. Practical applications where embodiments of the invention have a unique advantage are more complex.

Figure 35:
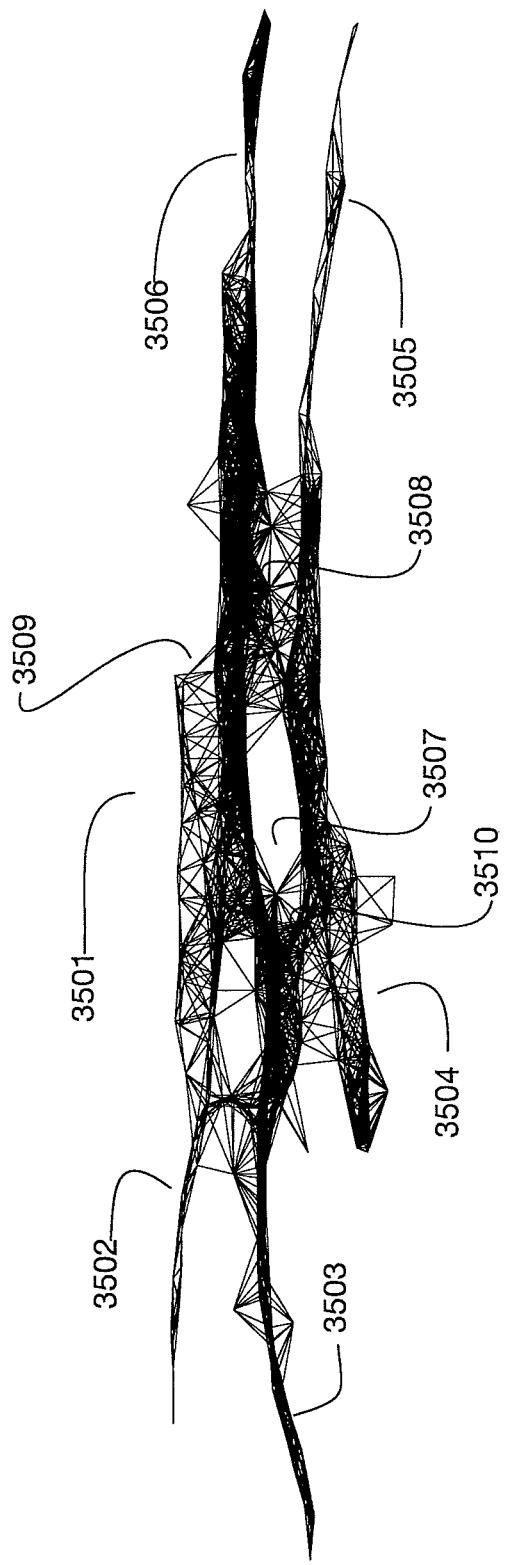
FIG. 35 illustrates an example of a working instance of an adjusted Concept Lattice.

FIG. 35 illustrates a Concept Lattice representative of a practical use. The Concept Lattice 3501 (which is an example of a functional fabric) in this case is displayed without large nodes. It is a collection of causal links shaped by the Governing Influences. Though they are not explicitly shown, the resulting shape of these Governing Influences provides significant insight.

The use case is a model of interacting biological systems in the case of post-traumatic stress disorder. Well after the original trauma, subjects retain a fear memory, often associated with specific narratives. Stress is induced and the body responds in many ways as if a low level pathogen is present. Sleep is disturbed and consequently the inflammation and physical/mental stress increases. Many systems are involved: the central nervous system, innate and adaptive immune systems and at least two cognitive systems that employ radically different ontologies. The diagram is a baseline among hundreds of human cases and thousands of rodent models.

Reading from the left Zone 3502 is the acquisition of the mental trauma. The top of the model until about the center captures phenomes associated with reflective awareness that the trauma was a discrete, past event. This awareness is subsumed.

In the center starting with Zone 3502 and continuing to Zone 3506 are a collection of subconscious and passive nervous system processes that are centered in specific regions of the brain and manage fear memory and reparative dreaming.

The bottom collection of processes starting with Zone 3504 and continuing through the right at Zone 3505 are a collection of purely biological processes associated with the immune systems, and primarily the relatively blunt innate immune system.

There are thousands of measurable events that are contained in this model, the reduced biological processes being of the kind illustrated in FIG. 21. A detailed understanding of all of these is beyond the expertise of any researcher. Yet standing back and just observing the shape resulting from the Semantic Distance and Governing Influences, one can extract key insights not directly apparent in the data.

Lucid cognition and the feeling of control vanish at a point Zone 3509 as the memory of the event becomes subconscious fear memory, entangled with and interrupting sleep. Meanwhile, there are two intense periods Zone 3510 and Zone 3508 where the immune and passive nervous systems are entangled, followed by a puzzling period Zone 3507 of no interaction.

A wise experimental strategy is to look at the area of Zone 3510 and the specific signals that are exchanged, to interrupt them and see the result. As it happens, there is enough knowledge in this pathology to experiment using the model itself. If the researcher blocks a single, signal path at Zone 3510 the hole Zone 3507 vanishes, the immune system transfers to an adaptive mode, the reflective capability and control impulse are not stunted and the fear memory is neutralized. As with any good model, the next step would be to perform bench research to validate and adjust the model.

While interacting with the model, the user will have zoomed, examined and manipulated information using multiple affordances. Queries to remote sources will have been automatically made to refine the model. Ongoing new results from the literature and central data stores will have been automatically ingested and made situationally appropriate.

The invention claimed is:

1. A computing system for modeling complex layered knowledge bases, the computer system comprising:
   a storage device storing a functional fabric representing the complex layered knowledge bases, the functional fabric comprising a plurality of information elements and typed links that relate the information elements to one another, wherein the plurality of informational elements, respectively, comprise a plurality of ontology graphs, and the typed links comprise a plurality of overlapping nodes between the plurality of ontology graphs and one or more influences associated with the overlapping nodes;
   a computing device coupled to the storage device and comprising distributed regular reasoning processors and distributed situation reasoning processors configured to manage the functional fabric to:
      create the information elements based on facts received by the computing system, and provide the information elements to the storage device,
      use the distributed regular reasoning processors to generate new information elements and/or update the information elements by reasoning about the information elements retrieved from the storage device, and
      use the distributed situation reasoning processors to update at least one of the typed links or create at least one new typed link by reasoning about situational inferences about the updated information elements and/or new information elements retrieved from the storage device, wherein the reasoning about situational inferences comprises modifying the one or more influences associated with the overlapping nodes; and
   a display configured to display the information elements and the typed links and to display a graphical user interface for enabling the creation and manipulation of information elements and typed links.

2. The computer system of claim 1, wherein the distributed situation reasoning processors are configured to reason about situational inferences by recalling a situation history, assembling a situation narrative and calculating a linearization narrative.

3. The computer system of claim 1, wherein the distributed situation reasoning processors are configured to reason about situational inferences by modifying one or more of semantic networks, axioms, rules and description logic.

4. The computer system of claim 1, wherein the reasoning of the distributed regular reasoning processors and the distributed situation reasoning processors is dynamically maintained in the functional fabric.

5. The computing system of claim 1, wherein the information elements comprise multimedia content and ontologies and annotations related to the multimedia content.

6. The computing system of claim 1, wherein each typed links comprises:
   information element identifiers to identify the information elements being related by the respective typed link;

type information relating to a category of at least one of the respective information elements;

inference information relating to inferences made about the information elements; and context information relating to a context of the inferences.

7. The computing system of claim 1, wherein the distributed regular reasoning processors and distributed situation reasoning processors are configured to simultaneously reason over the same information elements.

8. The computing system of claim 1, wherein functional fabric comprises functions based on the overlapping nodes.

9. The computing system of claim 1, wherein the computing device comprises a plurality of sorting reasoning systems, wherein the distributed regular reasoning processors comprise a first sort of the plurality of sorting reasoning systems and the distributed situation reasoning processors comprise a second sort of the plurality of sorting reasoning systems.

10. A computing system for creating, displaying, navigating and manipulating complex layered knowledge bases through a functional reactive fabric comprising information elements and typed links that relate the information elements to one another, the computing system comprising:

a computing device configured to manage the functional reactive fabric, the computing device comprising:

a creating module configured to create information elements based on facts received by the computing system, and to create typed links for the information elements, wherein the information elements comprise a plurality of ontology graphs and the typed links comprise a plurality of overlapping nodes between the plurality of ontology graphs and one or more influences associated with the overlapping nodes; and a navigating module configured to identify and relate information elements and typed links within the functional reactive fabric by reasoning about the information elements and reasoning about situational inferences about the information elements, wherein the reasoning about situational inferences comprises modifying the one more influences associated with the overlapping nodes; and a display device connected to the computing device and configured to display and allow manipulation of the information elements and typed links.

11. The computing system of claim 10, wherein the display device comprises a user interface for creating information elements from fractional mapping of features of a situation, and wherein the fractional mapping is supported on a distributed system.

12. The computing system of claim 10, wherein the display device comprises a user interface for creating information elements from fractional mapping of features of a situation, and wherein the fractional mapping is configured to support massive instances of streams.

13. The computing system of claim 10, wherein the display device comprises a user interface for creating information elements from a real-time fractional mapping of features of a situation.

14. The computing system of claim 10, wherein the display device comprises a user interface for creating information elements from fractional mapping of features of a situation that reveals hidden system dynamics.

15. The computing system of claim 10, wherein the computing device is configured to perform situational evaluation of information elements where such a situated evaluation has partial situated information.

16. The computing system of claim 10, wherein the computing device is configured to perform situational evaluation of information elements where such a situated evaluation has multiple situation governance.

17. The computing system of claim 10, wherein the information elements comprise multimedia content and ontologies and annotations related to the multimedia content.

18. The computing system of claim 10, wherein the functional reactive fabric is configured in at least one of a set theoretic programming paradigm, a group theoretic programming paradigm and a category theoretic programming paradigm.

19. The computing system of claim 10, wherein the functional reactive fabric is supported by a distributed computing system.

20. The computing system of claim 10, wherein each typed links comprises:

information element identifiers to identify the information elements being related by the respective typed link;

type information relating to a category of at least one of the respective information elements;

inference information relating to inferences made about the information elements; and context information relating to a context of the inferences.

21. The computing system of claim 10, wherein the navigating module is configured to simultaneously reason about the information elements and reasoning about situational inferences about the same information elements.

* * * * *